(12) United States Patent
Tateno

(10) Patent No.: US 8,212,947 B2
(45) Date of Patent: Jul. 3, 2012

(54) LIQUID CRYSTAL DEVICE, PROJECTOR, AND OPTICAL COMPENSATION METHOD OF LIQUID CRYSTAL DEVICE

(75) Inventor: Yoshitake Tateno, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 12/274,232

(22) Filed: Nov. 19, 2008

(65) Prior Publication Data

US 2009/0128719 A1    May 21, 2009

(30) Foreign Application Priority Data

| Nov. 20, 2007 | (JP) | ................................. 2007-300194 |
| Nov. 20, 2007 | (JP) | ................................. 2007-300195 |
| Nov. 20, 2007 | (JP) | ................................. 2007-300196 |
| Nov. 20, 2007 | (JP) | ................................. 2007-300197 |
| Jul. 17, 2008 | (JP) | ................................. 2008-186349 |
| Jul. 17, 2008 | (JP) | ................................. 2008-186352 |
| Jul. 17, 2008 | (JP) | ................................. 2008-186357 |
| Jul. 17, 2008 | (JP) | ................................. 2008-186407 |

(51) Int. Cl.
*G02F 1/1335* (2006.01)
*G02F 1/1337* (2006.01)
(52) U.S. Cl. .......................................... 349/8; 349/117
(58) Field of Classification Search ........................ None
See application file for complete search history.

(56) References Cited

U.S. PATENT DOCUMENTS

| 6,226,064 | B1 | 5/2001 | Shimada et al. | |
| 8,018,557 | B2 | 9/2011 | Muramoto et al. | |
| 2003/0103182 | A1* | 6/2003 | Mi et al. | 349/130 |
| 2006/0215091 | A1* | 9/2006 | Muramoto et al. | 349/117 |
| 2007/0195272 | A1* | 8/2007 | Hendrix et al. | 353/20 |
| 2007/0258047 | A1* | 11/2007 | Miyamoto et al. | 353/20 |

FOREIGN PATENT DOCUMENTS

| CN | 1993647 A | 7/2007 |
| JP | 2006-11298 A | 1/2006 |

\* cited by examiner

*Primary Examiner* — Sarah Hahm
(74) *Attorney, Agent, or Firm* — AdvantEdge Law Group, LLC

(57) ABSTRACT

The disclosure includes a liquid crystal device, a projector and an optical compensation method of a liquid crystal device. In one embodiment, a liquid crystal device includes a liquid crystal panel having a pair of substrates, each of which has an alignment film. A vertically-aligned liquid crystal, which has liquid crystal molecules pretilted by the alignment films, is interposed between the pair of substrates and modulates light. A pair of polarizing films interposes the liquid crystal panel therebetween. A first retardation film is disposed between the pair of polarizing films and includes (i) a first substrate and (ii) a first deposited film maintaining a first refractive anisotropy and being obliquely deposited on the first substrate so that a first optical axis of the first refractive anisotropy is tilted in a direction in which a variation in characteristic of the light due to the pretilted liquid crystal molecules is canceled.

23 Claims, 31 Drawing Sheets

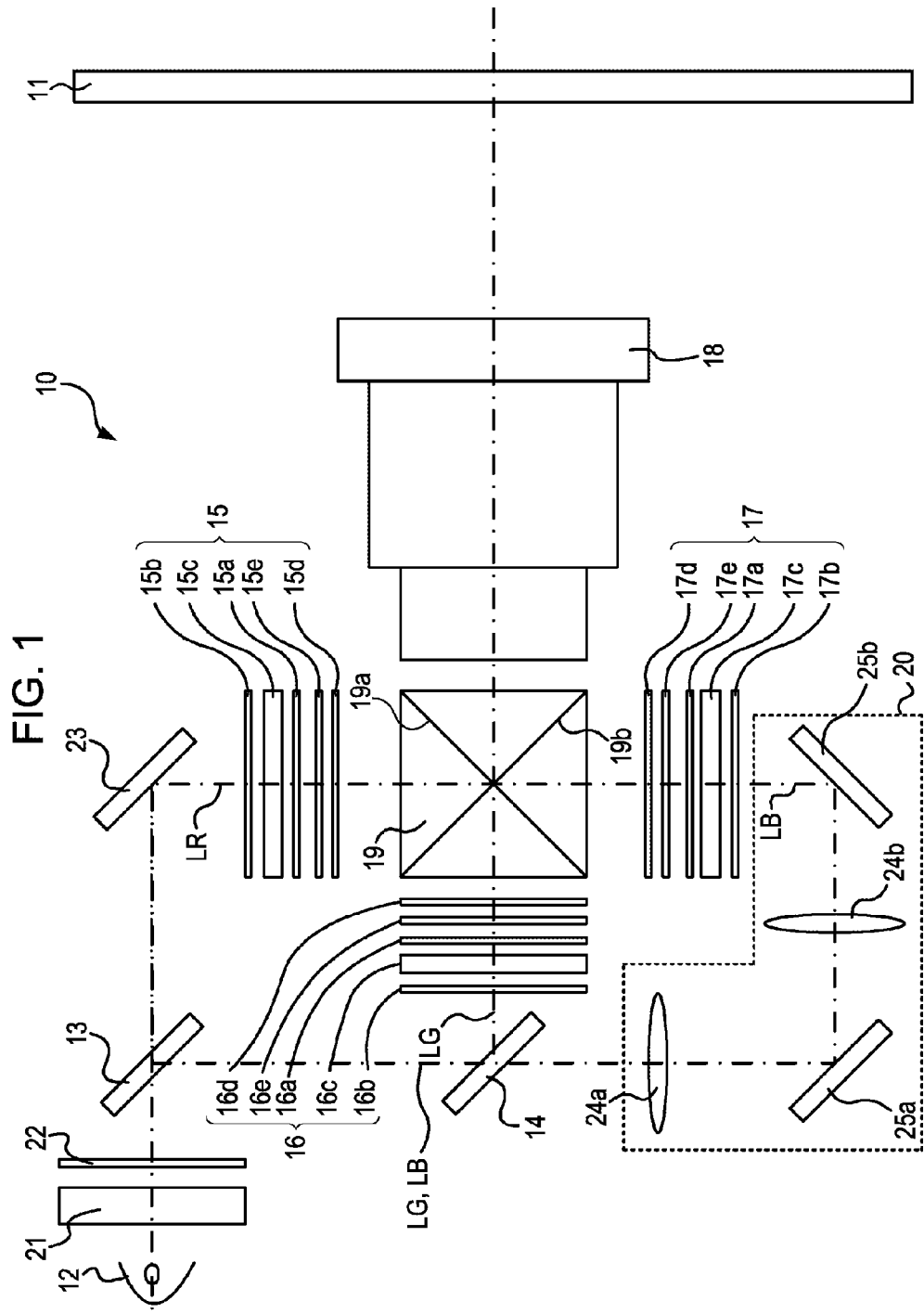

INCIDENT LIGHT

OUTPUT LIGHT

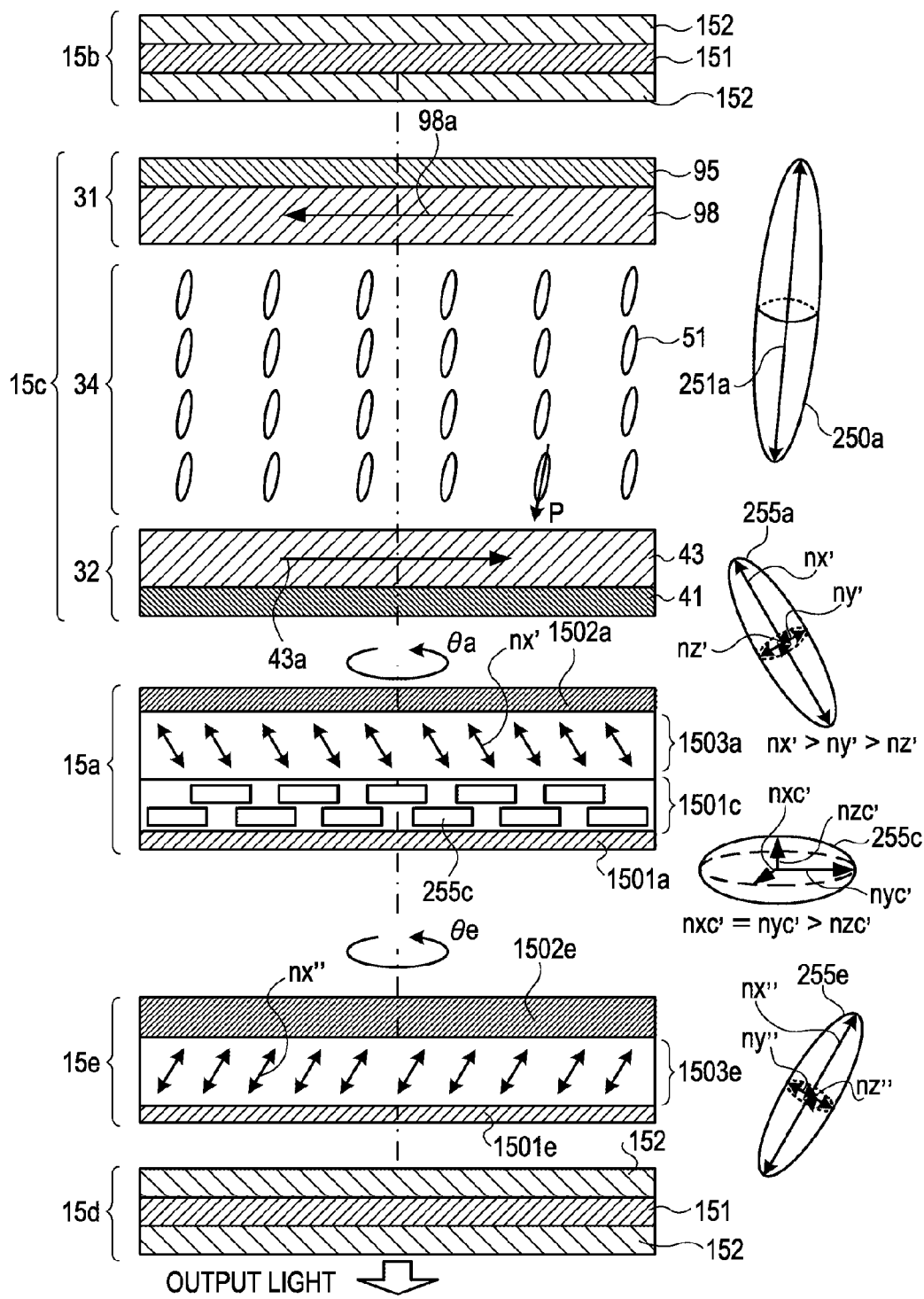

PLAN VIEW

ELEVATION VIEW (COMBINATION OF FIRST RETARDATION FILM AND SECOND RETARDATION FILM)

(COMBINATION OF FIRST RETARDATION FILM AND SECOND RETARDATION FILM)

THICKNESS OF 0.5 μm

THICKNESS OF 0.8 μm

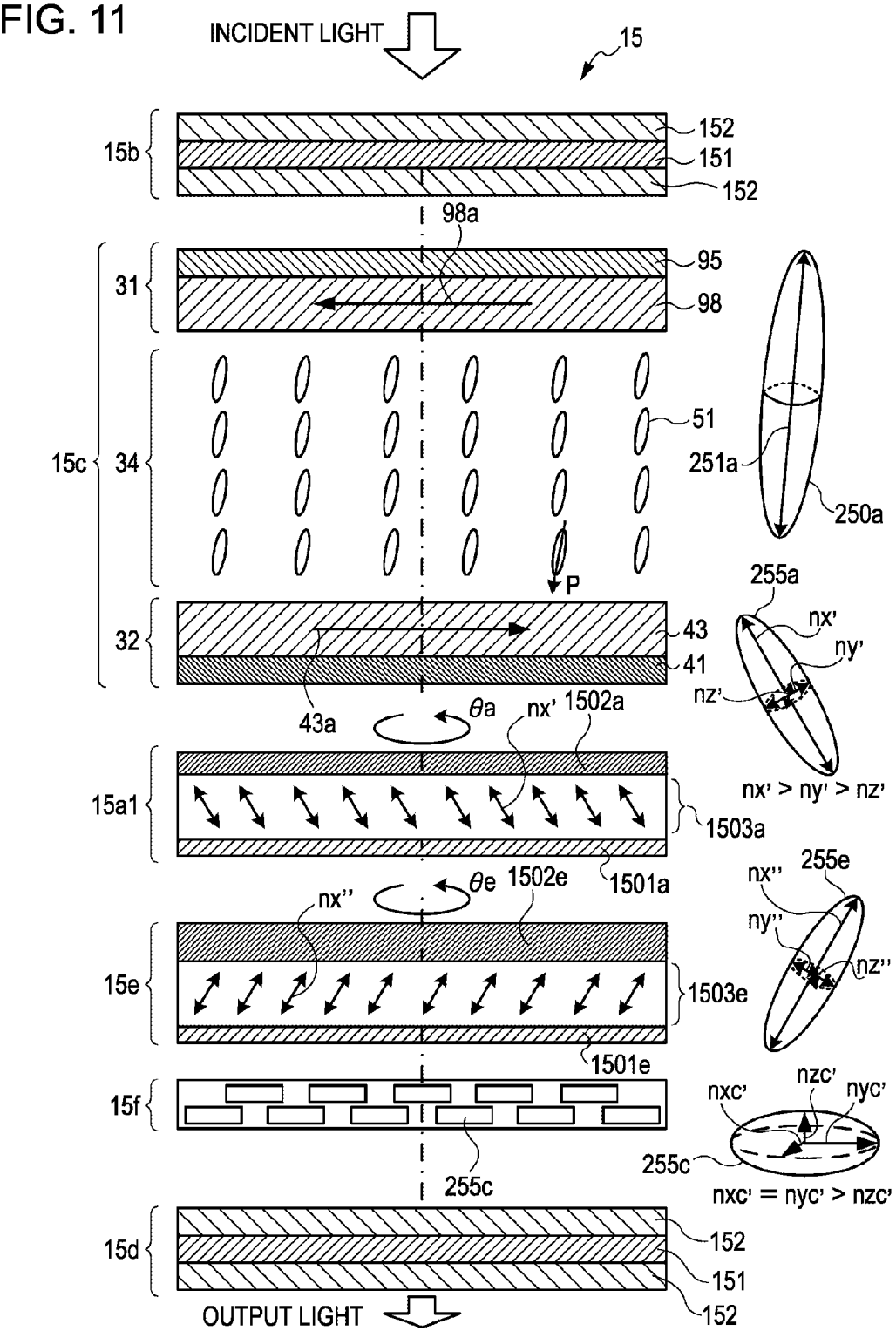

COMPARATIVE EXAMPLE

PRESENT INVENTION

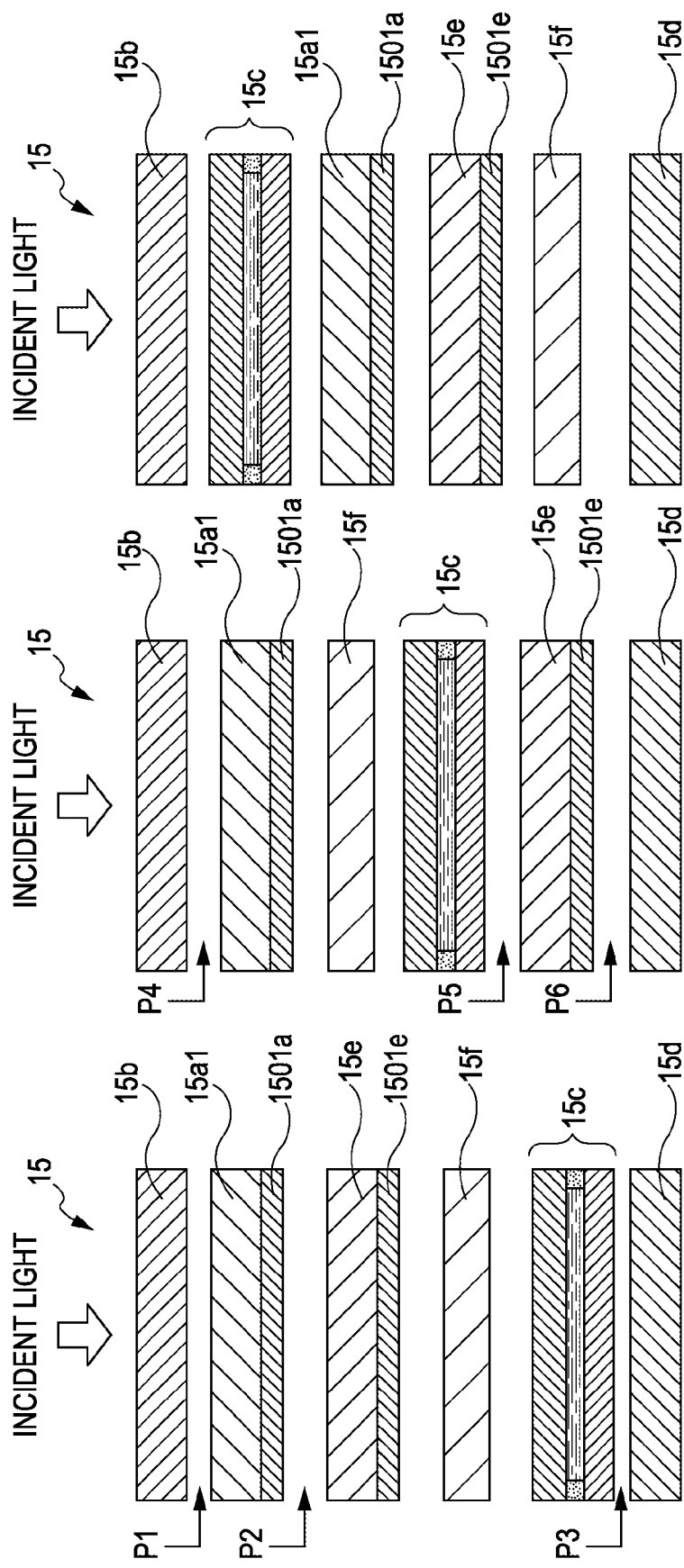

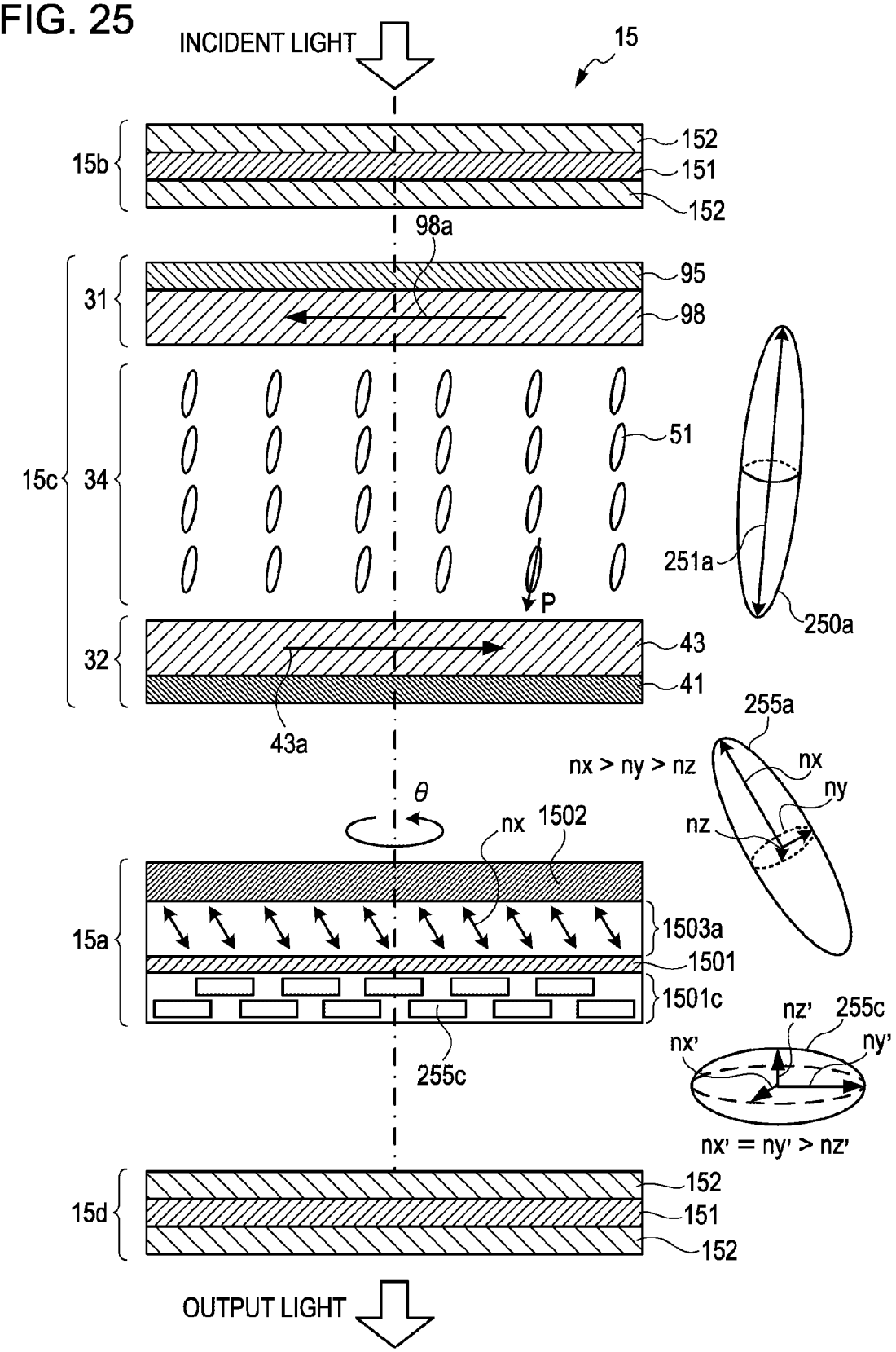

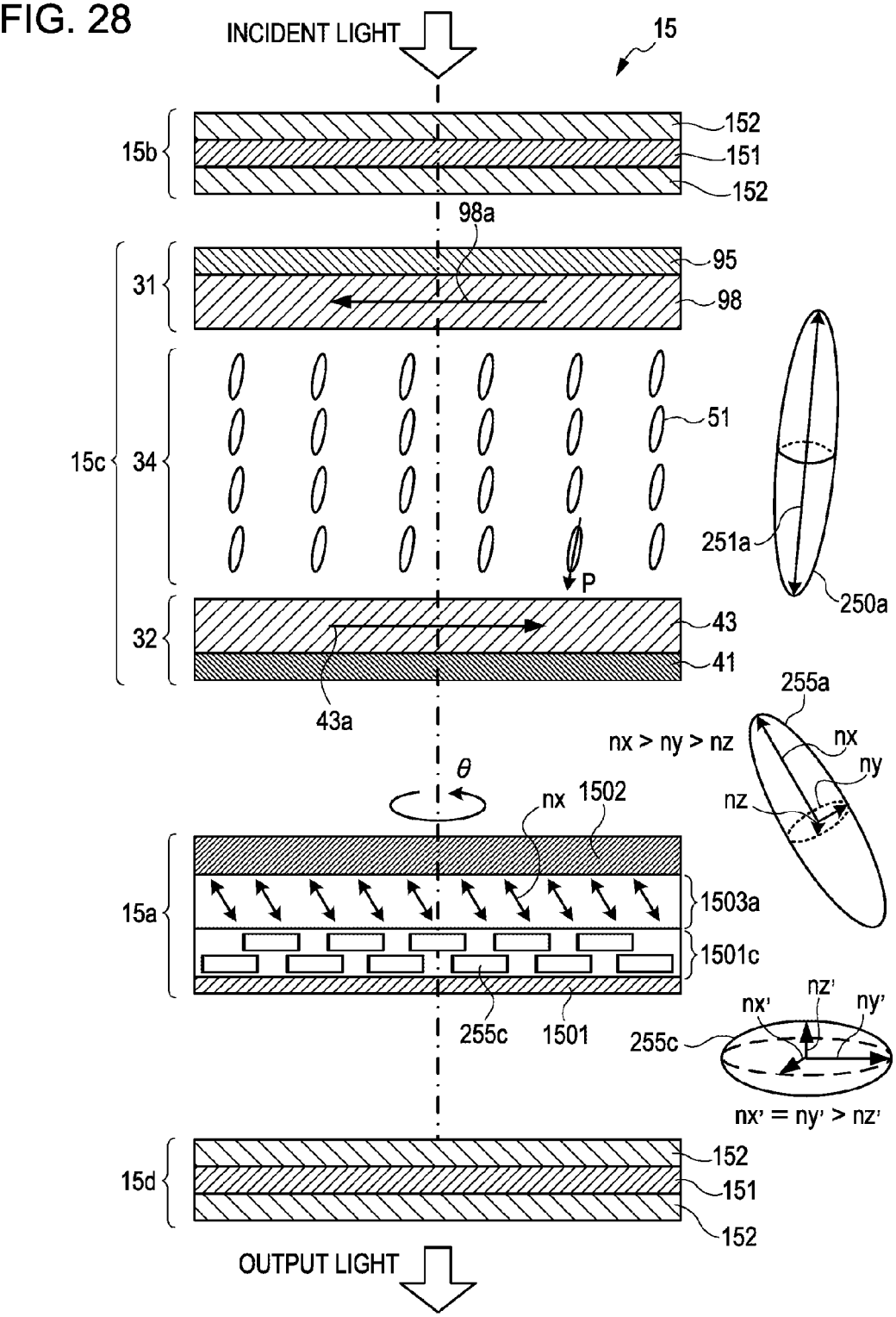

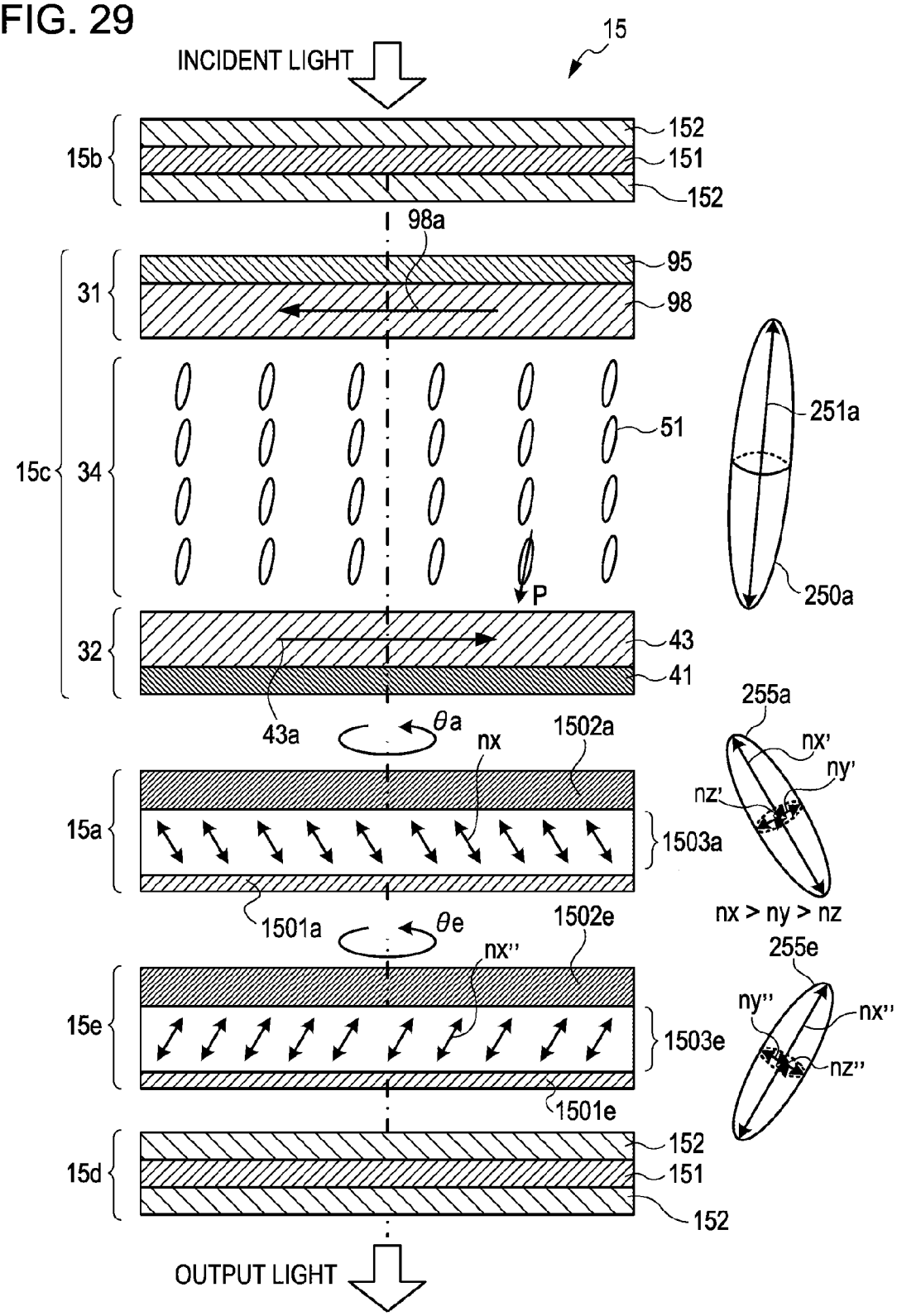

LIQUID CRYSTAL DEVICE, PROJECTOR, AND OPTICAL COMPENSATION METHOD OF LIQUID CRYSTAL DEVICE

CROSS-REFERENCE

The present application claims priority from Japanese Patent Application Nos. 2007-300194 filed on Nov. 20, 2007, 2007-300195 filed on Nov. 20, 2007, 2007-300196 filed on Nov. 20, 2007, 2007-300197 filed on Nov. 20, 2007, 2008-186349 filed on Jul. 17, 2008, 2008-186352 filed on Jul. 17, 2008, 2008-186357 filed on Jul. 17, 2008, and 2008-186407 filed on Jul. 17, 2008, which are each hereby incorporated by reference in their entirety.

BACKGROUND

Liquid crystal devices being driven in a "vertical alignment (VA) mode" have been suggested. A technique of disposing a retardation film to be oblique about a liquid crystal light valve has been suggested to improve contrast in Japanese Patent Publication No. JP-A-2006-11298.

However, when the retardation film is obliquely disposed like the technique disclosed in Japanese Patent Publication No. JP-A-2006-11298, it is necessary to tilt the retardation film along the alignment direction of liquid crystal molecules. In this case, since a space for tilting the retardation film is limited in a projector in view of a cooling effect by circulation of air, there are difficulties in enhancing the contrast. Moreover, a mechanism for tilting the retardation film may be complicated and difficult to technically adjust the tilting of the retardation film in the assembly process thereof.

SUMMARY

Various embodiments of the disclosure provide a liquid crystal device capable of displaying a high-contrast image with a relatively simple structure, a projector having the liquid crystal device, and an optical compensation method of the liquid crystal device.

According to an aspect of the disclosure, there is provided a liquid crystal device including: a liquid crystal panel that includes a pair of substrates, each of which has an alignment film, and a vertically-aligned liquid crystal, which has liquid crystal molecules pretilted (that is, tilted by an angle from the normal direction) by the alignment films, interposed between the pair of substrates and that modulates light; a pair of polarizing films that interposes the liquid crystal panel therebetween; and a first retardation film that is disposed between the pair of polarizing films and that includes (i) a first substrate and (ii) a first deposited film maintaining first refractive anisotropy and being obliquely deposited on the first substrate so that a first optical axis (for example, primary refractive index nx where nx>ny>nz) of the first refractive anisotropy is tilted in a direction in which a variation in characteristic of the light due to the pretilt is canceled.

According to this aspect of the disclosure, the light emitted from a light source is separated into a red beam, a green beam, and a blue beam by a color-separating optical system such as a reflecting mirror and a dichroic mirror. The liquid crystal panel is used as a light valve modulating each of the red beam, the green beam, and the blue beam. In the liquid crystal panel, the alignment states of the liquid crystal molecules of pixels are regulated on the basis of data signals (or image signals) to display an image corresponding to the data signals in a display area thereof. The images displayed by the liquid crystal panels are synthesized by a color-synthesizing optical system such as a dichroic prism and the synthesized image is projected as a projection image onto a projection plane such as a screen through a projection lens.

In the liquid crystal panel, a liquid crystal is interposed between a pair of substrates. The liquid crystal is generally a vertical alignment (VA) type liquid crystal. An alignment film is disposed in each of the pair of substrates and the liquid crystal molecules of the liquid crystal are pretilted by the alignment films in a predetermined direction by a predetermined angle. For example, when the liquid crystal is of the VA type, the liquid crystal molecules is tilted and aligned by a pretilt angle in a constant direction from the normal line of the substrate surface of the pair of substrates. The liquid crystal molecules maintains the pretilt when a voltage is not applied to the liquid crystal panel and is tilted close to the plane direction of the substrate of the liquid crystal panel when a voltage is applied to the liquid crystal panel. Accordingly, it is possible to simply embody a VA type liquid crystal or a normally-black type liquid crystal. The long axis direction of the pretilted liquid crystal molecules and one side of the pair of substrates may form an angle of 45 degrees as viewed in the normal direction of the pair of substrates. The liquid crystal panel is interposed between a pair of polarizing films.

The first retardation film includes (i) the first substrate and (ii) the first deposited film maintaining the first refractive anisotropy and being obliquely deposited on the first substrate so that the first optical axis of the first refractive anisotropy is tilted in a direction in which a variation in characteristic of the light due to the pretilt is canceled. The "variation in characteristic of light" in the disclosure means that at least one of basic characteristic parameters of light varies such as a variation in traveling direction, a variation in polarized state, and a variation in frequency or phase. The "canceling direction" in the disclosure ideally means a direction in which the variation can be necessarily and sufficiently canceled and a direction including the ideal direction as a component. That is, the canceling direction ideally means a direction in which the canceling ability is excellent and generally means a direction in which the first optical axis having the maximum first refractive anisotropy intersects the long axis direction of the pretilted liquid crystal molecules as viewed in the normal direction of the first substrate. In certain embodiments, the first deposited film of the first retardation film includes an inorganic material. Accordingly, it is possible to effectively prevent the first retardation film from being deteriorated due to radiation of light or an increase in temperature accompanied therewith, thereby constructing a liquid crystal device having improved reliability.

The first retardation film is disposed between a pair of polarizing films. More specifically, the first retardation film is disposed between one of the pair of polarizing films and the liquid crystal panel or between the other of the pair of polarizing films and the liquid crystal panel. In other words, the first retardation film is disposed between the pair of polarizing films to be close to a side where light is incident on or output from the liquid crystal panel.

The first refractive anisotropic medium is obliquely deposited as the first deposited film on the first substrate so that the first optical axis of the first refractive anisotropic medium of the first retardation film is parallel to a predetermined direction intersecting the long axis direction of the pretilted liquid crystal molecules as viewed in the normal direction of the first substrate. Here, the predetermined direction means a direction in which the first optical axis of the first refractive anisotropic medium intersecting the long axis direction of the liquid crystal molecules extends. Specifically, the predetermine direction which is the direction in which the first optical axis of the first refractive anisotropic medium extends can be individually defined experimentally, theoretically, experientially, or by simulation on the basis of the long axis direction of the liquid crystal molecules so that a level of an optical characteristic of the liquid crystal device such as contrast or viewing angle be a desired value such as the maximum value.

The first refractive anisotropic medium is obliquely deposited as the first deposited film on the first substrate so that the optical axis of the first refractive anisotropic medium of the first retardation film intersects the first substrate at a predetermined angle. Here, the predetermined angle means an angle at which the optical axis of the first refractive anisotropic medium and the first substrate intersect each other. In other words, the predetermined angle can be said to be a value obtained by subtracting the angle between the normal line of the first substrate and the optical axis corresponding to the primary refractive index of the first refractive anisotropic medium from 90 degrees. Alternatively, the predetermined angle can be said to be an angle formed by the optical axis corresponding to the primary refractive index of the first refractive anisotropic medium and the predetermined direction. Specifically, the predetermined angle at which the optical axis of the first refractive anisotropic medium and the first substrate intersect each other can be individually defined experimentally, theoretically, experientially, or by simulation so that a level of an optical characteristic of the liquid crystal device such as contrast or viewing angle be a desired value such as the maximum value.

Accordingly, since the first optical axis (typically nx (where nx>ny>nz)) of the first retardation film is parallel to a predetermined direction intersecting the long axis direction of the liquid crystal molecules tilted by the pretilt angle, the optical axis of the first retardation film compensates for the optical anisotropy of the liquid crystal molecules into the optical isotropy in the plane direction of the first substrate. Since the optical axis (typically nx) of the first retardation film intersects the first substrate by a predetermined angle, the first optical axis of the first retardation film compensates for the optical anisotropy of the liquid crystal molecules into the optical isotropy in the vertical plane direction of the first substrate. That is, since the long axis of the index ellipsoid formed by the liquid crystal molecules and the long axis of the index ellipsoid formed by the first retardation film intersect each other, the index ellipsoid formed by both the liquid crystal molecules and the first retardation film can be made to three-dimensionally approach a refractive index sphere.

Accordingly, the phase difference (in other words, birefringent effect) generated in the liquid crystal can be canceled (that is, compensated for) by the first retardation film. As a result, in operating the liquid crystal device, it is possible to compensate for the phase difference of light generated at the time of allowing the light emitted from the light source to pass through the liquid crystal having the liquid crystal molecules pretilted by the pretilt angle by the use of the first retardation film. Therefore, it is possible to prevent the light passing through the liquid crystal panel from being incident on the polarizing film on the light output side with a deviated phase. As a result, the possibility that the light not to be transmitted leaks from the polarizing film on the light output side decreases, thereby preventing a deterioration in contrast or a decrease in viewing angle.

When the optical anisotropy of the liquid crystal molecules is compensated for by tilting the retardation film which has the uniaxial refractive anisotropy and of which the optical axis is parallel to the thickness direction, a space for tilting the retardation film is limited in the liquid crystal device in view of a cooling effect by circulation of air, thereby making it difficult to technically prevent the deterioration in contrast.

Alternatively, a mechanism for tilting the retardation film is complicated and it is thus difficult to technically adjust the tilting of the retardation film in the assembly process thereof.

However, in the above-mentioned aspect of the disclosure, the first deposited film of the first retardation film maintains the first refractive anisotropy and is obliquely deposited on the first substrate so that the first optical axis of the first refractive anisotropy is tilted in the direction in which the variation in characteristic of light due to the pretilt is canceled. The first optical axis of the first refractive anisotropy of the first retardation film intersects the first substrate or the second substrate in the predetermined direction by the predetermined angle so as to compensate for the optical anisotropy of the liquid crystal molecules by the oblique deposition of the first deposited film. Accordingly, by adjusting the direction in which the first optical axis of the first refractive anisotropy of the first retardation film is tilted and the angle at which the first optical axis of the first refractive anisotropy of the first retardation film intersects the first substrate by the oblique deposition of the first deposited film, it is possible to easily compensate for the optical anisotropy of the liquid crystal molecules of the liquid crystal panel with high precision. Since it is hardly or never necessary to tilt the first retardation film about the incidence direction of light so as to compensate for the optical anisotropy of the liquid crystal molecules of the liquid crystal panel, it is possible to omit the adjustment process of tilting the first retardation film in the assembly process, thereby easily compensating for the optical anisotropy of the liquid crystal molecules at low cost and enhancing the contrast. As a result, it is possible to enhance the effect of compensating for the phase difference generated in the liquid crystal by the use of the first retardation film, thereby enhancing the contrast.

As described above, according to the liquid crystal device, by adjusting the direction in which the first optical axis of the first refractive anisotropy of the first retardation film is tilted and the angle at which the first optical axis of the first refractive anisotropy of the first retardation film intersects the first substrate by the oblique deposition of the first deposited film, it is possible to satisfactorily compensate for the phase difference generated in the liquid crystal panel by the use of the first retardation film. As a result, it is possible to obtain a display with high contrast and high quality.

According to another aspect of the disclosure, there is provided a liquid crystal device including: a liquid crystal panel that includes a pair of substrates, each of which has an alignment film, and a vertically-aligned liquid crystal, which has liquid crystal molecules pretilted by the alignment films, interposed between the pair of substrates and that modulates light; a pair of polarizing films that interposes the liquid crystal panel therebetween; a uniaxial retardation film (so-called C plate) that is disposed between the pair of polarizing films and that maintains uniaxial refractive anisotropy in which a uniaxial optical axis of the uniaxial refractive anisotropy is parallel to a thickness direction; and a first retardation film that is disposed between the pair of polarizing films and that includes (i) a first substrate and (ii) a first deposited film maintaining first refractive anisotropy and being obliquely deposited on the first substrate so that a first optical axis (for example, primary refractive index nx where nx>ny>nz) of the first refractive anisotropy is tilted in a direction in which a variation in characteristic of the light due to the pretilt is canceled.

According to this aspect, the light emitted from a light source is separated into a red beam, a green beam, and a blue beam by a color-separating optical system such as a reflecting mirror and a dichroic mirror. The liquid crystal panel is used as a light valve modulating each of the red beam, the green beam, and the blue beam. In the liquid crystal panel, the alignment states of the liquid crystal molecules of pixels are regulated on the basis of data signals (or image signals) to display an image corresponding to the data signals in a display area thereof. The images displayed by the liquid crystal panels are synthesized by a color-synthesizing optical system such as a dichroic prism and the synthesized image is projected as a projection image onto a projection plane such as a screen through a projection lens.

In the liquid crystal panel, a liquid crystal is interposed between a pair of substrates. The liquid crystal is generally a vertical alignment (VA) type liquid crystal. An alignment film is disposed in each of the pair of substrates and the liquid crystal molecules of the liquid crystal are pretilted by the alignment films in a predetermined direction by a predetermined angle. For example, when the liquid crystal is of the VA type, the liquid crystal molecules is tilted and aligned by a pretilt angle in a constant direction from the normal line of the substrate surface of the pair of substrates. The liquid crystal molecules maintains the pretilt when a voltage is not applied to the liquid crystal panel and is tilted close to the plane direction of the substrate of the liquid crystal panel when a voltage is applied to the liquid crystal panel. Accordingly, it is possible to simply embody a VA type liquid crystal or a normally-black type liquid crystal. The long axis direction of the pretilted liquid crystal molecules and one side of the pair of substrates may form an angle of 45 degrees as viewed in the normal direction of the pair of substrates. The liquid crystal panel is interposed between a pair of polarizing films.

The first retardation film includes (i) the first substrate and (ii) the first deposited film maintaining the first refractive anisotropy and being obliquely deposited on the first substrate so that the first optical axis of the first refractive anisotropy is tilted in a direction in which a variation in characteristic of the light due to the pretilt is canceled. In certain embodiments, the first deposited film of the first retardation film includes an inorganic material. Accordingly, it is possible to effectively prevent the retardation film from being deteriorated due to radiation of light or an increase in temperature accompanied therewith, thereby constructing a liquid crystal device having excellent reliability.

The first refractive anisotropic medium is obliquely deposited as the first deposited film on the first substrate so that the first optical axis of the refractive anisotropic medium of the first retardation film is parallel to a predetermined direction intersecting the long axis direction of the pretilted liquid crystal molecules as viewed in the normal direction of the first substrate. Here, the predetermined direction means a direction in which the first optical axis of the first deposited film intersecting the long axis direction of the liquid crystal molecules extends. Specifically, the predetermine direction which is the direction in which the first optical axis of the first deposited film extends can be individually defined experimentally, theoretically, experientially, or by simulation on the basis of the long axis direction of the liquid crystal molecules so that a level of an optical characteristic of the liquid crystal device such as contrast or viewing angle be a desired value such as the maximum value.

The refractive anisotropic medium is obliquely deposited as the first deposited film on the first substrate so that the first optical axis of the first deposited film intersects the first substrate at a predetermined angle. Here, the predetermined angle means an angle at which the optical axis of the first deposited film and the first substrate intersect each other. In other words, the predetermined angle can be said to be a value obtained by subtracting the angle between the normal line of the first substrate and the optical axis corresponding to the primary refractive index of the refractive anisotropic medium of the first deposited film from 90 degrees. Alternatively, the predetermined angle can be said to be an angle formed by the optical axis corresponding to the primary refractive index of the refractive anisotropic medium of the first deposited film and the predetermined direction. Specifically, the predetermined angle at which the first optical axis of the refractive anisotropic medium of the first deposited film and the first substrate intersect each other can be individually defined experimentally, theoretically, experientially, or by simulation so that a level of an optical characteristic of the liquid crystal device such as contrast or viewing angle be a desired value such as the maximum value.

Accordingly, since the first optical axis of the first deposited film of the first retardation film, that is, the optical axis of the primary refractive index nx of the refractive anisotropic medium, is parallel to a predetermined direction intersecting the long axis direction of the liquid crystal molecules tilted by the pretilt angle, the first optical axis of the first deposited film of the first retardation film compensates for the optical anisotropy of the liquid crystal molecules into the optical isotropy in the plane direction of the first substrate. Since the optical axis of the first retardation film intersects the first substrate by a deposition angle, the first optical axis of the first retardation film compensates for the optical anisotropy of the liquid crystal molecules into the optical isotropy in the vertical plane direction of the first substrate.

In addition, since the direction in which the uniaxial optical axis of the uniaxial retardation film, that is, the optical axis of the primary refractive index nx' (or ny') of the refractive anisotropic medium, extends intersects the long axis direction of the liquid crystal molecules tilted by the pretilt angle, a short axis (that is, an example of the uniaxial optical axis in the claims) and the long axis of the optical axis of the uniaxial retardation film compensates for the optical anisotropy of the liquid crystal molecules into the optical isotropy in the plane direction of the uniaxial retardation film.

That is, since the long axis of the index ellipsoid formed by the liquid crystal molecules, the long axis of the index ellipsoid formed by the first deposited film of the first retardation film, and the long axis of the index ellipsoid formed by the uniaxial retardation film intersect each other, the index ellipsoid formed by three of the liquid crystal molecules, the uniaxial retardation film, and the first retardation film can be made to three-dimensionally approach a refractive index sphere.

Accordingly, the phase difference (in other words, birefringent effect) generated in the liquid crystal can be canceled (that is, compensated for) by the uniaxial retardation film and the first retardation film. As a result, in operating the projector, it is possible to compensate for the phase difference of light generated at the time of allowing the light emitted from the light source to pass through the liquid crystal having the liquid crystal molecules pretilted by the pretilt angle by the use of the uniaxial retardation film and the first retardation film. Therefore, it is possible to prevent the light passing through the liquid crystal panel from being incident on the polarizing film on the light output side with a deviated phase. As a result, the possibility that the light not to be transmitted leaks from the polarizing film on the light output side decreases, thereby preventing a deterioration in contrast or a decrease in viewing angle.

When the optical anisotropy of the liquid crystal molecules is compensated for by tilting the retardation film which has the uniaxial refractive anisotropy and of which the optical axis is parallel to the thickness direction, a space for tilting the retardation film is limited in the liquid crystal device in view of a cooling effect by circulation of air, thereby making it difficult to technically prevent the deterioration in contrast. Alternatively, a mechanism for tilting the retardation film is complicated and it is thus difficult to technically adjust the tilting of the retardation film in the assembly process thereof.

However, in the above-mentioned aspect of the disclosure, the uniaxial optical axis of the uniaxial retardation film is disposed to compensate for the optical anisotropy of the liquid crystal molecules. Particularly, the first deposited film of the first retardation film maintains the first refractive anisotropy and is obliquely deposited on the first substrate so that the first optical axis of the first refractive anisotropy is tilted in the direction in which the variation in characteristic of light due to the pretilt is canceled. The first optical axis of the first deposited film intersects the first substrate in the predetermined direction by the predetermined angle, that is, the deposition angle, so as to compensate for the optical anisotropy of the liquid crystal molecules by the oblique deposition of the refractive anisotropic medium.

Accordingly, by adjusting the direction in which the optical axis of the refractive anisotropy of the first retardation film is tilted by the oblique deposition of the first deposited film and the angle at which the optical axis of the refractive anisotropy of the first retardation film intersects the first substrate, it is possible to easily compensate for the optical anisotropy of the liquid crystal molecules of the liquid crystal panel with high precision.

Accordingly, since the long axis of the index ellipsoid formed by the liquid crystal molecules, the long axis of the index ellipsoid formed by the first deposited film of the first retardation film, and the long axis of the index ellipsoid formed by the uniaxial retardation film intersect each other, the index ellipsoid formed by three of the liquid crystal molecules, the uniaxial retardation film, and the first retardation film can be made to three-dimensionally approach a refractive index sphere. Since it is hardly or never necessary to tilt the uniaxial retardation film and the first retardation film so as to compensate for the optical anisotropy of the liquid crystal molecules of the liquid crystal panel, it is possible to omit the adjustment process of tilting the uniaxial retardation film and the first retardation film in the assembly process, thereby easily compensating for the optical anisotropy of the liquid crystal molecules at low cost and enhancing the contrast. As a result, it is possible to enhance the effect of compensating for the phase difference generated in the liquid crystal by the use of the first retardation film, thereby enhancing the contrast.

As described above, according to the liquid crystal device, by setting the uniaxial optical axis of the uniaxial refractive anisotropy of the uniaxial retardation film as well as adjusting the direction in which the first optical axis of the first refractive anisotropy of the first retardation film is tilted and the angle at which the first optical axis of the first refractive anisotropy of the first retardation film intersects the first substrate by the oblique deposition of the first deposited film, it is possible to satisfactorily compensate for the phase difference generated in the liquid crystal panel by the use of the retardation film. As a result, it is possible to obtain a display with high contrast and high quality.

Since the first retardation film and the uniaxial retardation film can be disposed at another optical position or the uniaxial retardation film can be temporarily separated, it is possible to simply carry out the optical adjustment. Since the first retardation film and the uniaxial retardation film can be set to be different in manufacturing method or material, it is possible to carry out the optical adjustment at low cost.

According to another aspect of the disclosure, there is provided a liquid crystal device including: a liquid crystal panel that includes a pair of substrates, each of which has an alignment film, and a vertically-aligned liquid crystal, which has liquid crystal molecules pretilted by the alignment films, interposed between the pair of substrates and that modulates light; a pair of polarizing films that interposes the liquid crystal panel therebetween; a first retardation film that is disposed between the pair of polarizing films and that includes (i-a) a first substrate and (ii-a) a first deposited film maintaining first refractive anisotropy and being obliquely deposited on the first substrate so that a first optical axis of the first refractive anisotropy is tilted in a first direction in which a variation in characteristic of the light due to the pretilt is canceled; and a second retardation film that is disposed between the pair of polarizing films and that includes (i-b) a second substrate and (ii-b) a second deposited film maintaining second refractive anisotropy and being obliquely deposited on the second substrate so that a second optical axis of the second refractive anisotropy is tilted in a second direction different from the first direction to cancel the variation in characteristic.

According to this aspect of the disclosure, the light emitted from a light source is separated into a red beam, a green beam, and a blue beam by a color-separating optical system such as a reflecting mirror and a dichroic mirror. The liquid crystal panel is used as a light valve modulating each of the red beam, the green beam, and the blue beam. In the liquid crystal panel, the alignment states of the liquid crystal molecules of pixels are regulated on the basis of data signals (or image signals) to display an image corresponding to the data signals in a display area thereof. The images displayed by the liquid crystal panels are synthesized by a color-synthesizing optical system such as a dichroic prism and the synthesized image is projected as a projection image onto a projection plane such as a screen through a projection lens.

In the liquid crystal panel, a liquid crystal is interposed between a pair of substrates. The liquid crystal is generally a vertical alignment (VA) type liquid crystal. An alignment film is disposed in each of the pair of substrates and the liquid crystal molecules of the liquid crystal are pretilted by the alignment films in a predetermined direction by a predetermined angle. Since the liquid crystal is of the VA type, the liquid crystal molecules is tilted and aligned by a pretilt angle in a constant direction from the normal line of the substrate surface of the pair of substrates. The liquid crystal molecules maintains the pretilt when a voltage is not applied to the liquid crystal panel and is tilted close to the plane direction of the substrate of the liquid crystal panel when a voltage is applied to the liquid crystal panel. Accordingly, it is possible to simply embody a normally-black type liquid crystal or a normally white liquid crystal. The long axis direction of the pretilted liquid crystal molecules and one side of the pair of substrates may form an angle of 45 degrees as viewed in the normal direction of the pair of substrates. The liquid crystal panel is interposed between a pair of polarizing films.

The first retardation film includes (i) the first substrate and (ii) the first deposited film maintaining the first refractive anisotropy and being obliquely deposited on the first substrate so that the first optical axis of the first refractive anisotropy is tilted in a direction in which a variation in characteristic of the light due to the pretilt is canceled. In certain embodiments, the deposited film of the first retardation film includes an inorganic material. Accordingly, it is possible to effectively prevent the first retardation film from being deteriorated due to radiation of light or an increase in temperature accompanied therewith, thereby constructing a liquid crystal device having excellent reliability.

The first refractive anisotropic medium is obliquely deposited as the first deposited film on the first substrate so that the first optical axis of the first refractive anisotropic medium of the first retardation film is parallel to a first predetermined direction intersecting the long axis direction of the pretilted liquid crystal molecules as viewed in the normal direction of the first substrate. Here, the predetermined direction means a direction in which the first optical axis of the refractive anisotropic medium intersecting the long axis direction of the liquid crystal molecules extends. Specifically, the first predetermine direction which is the direction in which the first optical axis of the first refractive anisotropic medium extends can be individually defined experimentally, theoretically, experientially, or by simulation on the basis of the long axis direction of the liquid crystal molecules so that a level of an optical characteristic of the liquid crystal device such as contrast or viewing angle be a desired value such as the maximum value.

The first refractive anisotropic medium is obliquely deposited as the first deposited film on the first substrate so that the first optical axis of the first refractive anisotropic medium of the first retardation film intersects the first substrate at a first predetermined angle. Here, the first predetermined angle means an angle at which the optical axis of the first refractive anisotropic medium and the first substrate intersect each other. In other words, the first predetermined angle can be said to be a value obtained by subtracting the angle between the normal line of the first substrate and the optical axis corresponding to the primary refractive index of the first refractive anisotropic medium from 90 degrees. Alternatively, the first predetermined angle can be said to be an angle formed by the first optical axis corresponding to the primary refractive index of the first refractive anisotropic medium and the first predetermined direction. Specifically, the first predetermined angle at which the first optical axis of the first refractive anisotropic medium and the first substrate intersect each other can be individually defined experimentally, theoretically, experientially, or by simulation so that a level of an optical characteristic of the liquid crystal device such as contrast or viewing angle be a desired value such as the maximum value.

On the other hand, the second retardation film includes (i-b) a second substrate and (ii-b) a second deposited film maintaining second refractive anisotropy and being obliquely deposited on the second substrate so that a second optical axis of the second refractive anisotropy is tilted in a second direction different from the first direction to cancel the variation in characteristic.

The second refractive anisotropic medium is obliquely deposited as the second deposited film on the second substrate so that the second optical axis of the second refractive anisotropic medium of the second retardation film is parallel to a second predetermined direction intersecting the long axis direction of the pretilted liquid crystal molecules as viewed in the normal direction of the second substrate. Here, the second predetermined direction means a direction in which the second optical axis of the second refractive anisotropy medium intersecting the long axis direction of the liquid crystal molecules extends. Specifically, the second predetermine direction which is the direction in which the second optical axis of the second deposited film extends can be individually defined experimentally, theoretically, experientially, or by simulation on the basis of the long axis direction of the liquid crystal molecules so that a level of an optical characteristic of the liquid crystal device such as contrast or viewing angle be a desired value such as the maximum value.

The second refractive anisotropic medium is obliquely deposited as the second deposited film on the second substrate so that the second optical axis of the second refractive anisotropic medium of the second retardation film intersects the second substrate at a second predetermined angle. Here, the second predetermined angle means an angle at which the second optical axis of the second refractive anisotropic medium and the second substrate intersect each other. In other words, the second predetermined angle can be said to be a value obtained by subtracting the angle between the normal line of the second substrate and the optical axis corresponding to the primary refractive index of the second refractive anisotropic medium from 90 degree. Alternatively, the second predetermined angle can be said to be an angle formed by the second optical axis corresponding to the primary refractive index of the second refractive anisotropic medium and the second predetermined direction. Specifically, the second predetermined angle at which the second optical axis of the second refractive anisotropic medium and the second substrate intersect each other can be individually defined experimentally, theoretically, experientially, or by simulation so that a level of an optical characteristic of the liquid crystal device such as contrast or viewing angle be a desired value such as the maximum value.

Accordingly, since the optical axis (typically nx' (where nx'>ny'>nz')) of the first retardation film is parallel to a first predetermined direction intersecting the long axis direction of the liquid crystal molecules tilted by the pretilt angle, the optical axis of the first retardation film compensates for the optical anisotropy of the liquid crystal molecules into the optical isotropy in the plane direction of the first substrate. Since the optical axis (typically nx) of the first retardation film intersects the first substrate by a first predetermined angle, the first optical axis of the first retardation film compensates for the optical anisotropy of the liquid crystal molecules into the optical isotropy in the vertical plane direction of the first substrate. That is, since the long axis of the first index ellipsoid formed by the liquid crystal molecules and the long axis of the first index ellipsoid formed by the first retardation film intersect each other, the first index ellipsoid formed by both the liquid crystal molecules and the first retardation film can be made to three-dimensionally approach a refractive index sphere.

Since the optical axis (nx" (where nx">ny">nz")) of the second retardation film is parallel to a second predetermined direction intersecting the long axis direction of the liquid crystal molecules tilted by the pretilt angle, the optical axis of the second retardation film compensates for the optical anisotropy of the liquid crystal molecules into the optical isotropy in the plane direction of the second substrate. Since the optical axis (typically nx) of the second retardation film intersects the second substrate by a second predetermined angle, the second optical axis of the second retardation film compensates for the optical anisotropy of the liquid crystal molecules into the optical isotropy in the vertical plane direction of the first substrate. That is, since the long axis of the second index ellipsoid formed by the liquid crystal molecules and the long axis of the second index ellipsoid formed by the second retardation film intersect each other, the second index ellipsoid formed by both the liquid crystal molecules and the second retardation film can be made to three-dimensionally approach a refractive index sphere.

Accordingly, the phase difference (in other words, birefringent effect) generated in the liquid crystal can be canceled (that is, compensated for) by the first and second retardation films. As a result, in operating the liquid crystal device, it is possible to compensate for the phase difference of light generated at the time of allowing the light emitted from the light source to pass through the liquid crystal having the liquid crystal molecules pretilted by the pretilt angle by the use of the first and second retardation films. Therefore, it is possible to prevent the light passing through the liquid crystal panel from being incident on the polarizing film on the light output side with a deviated phase. As a result, the possibility that the light not to be transmitted leaks from the polarizing film on the light output side decreases, thereby preventing a deterioration in contrast or a decrease in viewing angle.

The first and second retardation films are disposed between a pair of polarizing films. More specifically, the retardation films are disposed between one of the pair of polarizing films and the liquid crystal panel or between the other of the pair of polarizing films and the liquid crystal panel. In other words, the first retardation film is disposed between the pair of polarizing films to be close to a side where light is incident on or output from the liquid crystal panel.

When the optical anisotropy of the liquid crystal molecules is compensated for by tilting the retardation film which has the uniaxial refractive anisotropy and of which the optical axis is parallel to the thickness direction, a space for tilting the retardation film is limited in the liquid crystal device in view of a cooling effect by circulation of air, thereby making it difficult to technically prevent the deterioration in contrast. Alternatively, a mechanism for tilting the retardation film is complicated and it is thus difficult to technically adjust the tilting of the retardation film in the assembly process thereof.

However, in the above-mentioned aspect of the disclosure, the first deposited film of the first retardation film maintains the first refractive anisotropy and is obliquely deposited on the first substrate so that the first optical axis of the first refractive anisotropy is tilted in the first direction in which the variation in characteristic of light due to the pretilt is canceled. The first optical axis of the first refractive anisotropy of the first retardation film intersects the first substrate or the second substrate in the predetermined direction by the first predetermined angle so as to compensate for the optical anisotropy of the liquid crystal molecules by the oblique deposition of the first deposited film. Accordingly, by adjusting the first direction in which the first optical axis of the first refractive anisotropy of the first retardation film is tilted and the first angle at which the first optical axis of the first refractive anisotropy of the first retardation film intersects the first substrate by the oblique deposition of the first deposited film, it is possible to more easily compensate for the optical anisotropy of the liquid crystal molecules of the liquid crystal panel with high precision.

In the above-mentioned aspect of the disclosure, the second deposited film of the second retardation film maintains the second refractive anisotropy and is obliquely deposited on the second substrate so that the optical axis of the second refractive anisotropy is tilted in the second direction which is different from the first direction and in which the variation in characteristic of light due to the pretilt is canceled. The second optical axis of the second refractive anisotropy of the second retardation film intersects the second substrate in the second predetermined direction by the second predetermined angle so as to compensate for the optical anisotropy of the liquid crystal molecules by the oblique deposition of the second deposited film. Accordingly, by adjusting the second direction in which the second optical axis of the second refractive anisotropy of the second retardation film is tilted and the second angle at which the second optical axis of the second refractive anisotropy of the second retardation film intersects the second substrate by the oblique deposition of the first deposited film, it is possible to more easily compensate for the optical anisotropy of the liquid crystal molecules of the liquid crystal panel with high precision.

In this way, since two kinds of retardation films individually compensate for the optical anisotropy of the liquid crystal molecules, it is possible to markedly improve the compensation effect. By adjusting two parameters such as the first direction and the second direction, it is possible to compensate for the optical anisotropy of the liquid crystal molecules with higher precision.

Since it is hardly or never necessary to tilt the first retardation film about the incidence direction of light so as to compensate for the optical anisotropy of the liquid crystal molecules of the liquid crystal panel, it is possible to omit the adjustment process of tilting the retardation films in the assembly process, thereby more easily compensating for the optical anisotropy of the liquid crystal molecules at low cost and enhancing the contrast. As a result, according to the aspect of the disclosure, it is possible to enhance the effect of compensating for the phase difference generated in the liquid crystal by the use of the retardation films, thereby enhancing the contrast.

As described above, according to the liquid crystal device, by adjusting the first direction in which the first optical axis of the first refractive anisotropy of the first retardation film is tilted by the oblique deposition of the first deposited film and the second direction in which the second optical axis of the second refractive anisotropy of the second retardation film is tilted by the oblique deposition of the second deposited film, it is possible to satisfactorily compensate for the phase difference generated in the liquid crystal panel by the use of the first and second retardation films. As a result, it is possible to obtain a display with high contrast and high quality.

According to another aspect of the disclosure, there is provided a liquid crystal device including: a liquid crystal panel that includes a pair of substrates, each of which has an alignment film, and a vertically-aligned liquid crystal, which has liquid crystal molecules pretilted by the alignment films, interposed between the pair of substrates and that modulates light; a pair of polarizing films that interposes the liquid crystal panel therebetween; a first retardation film that is disposed between the pair of polarizing films and that includes (i-a) a first substrate, (ii-a) a vertically-deposited film maintaining uniaxial refractive anisotropy and being vertically deposited on the first substrate so that a uniaxial optical axis of the uniaxial refractive anisotropy is parallel to a thickness direction, and (iii-a) a first deposited film maintaining first refractive anisotropy and being obliquely deposited on the vertically-deposited film so that a first optical axis of the first refractive anisotropy is tilted in a direction in which a variation in characteristic of the light due to the pretilt is canceled; and a second retardation film that is disposed between the pair of polarizing films and that includes (i-b) a second substrate and (ii-b) a second deposited film maintaining second refractive anisotropy and being obliquely deposited on the second substrate so that a second optical axis of the second refractive anisotropy is tilted in a second direction different from the first direction to cancel the variation in characteristic.

According to this aspect of the disclosure, the light emitted from a light source is separated into a red beam, a green beam, and a blue beam by a color-separating optical system such as a reflecting mirror and a dichroic mirror. The liquid crystal panel is used as a light valve modulating each of the red beam, the green beam, and the blue beam. In the liquid crystal panel, the alignment states of the liquid crystal molecules of pixels are regulated on the basis of data signals (or image signals) to display an image corresponding to the data signals in a display area thereof. The images displayed by the liquid crystal panels are synthesized by a color-synthesizing optical system such as a dichroic prism and the synthesized image is projected as a projection image onto a projection plane such as a screen through a projection lens.

In the liquid crystal panel, a liquid crystal is interposed between a pair of substrates. The liquid crystal is a vertical alignment (VA) type liquid crystal. An alignment film is disposed in each of the pair of substrates and the liquid crystal molecules of the liquid crystal are pretilted by the alignment films in a predetermined direction by a predetermined angle. Since the liquid crystal is of the VA type, the liquid crystal molecules is tilted and aligned by a pretilt angle in a constant direction from the normal line of the substrate surface of the pair of substrates. The liquid crystal molecules maintains the pretilt when a voltage is not applied to the liquid crystal panel and is tilted close to the plane direction of the substrate of the liquid crystal panel when a voltage is applied to the liquid crystal panel. Accordingly, it is possible to simply embody a normally-black type liquid crystal or a normally-white type liquid crystal. The long axis direction of the pretilted liquid crystal molecules and one side of the pair of substrates may form an angle of 45 degree as viewed in the normal direction of the pair of substrates. The liquid crystal panel is interposed between a pair of polarizing films.

The vertically-deposited film of the first retardation film maintains the uniaxial refractive anisotropy and is vertically deposited on the first substrate so that the uniaxial optical axis of the uniaxial refractive anisotropy is parallel to the thickness direction. The first deposited film of the first retardation film maintains the first refractive anisotropy and is obliquely deposited on the vertically-deposited film so that the first optical axis of the first refractive anisotropy is tilted in the direction in which the variation in characteristic of light due to the pretilt is canceled. In certain embodiments, the first deposited film or the vertically-deposited film of the first retardation film includes an inorganic material. Accordingly, it is possible to more effectively prevent the first retardation film from being deteriorated due to radiation of light or an increase in temperature accompanied therewith, thereby constructing a liquid crystal device having excellent reliability.

The first refractive anisotropic medium is obliquely deposited as the first deposited film on the first substrate so that the first optical axis of the first refractive anisotropic medium of the first retardation film is parallel to a first predetermined direction intersecting the long axis direction of the pretilted liquid crystal molecules as viewed in the normal direction of the first substrate. Here, the first predetermined direction means a direction in which the first optical axis of the first refractive anisotropic medium intersecting the long axis direction of the liquid crystal molecules extends. Specifically, the first predetermine direction which is the direction in which the first optical axis of the first refractive anisotropic medium extends can be individually defined experimentally, theoretically, experientially, or by simulation on the basis of the long axis direction of the liquid crystal molecules so that a level of an optical characteristic of the liquid crystal device such as contrast or viewing angle be a desired value such as the maximum value.

The first refractive anisotropic medium is obliquely deposited as the first deposited film on the first substrate so that the first optical axis of the first refractive anisotropic medium of the first retardation film intersects the first substrate at a first predetermined angle. Here, the first predetermined angle means an angle at which the optical axis of the first refractive anisotropic medium and the first substrate intersect each other. In other words, the first predetermined angle can be said to be a value obtained by subtracting the angle between the normal line of the first substrate and the optical axis corresponding to the primary refractive index of the first refractive anisotropic medium from 90 degree. Alternatively, the first predetermined angle can be said to be an angle formed by the first optical axis corresponding to the primary refractive index of the first refractive anisotropic medium and the first predetermined direction. Specifically, the first predetermined angle at which the first optical axis of the first refractive anisotropic medium of the first deposited film and the first substrate intersect each other can be individually defined experimentally, theoretically, experientially, or by simulation so that a level of an optical characteristic of the liquid crystal device such as contrast or viewing angle be a desired value such as the maximum value.

That is, since the long axis of the index ellipsoid formed by the liquid crystal molecules, the long axis of the index ellipsoid formed by the first deposited film of the first retardation film, and the long axis of the index ellipsoid formed by the vertically-deposited film of the first retardation film intersect each other, the index ellipsoid formed by three of the liquid crystal molecules, the vertically-deposited film, and the first retardation film can be made to three-dimensionally approach a refractive index sphere.

On the other hand, the second retardation film includes (i-b) a second substrate and (ii-b) a second deposited film maintaining second refractive anisotropy and being obliquely deposited on the second substrate so that a second optical axis of the second refractive anisotropy is tilted in a second direction different from the first direction to cancel the variation in characteristic.

The second refractive anisotropic medium is obliquely deposited as the second deposited film on the second substrate so that the second optical axis of the second refractive anisotropic medium of the second retardation film is parallel to a second predetermined direction intersecting the long axis direction of the pretilted liquid crystal molecules as viewed in the normal direction of the second substrate. Here, the second predetermined direction means a direction in which the second optical axis of the second refractive anisotropy medium intersecting the long axis direction of the liquid crystal molecules extends. Specifically, the second predetermine direction which is the direction in which the second optical axis of the second deposited film extends can be individually defined experimentally, theoretically, experientially, or by simulation on the basis of the long axis direction of the liquid crystal molecules so that a level of an optical characteristic of the liquid crystal device such as contrast or viewing angle be a desired value such as the maximum value.

The second refractive anisotropic medium is obliquely deposited as the second deposited film on the second substrate so that the second optical axis of the second refractive anisotropic medium of the second retardation film intersects the second substrate at a second predetermined angle. Here, the second predetermined angle means an angle at which the second optical axis of the second refractive anisotropic medium and the second substrate intersect each other. In other words, the second predetermined angle can be said to be a value obtained by subtracting the angle between the normal line of the second substrate and the optical axis corresponding to the primary refractive index of the second refractive anisotropic medium from 90 degree. Alternatively, the second predetermined angle can be said to be an angle formed by the second optical axis corresponding to the primary refractive index of the second refractive anisotropic medium and the second predetermined direction. Specifically, the second predetermined angle at which the second optical axis of the second refractive anisotropic medium and the second substrate intersect each other can be individually defined experimentally, theoretically, experientially, or by simulation so that a level of an optical characteristic of the liquid crystal device such as contrast or viewing angle be a desired value such as the maximum value.

Accordingly, since the first optical axis (typically nx' (where nx'>ny'>nz')) of the first retardation film is parallel to a first predetermined direction intersecting the long axis direction of the liquid crystal molecules tilted by the pretilt angle, the optical axis of the first retardation film compensates for the optical anisotropy of the liquid crystal molecules into the optical isotropy in the plane direction of the first substrate. Since the optical axis (nx') of the first retardation film intersects the first substrate by a first predetermined angle, the first optical axis of the first retardation film compensates for the optical anisotropy of the liquid crystal molecules into the optical isotropy in the vertical plane direction of the first substrate. That is, since the long axis of the first index ellipsoid formed by the liquid crystal molecules and the long axis of the first index ellipsoid formed by the first retardation film intersect each other, the first index ellipsoid formed by both the liquid crystal molecules and the first retardation film can be made to three-dimensionally approach a refractive index sphere.

Since the second optical axis (nx" (where nx">ny">nz")) of the second retardation film is parallel to a second predetermined direction intersecting the long axis direction of the liquid crystal molecules tilted by the pretilt angle, the optical axis of the second retardation film compensates for the optical anisotropy of the liquid crystal molecules into the optical isotropy in the plane direction of the second substrate. Since the optical axis (nx") of the second retardation film intersects the second substrate by a second predetermined angle, the second optical axis of the second retardation film compensates for the optical anisotropy of the liquid crystal molecules into the optical isotropy in the vertical plane direction of the first substrate. That is, since the long axis of the second index ellipsoid formed by the liquid crystal molecules and the long axis of the second index ellipsoid formed by the second retardation film intersect each other, the second index ellipsoid formed by both the liquid crystal molecules and the second retardation film can be made to three-dimensionally approach a refractive index sphere.

Accordingly, the phase difference (in other words, birefringent effect) generated in the liquid crystal can be canceled (that is, compensated for) by the first and second retardation films. As a result, in operating the liquid crystal device, it is possible to compensate for the phase difference of light generated at the time of allowing the light emitted from the light source to pass through the liquid crystal having the liquid crystal molecules pretilted by the pretilt angle by the use of the first and second retardation films. Therefore, it is possible to prevent the light passing through the liquid crystal panel from being incident on the polarizing film on the light output side with a deviated phase. As a result, the possibility that the light not to be transmitted leaks from the polarizing film on the light output side decreases, thereby preventing a deterioration in contrast or a decrease in viewing angle.

The first and second retardation films are disposed between a pair of polarizing films. More specifically, the retardation films are disposed between one of the pair of polarizing films and the liquid crystal panel or between the other of the pair of polarizing films and the liquid crystal panel. In other words, the first retardation film is disposed between the pair of polarizing films to be close to a side where light is incident on or output from the liquid crystal panel.

When the optical anisotropy of the liquid crystal molecules is compensated for by tilting the retardation film which has the uniaxial refractive anisotropy and of which the optical axis is parallel to the thickness direction, a space for tilting the retardation film is limited in the liquid crystal device in view of a cooling effect by circulation of air, thereby making it difficult to technically prevent the deterioration in contrast. Alternatively, a mechanism for tilting the retardation film is complicated and it is thus difficult to technically adjust the tilting of the retardation film in the assembly process thereof.

In the aspect of the disclosure, as described above, since the direction in which the uniaxial optical axis of the uniaxial refractive anisotropy of the vertically-deposited of the first retardation film, that is, the optical axis of the primary refractive index nxc' (or nyc') of the refractive anisotropic medium, extends intersects the long axis direction of the liquid crystal molecules tilted by the pretilt angle, the short axis (that is, an example of the uniaxial optical axis in the claims) and the long axis of the optical axis of the vertically-deposited film of the first retardation film compensates for the optical anisotropy of the liquid crystal molecules into the optical isotropy in the plane direction of the vertically-deposited film (or the first substrate).

However, in the aspect of the disclosure, as described above, the first deposited film of the first retardation film maintains the first refractive anisotropy and is obliquely deposited on the first substrate so that the first optical axis of the first refractive anisotropy is tilted in the first direction in which the variation in characteristic of light due to the pretilt is canceled. The first optical axis of the first refractive anisotropy of the first retardation film intersects the first substrate or the second substrate in the predetermined direction by the first predetermined angle so as to compensate for the optical anisotropy of the liquid crystal molecules by the oblique deposition of the first deposited film. Accordingly, by adjusting the first direction in which the first optical axis of the first refractive anisotropy of the first retardation film is tilted and the first angle at which the first optical axis of the first refractive anisotropy of the first retardation film intersects the first substrate by the oblique deposition of the first deposited film, it is possible to easily compensate for the optical anisotropy of the liquid crystal molecules of the liquid crystal panel with high precision.

In the above-mentioned aspect of the disclosure, the second deposited film of the second retardation film maintains the second refractive anisotropy and is obliquely deposited on the second substrate so that the optical axis of the second refractive anisotropy is tilted in the second direction which is different from the first direction and in which the variation in characteristic of light due to the pretilt is canceled. The second optical axis of the second refractive anisotropy of the second retardation film intersects the second substrate in the second predetermined direction by the second predetermined angle so as to compensate for the optical anisotropy of the liquid crystal molecules by the oblique deposition of the second deposited film. Accordingly, by adjusting the second direction in which the second optical axis of the second refractive anisotropy of the second retardation film is tilted and the second angle at which the second optical axis of the second refractive anisotropy of the second retardation film intersects the second substrate by the oblique deposition of the second deposited film, it is possible to easily compensate for the optical anisotropy of the liquid crystal molecules of the liquid crystal panel with high precision.

Particularly, since three kinds of refractive anisotropy of the first uniaxial refractive anisotropy, the first refractive anisotropy, and the second refractive anisotropy individually compensate for the optical anisotropy of the liquid crystal molecules, it is possible to markedly improve the compensation effect. By adjusting three parameters of the uniaxial refractive index, the first direction, and the second direction, it is possible to compensate for the optical anisotropy of the liquid crystal molecules with higher precision.

Since it is hardly or never necessary to tilt the first retardation film about the incidence direction of light so as to compensate for the optical anisotropy of the liquid crystal molecules of the liquid crystal panel, it is possible to omit the adjustment process of tilting the retardation films in the assembly process, thereby easily compensating for the optical anisotropy of the liquid crystal molecules at low cost and enhancing the contrast. As a result, according to the aspect of the disclosure, it is possible to enhance the effect of compensating for the phase difference generated in the liquid crystal by the use of the retardation films, thereby enhancing the contrast.

According to the liquid crystal device as described above, by adjusting the uniaxial refractive index of the vertically-deposited film, the first direction in which the first optical axis of the first refractive anisotropy of the first retardation film is tilted by the oblique deposition of the first deposited film, and the second direction in which the second optical axis of the second refractive anisotropy of the second retardation film is tilted by the oblique deposition of the second deposited film, it is possible to satisfactorily compensate for the phase difference generated in the liquid crystal panel by the use of the first and second retardation films. As a result, it is possible to obtain a display with higher contrast and quality.

In the liquid crystal device, a front phase difference which is a phase difference in a frontal direction as viewed from a light output side of the first retardation film may be set by a refractive index (nx) in an X axis direction, a refractive index (ny) in an Y axis direction, a refractive index (nz) in a Z axis direction, and a thickness of the first retardation film where the first optical axis is the X axis.

According to this configuration, the front phase difference is adjusted by changing the plural parameters. Accordingly, in the process of mounting the liquid crystal device on the projector by changing the plural parameters to greatly change the front phase difference generated by the first retardation film, the rotation angle of the first retardation film can be limited to a predetermined range (for example, ±5 degree) at the time of setting allowable contrast with high precision by rotating the first retardation film using the light incident direction as the rotation axis. Accordingly, since the first retardation film is rotated within the limited range, it is possible to more simply adjust the maximum contrast.

In the liquid crystal device, the first refractive anisotropy may have such a magnitude relation that a refractive index (nx) in an X axis direction is greater than a refractive index (ny) in an Y axis direction and the refractive index in the Y axis direction is greater than a refractive index (nz) in a Z axis direction where the first optical axis is the X axis.

According to this configuration, by adjusting the direction in which the optical axis in the X axis direction of the first refractive anisotropy is tilted in the first retardation film by the oblique deposition of the first deposited film and the angle at which the optical axis in the X axis direction of the first refractive anisotropy intersects the first substrate, it is possible to enhance the component in the direction perpendicular to the long axis direction of the liquid crystal molecules. As a result, it is possible to allow the index ellipsoid formed by both the liquid crystal molecules and the first retardation film to three-dimensionally approach a refractive index sphere.

In the liquid crystal device, the first retardation film may be disposed so that a side thereof on which the first substrate is disposed is closer to the liquid crystal panel than a side on which the first substrate is not disposed.

According to this configuration, by disposing the light incidence side in the first substrate side of the first retardation film or disposing the first retardation film on the incidence side or the output side of the liquid crystal panel, and by adjusting the direction in which the first optical axis of the first refractive anisotropy of the first retardation film is tilted and the angle at which the first optical axis of the first refractive anisotropy of the first retardation film intersects the first substrate by the oblique deposition of the first deposited film, it is possible to more easily compensate for the optical anisotropy of the liquid crystal molecules of the liquid crystal panel with high precision.

In the liquid crystal device, the first retardation film may be disposed so that a side on which the first substrate is disposed is closer to one of the pair of polarizing films than a side on which the first substrate is not disposed.

According to this configuration, by disposing the light incidence side in the first substrate side of the first retardation film or disposing the first retardation film on the incidence side or the output side of the liquid crystal panel, and by adjusting the direction in which the first optical axis of the first refractive anisotropy of the first retardation film is tilted and the angle at which the first optical axis of the first refractive anisotropy of the first retardation film intersects the first substrate by the oblique deposition of the first deposited film, it is possible to easily compensate for the optical anisotropy of the liquid crystal molecules of the liquid crystal panel with high precision.

In the liquid crystal device, a pair of transmission axes of the pair of polarizing films may be perpendicular to each other and form an angle of 45 degree about a long axis direction of the pretilted liquid crystal molecules as viewed in the normal direction of the first substrate, and the first optical axis in the first retardation film may be parallel to one of the pair of transmission axes.

According to this configuration, it is possible to more simply attach the first retardation film to the liquid crystal device.

In the liquid crystal device, the thickness of the uniaxial retardation film and the refractive index in the thickness direction of the uniaxial retardation film may be set so that a phase difference is 20 nm or less (for example, 10 to 20 nm) where a polar angle indicating an angle of a sight line is 30 degree when the sight line from the just front surface of one of the pair of polarizing films located on a light output side is 0 degree.

According to this configuration, it is possible to adjust the phase difference due to the uniaxial retardation film with high precision.

In the liquid crystal device, the uniaxial retardation film may be disposed more apart from the liquid crystal panel than the first retardation film.

In general, in the process of manufacturing the uniaxial retardation film such as a C plate, minute bubbles are generated and are included in the uniaxial retardation film. However, according to this configuration, the uniaxial retardation film is disposed to be more apart from the liquid crystal panel than the first retardation film. Accordingly, it is possible markedly reduce the degree of focusing the bubbles included in the uniaxial retardation film. As a result, it is possible to effectively prevent the bubbles included in the uniaxial retardation film from being projected to badly affect a projection image.

According to another aspect of the disclosure, there is provided a liquid crystal device including: a liquid crystal panel that includes a pair of substrates, each of which has an alignment film, and a vertically-aligned liquid crystal, which has liquid crystal molecules pretilted by the alignment films, interposed between the pair of substrates and that modulates light; a pair of polarizing films that interposes the liquid crystal panel therebetween; and a first retardation film that is disposed between the pair of polarizing films and that includes (i) a first substrate, (ii) a vertically-deposited film maintaining uniaxial refractive anisotropy and being vertically deposited on the first substrate so that a uniaxial optical axis of the uniaxial refractive anisotropy is parallel to the thickness direction, and (iii) a first deposited film maintaining first refractive anisotropy and being obliquely deposited on the vertically-deposited film so that a first optical axis of the first refractive anisotropy is tilted in a direction in which a variation in characteristic of the light due to the pretilt is canceled.

According to this aspect of the disclosure similarly to the above-mentioned liquid crystal device, the light emitted from a light source is separated into a red beam, a green beam, and a blue beam by a color-separating optical system such as a reflecting mirror and a dichroic mirror. The liquid crystal panel is used as a light valve modulating each of the red beam, the green beam, and the blue beam. In the liquid crystal panel, the alignment states of the liquid crystal molecules of pixels are regulated on the basis of data signals (or image signals) to display an image corresponding to the data signals in a display area thereof. The images displayed by the liquid crystal panels are synthesized by a color-synthesizing optical system such as a dichroic prism and the synthesized image is projected as a projection image onto a projection plane such as a screen through a projection lens.

The vertically-deposited film of the first retardation film maintains the uniaxial refractive anisotropy and is vertically deposited on the first substrate so that the uniaxial optical axis of the uniaxial refractive anisotropy is parallel to the thickness direction. The first deposited film of the first retardation film maintains the first refractive anisotropy and is obliquely deposited on the vertically-deposited film so that the first optical axis of the first refractive anisotropy is tilted in the direction in which the variation in characteristic of light due to the pretilt is canceled.

The first retardation film is disposed between a pair of polarizing films. More specifically, the first retardation film is disposed between one of the pair of polarizing films and the liquid crystal panel or between the other of the pair of polarizing films and the liquid crystal panel. In other words, the first retardation film is disposed between the pair of polarizing films to be close to a side where light is incident on or output from the liquid crystal panel.

The refractive anisotropic medium is obliquely deposited as the first deposited film on the vertically-deposited film so that the first optical axis of the refractive anisotropic medium constituting the first deposited film of the first retardation film is parallel to a predetermined direction intersecting the long axis direction of the pretilted liquid crystal molecules as viewed in the normal direction of the first substrate.

The refractive anisotropic medium is obliquely deposited as the first deposited film on the vertically-deposited film so that the first optical axis of the first deposited film intersects the first substrate at a predetermined angle.

Accordingly, since the first optical axis of the first deposited film of the first retardation film, that is, the optical axis of the primary refractive index nx of the refractive anisotropic medium, is parallel to a predetermined direction intersecting the long axis direction of the liquid crystal molecules tilted by the pretilt angle, the first optical axis of the first deposited film of the first retardation film compensates for the optical anisotropy of the liquid crystal molecules into the optical isotropy in the plane direction of the vertically-deposited film (or the first substrate). Since the optical axis (nx) of the first retardation film intersects the vertically-deposited film (or the first substrate) at the deposition angle, the first optical axis of the first retardation film compensates for the optical anisotropy of the liquid crystal molecules into the optical isotropy in the vertical plane direction of the vertically-deposited film.

As described above, since the direction in which the uniaxial optical axis of the vertically-deposited of the first retardation film, that is, the optical axis of the primary refractive index nx' (or ny') of the refractive anisotropic medium, extends intersects the long axis direction of the liquid crystal molecules tilted by the pretilt angle, the short axis (that is, an example of the uniaxial optical axis in the claims) and the long axis of the optical axis of the vertically-deposited film of the first retardation film compensates for the optical anisotropy of the liquid crystal molecules into the optical isotropy in the plane direction of the vertically-deposited film (or the first substrate).

That is, since the long axis of the index ellipsoid formed by the liquid crystal molecules, the long axis of the index ellipsoid formed by the first deposited film of the first retardation film, and the long axis of the index ellipsoid formed by the vertically-deposited film of the first retardation film intersect each other, the index ellipsoid formed by three of the liquid crystal molecules, the vertically-deposited film, and the first retardation film can be made to three-dimensionally approach a refractive index sphere.

Accordingly, the phase difference (in other words, birefringent effect) generated in the liquid crystal can be canceled (that is, compensated for) by the first retardation film. As a result, in operating the projector, it is possible to compensate for the phase difference of light generated at the time of allowing the light emitted from the light source to pass through the liquid crystal having the liquid crystal molecules pretilted by the pretilt angle by the use of the first retardation film. Therefore, it is possible to prevent the light passing through the liquid crystal panel from being incident on the polarizing film on the light output side with a deviated phase. As a result, the possibility that the light not to be transmitted leaks from the polarizing film on the light output side decreases, thereby preventing a deterioration in contrast or a decrease in viewing angle.

When the optical anisotropy of the liquid crystal molecules is compensated for by tilting the retardation film which has the uniaxial refractive anisotropy and of which the optical axis is parallel to the thickness direction, a space for tilting the retardation film is limited in the liquid crystal device in view of a cooling effect by circulation of air, thereby making it difficult to technically prevent the deterioration in contrast. Alternatively, a mechanism for tilting the retardation film is complicated and it is thus difficult to technically adjust the tilting of the retardation film in the assembly process thereof.

In the aspect of the disclosure, as described above, the uniaxial optical axis of the vertically-deposited film of the first retardation film is vertically deposited on the first substrate so as to compensate for the optical anisotropy of the liquid crystal molecules. Particularly, as described above, the first deposited film of the first retardation film maintains the first refractive anisotropy and is obliquely deposited on the first substrate so that the first optical axis of the first refractive anisotropy is tilted in the direction in which the variation in characteristic of light due to the pretilt is canceled. The first optical axis of the first deposited film intersects the first substrate in the predetermined direction, that is, the deposition direction by the predetermined angle, that is, the deposition angle, so as to compensate for the optical anisotropy of the liquid crystal molecules by the oblique deposition of the refractive anisotropic medium.

Accordingly, by adjusting the direction in which the optical axis of the refractive anisotropy of the first retardation film is tilted and the angle at which the optical axis of the refractive anisotropy of the first retardation film intersects the first substrate by the oblique deposition of the first deposited film, it is possible to easily compensate for the optical anisotropy of the liquid crystal molecules of the liquid crystal panel with high precision.

That is, since the long axis of the index ellipsoid formed by the liquid crystal molecules, the long axis of the index ellipsoid formed by the first deposited film of the first retardation film, and the long axis of the index ellipsoid formed by the vertically-deposited film of the first retardation film intersect each other, the index ellipsoid formed by three of the liquid crystal molecules, the vertically-deposited film, and the first retardation film can be made to three-dimensionally approach a refractive index sphere. Since it is hardly or never necessary to tilt the first retardation film about the incidence direction of light so as to compensate for the optical anisotropy of the liquid crystal molecules of the liquid crystal panel, it is possible to omit the adjustment process of tilting the first retardation film in the assembly process, thereby more easily compensating for the optical anisotropy of the liquid crystal molecules at low cost and enhancing the contrast. As a result, according to the aspect of the disclosure, it is possible to enhance the effect of compensating for the phase difference generated in the liquid crystal by the use of the first retardation film, thereby enhancing the contrast.

As described above, according to the liquid crystal device, by adjusting the direction in which the optical axis of the refractive anisotropy of the first retardation film is tilted and the angle at which the first optical axis of the first refractive anisotropy of the first retardation film intersects the first substrate by the oblique deposition of the first deposited film and in addition vertically depositing the vertically-deposited film of the first retardation film, it is possible to satisfactorily compensate for the phase difference generated in the liquid crystal panel by the use of the first and second retardation films. As a result, it is possible to obtain a display with higher contrast and quality.

The liquid crystal device according to this aspect can properly employ the configurations of the liquid crystal devices according to the above-mentioned aspects.

According to another aspect of the disclosure, there is provided a liquid crystal device including: a liquid crystal panel that includes a pair of substrates, each of which has an alignment film, and a vertically-aligned liquid crystal, which has liquid crystal molecules pretilted by the alignment films, interposed between the pair of substrates and that modulates light; a pair of polarizing films that interposes the liquid crystal panel therebetween; and a first retardation film that is disposed between the pair of polarizing films and that includes (i) a first substrate, (ii) a vertically-deposited film maintaining uniaxial refractive anisotropy and being vertically deposited on one surface of the first substrate so that a uniaxial optical axis of the uniaxial refractive anisotropy is parallel to the thickness direction, and (iii) a first deposited film maintaining first refractive anisotropy and being obliquely deposited on the other surface of the first substrate so that a first optical axis of the first refractive anisotropy is tilted in a direction in which a variation in characteristic of the light due to the pretilt is canceled.

When the vertically-deposited film such as a C plate is formed on the obliquely-deposited first deposited film by a sputtering method, or when the first deposited film is formed on the vertically-deposited film $1501c$ such as a C plate by an oblique deposition method, moisture is mixed into the vertically-deposited film, thereby causing a technical problem that the quality of the vertically-deposited film is deteriorated.

On the contrary, according to this configuration, the vertically-deposited film such as a C plate is formed on one surface of the first substrate and the first deposited film is formed on the other surface of the first substrate. Accordingly, at the time of forming the vertically-deposited film such as a C plate by the sputtering method, the degree of mixing moisture into the vertically-deposited film can be reduced, thereby further improving the quality of the vertically-deposited film.

In the liquid crystal device, the vertically-deposited film may be disposed more apart from the liquid crystal panel than the first deposited film.

In general, in the process of manufacturing the vertically-deposited film such as a C plate, minute bubbles are generated and are included in the vertically-deposited film. However, according to this configuration, the vertically-deposited film is disposed to be more apart from the liquid crystal panel than the first deposited film. Accordingly, it is possible markedly reduce the degree of focusing the bubbles included in the vertically-deposited film. As a result, it is possible to effectively prevent the bubbles included in the vertically-deposited film from being projected to badly affect a projection image.

In the liquid crystal device, at least the first refractive anisotropy may be biaxial. At least the first refractive anisotropy of the first refractive anisotropy and the second refractive anisotropy is biaxial.

According to this configuration, by adjusting the direction in which the first optical axis of the biaxial first refractive anisotropy is tilted in the first retardation film by the oblique deposition of the first deposited film and the angle at which the first optical axis of the first refractive anisotropy of the first retardation film intersects the first substrate, it is possible to enhance the component in the direction perpendicular to the long axis direction of the liquid crystal molecules. As a result, it is possible to allow the index ellipsoid formed by both the liquid crystal molecules and the first retardation film to three-dimensionally approach a refractive index sphere.

In the liquid crystal device, the first direction and the second direction may have a position relation that the long axis direction of the pretilted liquid crystal molecules is interposed therebetween and in addition or instead, a relation angle that is an angle formed by the first direction and the second direction is in the range of 70 to 110 degrees.

According to this configuration, it is possible to enlarge the angle at which the long axis direction of the liquid crystal molecules interests the first optical axis of the first refractive anisotropy extending in the first direction and to enlarge the angle at which the long axis direction of the liquid crystal molecules intersects the second optical axis of the second refractive anisotropy extending in the second direction. Accordingly, since the index ellipsoid formed by the liquid crystal molecules and the first and second retardation films can be made to three-dimensionally approach the refractive index sphere, it is possible to properly compensate for the optical anisotropy of the liquid crystal molecules into the optical isotropy, thereby obtaining a display with high contrast and high quality.

In addition or instead, the refractive anisotropy formed by combining the first refractive anisotropy and the second refractive anisotropy can be set to be biaxial. According to the inventor's study, it is proved that higher contrast can be embodied at the relation angle in the range of 70 to 110 degree and ideally at 90 degree. As a result, it is possible to properly compensate for the optical anisotropy of the liquid crystal molecules into the optical isotropy, thereby obtaining a display with high contrast and high quality.

In the liquid crystal device, the first refractive anisotropy may have such a magnitude relation that a refractive index in an X axis direction is greater than a refractive index in an Y axis direction and the refractive index in the Y axis direction is greater than a refractive index in a Z axis direction where the first optical axis is the X axis, and the second refractive anisotropy may have such a magnitude relation that a refractive index in an X axis direction is greater than a refractive index in an Y axis direction and the refractive index in the Y axis direction is greater than a refractive index in a Z axis direction where the second optical axis is the Y axis According to this configuration, by adjusting the second direction in which the optical axis in the X axis direction of the second refractive anisotropy in the second retardation film in addition to or instead of the first direction in which the optical axis in the X axis direction of the first refractive anisotropy in the first retardation film, it is possible to enhance the component in the direction perpendicular to the long axis direction of the liquid crystal molecules. As a result, it is possible to allow the index ellipsoid formed by the liquid crystal molecules and the first and second retardation films to three-dimensionally approach a refractive index sphere.

In the liquid crystal device, a first front phase difference that is a phase difference in a frontal direction of the first retardation film and a second front phase difference that is a phase difference in the frontal direction of the second retardation film may be different from each other.

According to this configuration, since two kinds of retardation films individually compensate for the optical anisotropy of the liquid crystal molecules, it is possible to markedly improve the compensation effect. By adjusting more physical quantities of the first front phase difference and the second front phase difference in addition to two parameters of the first direction and the second direction, it is possible to compensate for the optical anisotropy of the liquid crystal molecules with higher precision. The first front phase difference can be set on the basis of the thickness of the first retardation film and the second front phase difference can be set on the basis of the thickness of the second retardation film.

In the process of mounting the liquid crystal device on the projector by greatly changing the front phase difference that is a phase difference in the frontal direction of one of the pair of polarizing films located on the light output side and that is influenced by the first front phase difference and the second front phase difference different from the first front phase difference, the rotation angle of the retardation films can be limited to a predetermined range (for example, ±5 degree) at the time of setting allowable contrast with high precision by rotating the retardation films using the light incident direction as the rotation axis. Accordingly, since the retardation films are rotated within the limited range, it is possible to more simply adjust the maximum contrast in view of the functionality of the projector.

In the liquid crystal device, a pair of transmission axes of the pair of polarizing films may be perpendicular to each other and form an angle of 45 degree about a long axis direction of the pretilted liquid crystal molecules as viewed in the normal direction of the first substrate or the second substrate, the first optical axis in the first retardation film may be parallel to one of the pair of transmission axes, and the second optical axis in the second retardation film may be parallel to the other of the pair of transmission axes.

According to this configuration, it is possible to simply attach the first and second retardation films to the liquid crystal device.

In the liquid crystal device, the thickness of the vertically-deposited film and the refractive index in the thickness direction of the vertically-deposited film may be set so that a phase difference is 20 nm or less (for example, 10 to 20 nm) where a polar angle indicating an angle of a sight line is 30 degree when the sight line from the just front surface of one of the pair of polarizing films located on a light output side is 0 degrees.

According to this configuration, it is possible to adjust the phase difference due to the vertically-deposited film with high precision.

According to another aspect of the disclosure, there is provided a liquid crystal device including: a liquid crystal panel that includes a pair of substrates, each of which has an alignment film, and a vertically-aligned liquid crystal, which has liquid crystal molecules pretilted by the alignment films, interposed between the pair of substrates and that modulates light; a pair of polarizing films that interposes the liquid crystal panel therebetween; a first retardation film that is disposed between the pair of polarizing films and that includes (i-a) a first substrate and (ii-a) a first deposited film maintaining first refractive anisotropy and being obliquely deposited on the first substrate so that a first optical axis of the first refractive anisotropy is tilted in a first direction in which a variation in characteristic of the light due to the pretilt is canceled; a second retardation film that is disposed between the pair of polarizing films and that includes (i-b) a second substrate and (ii-b) a second deposited film maintaining second refractive anisotropy and being obliquely deposited on the second substrate so that a second optical axis of the second refractive anisotropy is tilted in a second direction different from the first direction to cancel the variation in characteristic of light due to the pretilt; and a uniaxial retardation film (for example, a C plate) that is disposed between the pair of polarizing films and that maintains uniaxial refractive anisotropy, in which a uniaxial optical axis of the uniaxial refractive anisotropy is parallel to the thickness direction.

According to this aspect of the disclosure similarly to the above-mentioned liquid crystal device, the light emitted from a light source is separated into a red beam, a green beam, and a blue beam by a color-separating optical system such as a reflecting mirror and a dichroic mirror. The liquid crystal panel is used as a light valve modulating each of the red beam, the green beam, and the blue beam. In the liquid crystal panel, the alignment states of the liquid crystal molecules of pixels are regulated on the basis of data signals (or image signals) to display an image corresponding to the data signals in a display area thereof. The images displayed by the liquid crystal panels are synthesized by a color-synthesizing optical system such as a dichroic prism and the synthesized image is projected as a projection image onto a projection plane such as a screen through a projection lens.

Particularly, the first retardation film is disposed between the pair of polarizing films and includes (i-a) a first substrate and (ii-a) a first deposited film maintaining first refractive anisotropy and being obliquely deposited on the first substrate so that a first optical axis of the first refractive anisotropy is tilted in a first direction in which a variation in characteristic of the light due to the pretilt is canceled. The second retardation film is disposed between the pair of polarizing films and includes (i-b) a second substrate and (ii-b) a second deposited film maintaining second refractive anisotropy and being obliquely deposited on the second substrate so that a second optical axis of the second refractive anisotropy is tilted in a second direction different from the first direction to cancel the variation in characteristic of light due to the pretilt. The uniaxial retardation film is disposed between the pair of polarizing films and maintains uniaxial refractive anisotropy, in which a uniaxial optical axis of the uniaxial refractive anisotropy is parallel to the thickness direction.

As described above, according to the liquid crystal device, the direction in which the first optical axis of the first refractive anisotropy of the first retardation film is tilted and the angle at which the first optical axis intersects the first substrate are adjusted by the oblique deposition of the first deposited film. The direction in which the second optical axis of the second refractive anisotropy of the second retardation film is tilted and the angle at which the second optical axis intersects the second substrate are adjusted by the oblique deposition of the second deposited film. Since the uniaxial optical axis of the uniaxial refractive anisotropy of the uniaxial retardation film is parallel to the thickness direction, it is possible to satisfactorily compensate for the phase difference generated in the liquid crystal panel by the use of the first and second retardation films and the uniaxial retardation film. As a result, it is possible to obtain a display with high contrast and high quality.

Since the first retardation film, the second retardation film, and the uniaxial retardation film can be disposed at different optical positions or at least one of the first and second retardation films and the uniaxial retardation film can be temporarily separated, it is possible to simply carry out the optical adjustment. Since the first and second retardation films and the uniaxial retardation film can be set to be different in manufacturing method or material, it is possible to carry out the optical adjustment at low cost.

The liquid crystal device according to this aspect can properly employ the configurations of the liquid crystal devices according to the above-mentioned embodiments.

According to another aspect of the disclosure, there is provided a liquid crystal device including: a liquid crystal panel that includes a pair of substrates, each of which has an alignment film, and a vertically-aligned liquid crystal, which has liquid crystal molecules pretilted by the alignment films, interposed between the pair of substrates and that modulates light; a pair of polarizing films that interposes the liquid crystal panel therebetween; a first retardation film that is disposed between the pair of polarizing films and that includes (i-a) a first substrate, (ii-a) a vertically-deposited film maintaining uniaxial refractive anisotropy and being vertically deposited on one surface of the first substrate so that a uniaxial optical axis of the uniaxial refractive anisotropy is parallel to a thickness direction, and (iii-a) a first deposited film maintaining first refractive anisotropy and being obliquely deposited on the other surface of the first substrate so that a first optical axis of the first refractive anisotropy is tilted in a first direction in which a variation in characteristic of the light due to the pretilt is canceled; and a second retardation film that is disposed between the pair of polarizing films and that includes (i-b) a second substrate and (ii-b) a second deposited film maintaining second refractive anisotropy and being obliquely deposited on the second substrate so that a second optical axis of the second refractive anisotropy is tilted in a second direction different from the first direction to cancel the variation in characteristic.

When the vertically-deposited film such as a C plate is formed on the obliquely-deposited first deposited film by a sputtering method, or when the first deposited film is formed on the vertically-deposited film $1501c$ such as a C plate by an oblique deposition method, moisture is mixed into the vertically-deposited film, thereby causing a technical problem that the quality of the vertically-deposited film is deteriorated.

On the contrary, according to this configuration, the vertically-deposited film such as a C plate is formed on one surface of the first substrate and the first deposited film is formed on the other surface of the first substrate. Accordingly, at the time of forming the vertically-deposited film such as a C plate by the sputtering method, the degree of mixing moisture into the vertically-deposited film can be reduced, thereby further improving the quality of the vertically-deposited film.

In the liquid crystal device, at least the first deposited film may include an inorganic material.

According to this configuration, by using the inorganic material such as $Ta_2O_5$, it is possible to effectively prevent the first retardation film from being deteriorated due to the radiation of light or an increase in temperature accompanied therewith, thereby constructing a liquid crystal device having excellent reliability. At least the first deposited film of the first deposited film and the second deposited film may include an inorganic material.

In the liquid crystal device, at least the first retardation film may be rotatable using the normal direction of the first retardation film as a rotation axis.

According to this configuration, by rotating the first retardation film about the normal direction to adjust the direction in which the first optical axis of the first refractive anisotropy of the first retardation film is tilted and the angle at which the first optical axis of the first refractive anisotropy of the first retardation film intersects the first substrate, it is possible to easily compensate for the optical anisotropy of the liquid crystal molecules of the liquid crystal panel with high precision. At least the first retardation film of the first retardation film and the second retardation film may be rotatable about the normal direction of the first retardation film. Alternatively, the second retardation film may be rotatable about the normal direction of the second retardation film.

In the liquid crystal device, in addition to or instead of the thickness of the first deposited film, an deposition angle that is an angle at which the first deposited film is obliquely deposited may be set so that (i) a front phase difference that is a phase difference in a frontal direction as viewed from the light output side of the first retardation film is in a first predetermined range and (ii) a ratio of a first phase difference generated when the light is incident in a first direction parallel to a deposition direction that is different from the normal direction of the first retardation film and that is a direction in which the first deposited film is deposited and a second phase difference generated when the light is incident in a second direction that is symmetric to the first direction about the normal direction is in a second predetermined range.

According to this configuration, in addition to or instead of the thickness of the first deposited film, an deposition angle that is an angle at which the first deposited film is obliquely deposited may be set so that (i) a front phase difference that is a phase difference in a frontal direction as viewed from the light output side of the first retardation film is in a predetermined range. In addition to or instead of the thickness of the first deposited film, the deposition angle is set so that (ii) a ratio of a first phase difference generated when the light is incident in a first direction parallel to a deposition direction that is different from the normal direction of the first retardation film and that is a direction in which the first deposited film is deposited and a second phase difference generated when the light is incident in a second direction that is symmetric to the first direction about the normal direction is in a second predetermined range. Here, the first predetermined range means a range of front phase difference individually defined theoretically, experimentally, experientially, or by simulation so as to enhance the contrast of light output from the liquid crystal device. The second predetermined range means a range of a ratio of the first phase difference and the second phase difference individually defined theoretically, experimentally, experientially, or by simulation so as to enhance the contrast of light output from the liquid crystal device. In the second deposited film as well as the first deposited film, the first predetermined range and the second predetermined range may be satisfied.

As a result, by setting the deposition angle in addition to or instead of the thickness of the first deposited film to a proper value depending on the first front phase difference in the first predetermined range and the ratio of the first phase difference and the second phase difference in the second predetermined range, it is possible to simply embody the first retardation film capable of improving the contrast in the liquid crystal device. In other words, by defining the property or performance of the first retardation film by the use of more variables or parameters such as the variables or parameters directly defining the property or performance of the first retardation film in addition to the variables or parameters directly defining the property or performance of the first retardation film, it is possible to improve the contrast of the liquid crystal device with high precision.

In the liquid crystal device, the thickness and the deposition angle may be set (i) so that a variation in contrast per unit rotation angle at the time of rotating the first retardation film about the normal direction increases as the front phase difference increases and in addition or instead, may set (ii) so that the variation in contrast per unit rotation angle decreases as the front phase difference decreases.

According to this configuration, the range of adjustment angle of the desired first retardation film (for example, at least the first retardation film of the first retardation film and the second retardation film) can be more simply and properly determined in the process of assembling the projector or in a user's adjustment action by setting the front phase difference to a proper value as well as setting the above-mentioned ratio of the first phase difference and the second phase difference, which may be advantageous in practice. When the thickness and the deposition angle are set in the process of assembling the projector so that the variation in contrast per unit rotation angle at the time of rotating the first retardation film about the normal direction thereof increases as the front phase difference increases, the variation in contrast is great and thus the variation can be accurately and rapidly detected. Accordingly, it is possible to rapidly set the rotation angle of the first retardation film capable of embodying the maximum contrast. Alternatively, when the thickness and the deposition angle are set in the user's adjustment action so that the variation in contrast per unit rotation angle decreases as the front phase difference decreases, the variation in contrast is small and thus the rotation angle of the first retardation film capable of embodying the maximum contrast may be widely detected. Accordingly, it is possible to more simply determine and set the rotation angle of the first retardation film capable of the maximum contrast by the user's vision.

According to another aspect of the disclosure, there is provided a projector including: the above-mentioned liquid crystal device; a light source emitting the light; and a projecting optical system projecting the modulated light.

According to the projector, the light emitted from a light source is separated into a red beam, a green beam, and a blue beam by a color-separating optical system such as a reflecting mirror and a dichroic mirror. The liquid crystal panel is used as a light valve modulating each of the red beam, the green beam, and the blue beam. In the liquid crystal panel, the alignment states of the liquid crystal molecules of pixels are regulated on the basis of data signals (or image signals) to display an image corresponding to the data signals in a display area thereof. In the projecting optical system, he images displayed by the liquid crystal panels are synthesized by a color-synthesizing optical system such as a dichroic prism and the synthesized image is projected as a projection image onto a projection plane such as a screen through a projection lens.

Substantially similarly to the above-mentioned liquid crystal device, by adjusting the direction in which the first optical axis of the first refractive anisotropy of the first retardation film is tilted and the angle at which the first optical axis of the first refractive anisotropy of the first retardation film intersects the first substrate by the oblique deposition of the first deposited film of the first retardation film, it is possible to satisfactorily compensate for the phase difference generated in the liquid crystal panel by the use of the first retardation film. As a result, in the projector, it is possible to obtain a display with higher contrast and quality.

The projector according to this aspect may properly employ the configurations of the liquid crystal devices according to the above-mentioned embodiments.

According to another aspect of the disclosure, there is provided an optical compensation method of performing an optical compensation operation on the liquid crystal device (which includes various configurations described above), the optical compensation method including: rotating at least the first retardation film using a normal direction of the first retardation film as a rotation axis; and rotating at least one of the pair of polarizing films using the normal direction as a rotation axis.

According to the optical compensation method, in the process of attaching the light source, the polarizing films, and the first retardation film to the liquid crystal device, at least the first retardation film of the first retardation film and the second retardation film is rotated about the normal direction of the liquid crystal panel which is a light incidence direction. Accordingly, it is possible to adjust the relative position relation between the first optical axis of the first retardation film and the long axis direction of the liquid crystal molecules, thereby embodying higher contrast. By adjusting the front phase difference of the first retardation film, the rotation angle of the first retardation film is limited to a predetermined range and the first retardation film is rotated within the limited predetermined range, thereby simply adjusting the contrast.

In the process of attaching the light source, the polarizing films, and the first retardation film to the liquid crystal device, a pair of polarizing films is rotated about the normal direction of the first retardation film. Accordingly, it is possible to simply embody a vertical alignment type liquid crystal or a normally black type liquid crystal.

The optical compensation method of a liquid crystal device according to this aspect can properly employ the configurations of the liquid crystal devices according to the above-mentioned embodiments.

According to another aspect of the disclosure, there is provided a retardation film used along with a liquid crystal panel including a pair of substrates, each of which has an alignment film, and a vertically-aligned liquid crystal, which has liquid crystal molecules pretilted by the alignment films, interposed between the pair of substrates and modulating light and a pair of polarizing films interposing the liquid crystal panel therebetween, the retardation film being disposed between the pair of polarizing films, the retardation film including: (i) a first substrate; and (ii) a first deposited film maintaining first refractive anisotropy and obliquely deposited on the first substrate so that a first optical axis of the first refractive anisotropy is tilted in a direction in which a variation in characteristic of the light due to the pretilt is canceled.

According to the retardation film, substantially similarly to the above-mentioned liquid crystal device, by adjusting the direction in which the first optical axis of the first refractive anisotropy of the retardation film is tilted and the angle at which the first optical axis of the first refractive anisotropy of the retardation film intersects the first substrate by the oblique deposition of the first deposited film of the retardation film, it is possible to satisfactorily compensate for the phase difference generated in the liquid crystal panel by the use of the first retardation film. As a result, in the projector, it is possible to obtain a display with high contrast and high quality.

The retardation film according to this aspect can properly employ the configurations of the liquid crystal devices according to the above-mentioned aspects.

According to another aspect of the disclosure, there is provided a retardation film used along with a liquid crystal panel including a pair of substrates, each of which has an alignment film, and a vertically-aligned liquid crystal, which has liquid crystal molecules pretilted by the alignment films, interposed between the pair of substrates and modulating light and a pair of polarizing films interposing the liquid crystal panel therebetween, the retardation film being disposed between the pair of polarizing films, the retardation film including: (i) a first substrate; (ii) a vertically-deposited film maintaining uniaxial refractive anisotropy and vertically deposited on the first substrate so that a uniaxial optical axis of the uniaxial refractive anisotropy is parallel to a thickness direction; and (iii) a first deposited film maintaining first refractive anisotropy and obliquely deposited on the vertically-deposited film so that a first optical axis of the first refractive anisotropy is tilted in a direction in which a variation in characteristic of the light due to the pretilt is canceled.

According to this retardation film, substantially similarly to the above-mentioned liquid crystal device, by adjusting the direction in which the optical axis of the refractive anisotropy of the retardation film is tilted and the angle at which the first optical axis of the first refractive anisotropy of the retardation film intersects the first substrate by the oblique deposition of the first deposited film and in addition vertically depositing the vertically-deposited film of the retardation film, it is possible to satisfactorily compensate for the phase difference generated in the liquid crystal panel by the use of the first retardation film. As a result, in the projector, it is possible to obtain a display with high contrast and high quality.

The second retardation film according to this aspect can properly employ the configurations of the liquid crystal devices according to the above-mentioned embodiments.

Operations and various benefits will be more clearly understood from the following description of non-exhaustive embodiments.

BRIEF DESCRIPTION OF THE DRAWINGS

Various embodiments of the disclosure are described with reference to the accompanying drawings, wherein like reference numbers refer to like elements.

FIG. 1 is a diagram schematically illustrating a configuration of a liquid crystal projector according to a first embodiment of the disclosure.

FIG. 3 is a diagram illustrating a configuration of a liquid crystal light valve according to the first embodiment.

FIG. 11 is a diagram schematically illustrating a liquid crystal light valve according to a second embodiment of the disclosure.

FIGS. 17A to 17I are diagrams schematically illustrating arrangements of constituent members of a liquid crystal light valve according to the second embodiment.

FIG. 25 is a diagram illustrating a configuration of a liquid crystal light valve according to a fourth embodiment of the disclosure.

FIG. 28 is a diagram illustrating a configuration of a liquid crystal light valve according to a sixth embodiment of the disclosure.

FIG. 29 is a diagram illustrating a configuration of a liquid crystal light valve according to a seventh embodiment of the disclosure.

DESCRIPTION OF EXEMPLARY EMBODIMENTS

Figure 2A:
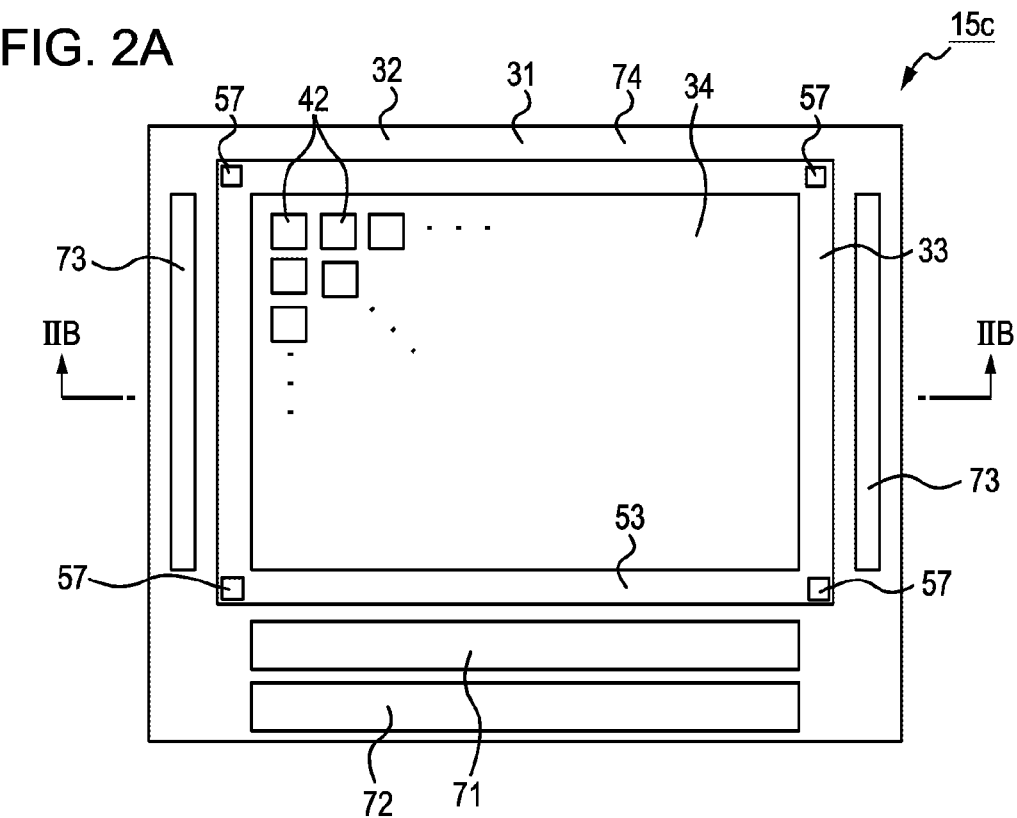
FIGS. 2A and 2B are a diagram illustrating an entire configuration of a liquid crystal panel according to the first embodiment and a diagram illustrating a sectional configuration taken along line IIB-IIB' of FIG. 2A, respectively.

In the following description, reference is made to the accompanying drawings which form a part hereof, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

First Embodiment

FIG. 1 is a diagram schematically illustrating a configuration of a liquid crystal projector according to a first embodiment of the disclosure. A projector 10 is a front projection type projector projecting an image onto a screen 11 disposed in the front. The projector 10 includes a light source 12, dichroic mirrors 13 and 14, liquid crystal light valves 15 to 17, a projecting optical system 18, a cross dichroic prism 19, and a relay system 20.

The light source 12 employs an extra high pressure mercury lamp supplying light including a red beam, a green beam, and a blue beam. The dichroic mirror 13 is configured to transmit a red beam LR from the light source 12 and to reflect a green beam LG and a blue beam LB. The dichroic mirror 14 is configured to transmit the blue beam LB of the green beam LG and the blue beam LB reflected by the dichroic mirror 13 and to reflect the green beam LG. Accordingly, the dichroic mirrors 13 and 14 constitutes a color-separating optical system separating the light emitted from the light source 12 into the red beam LR, the green beam LG, and the blue beam LB. An integrator 21 and a polarization converting element 22 are disposed 12 between the dichroic mirror 13 and the light source 12 sequentially from the light source. The integrator 21 uniformizes an intensity distribution of the light emitted from the light source 12. The polarization converting element 22 converts the light from the light source into polarized light having a specific vibration direction such as S polarized light.

The liquid crystal light valve 15 is a transmissive liquid crystal device (electro-optical device) modulating the red beam LR transmitted by the dichroic mirror 13 and reflected by a reflecting mirror 23 on the basis of an image signal. The liquid crystal light valve 15 includes a first polarizing film 15b, a liquid crystal panel 15c, a first retardation film 15a, a second retardation film 15e, and a second polarizing film 15d.

The red beam LR incident on the liquid crystal light valve 15 is converted into the S polarized beam while passing through the first polarizing film 15b. The liquid crystal panel 15c converts the incident S polarized beam into P polarized beam (a circularly-polarized beam or an elliptically-polarized beam in halftone) by modulation based on the image signal. The second polarizing film 15d is a polarizing film blocking S polarized beam and transmitting P polarized light. Accordingly, the liquid crystal light valve 15 is configured to modulate the red beam LR on the basis of the image signal and to emit the modulated red beam LR to the cross dichroic prism 19.

The liquid crystal light valve 16 is a transmissive liquid crystal device modulating the green beam LG reflected by the dichroic mirror 13 and then reflected by the dichroic mirror 14 on the basis of the image signal and emitting the modulated green beam LG to the cross dichroic prism 19. Similarly to the liquid crystal light valve 15, the liquid crystal light valve 16 includes a first polarizing film 16b, a liquid crystal panel 16c, a first retardation film 16a, a second retardation film 16e, and a second polarizing film 16d.

The liquid crystal light valve 17 is a transmissive liquid crystal device modulating the blue beam LB reflected by the dichroic mirror 13, transmitted by the dichroic mirror 14, and passing through the relay system 20 on the basis of the image signal and emitting the modulated blue light LB to the cross dichroic prism 19. Similarly to the liquid crystal light valves 15 and 16, the liquid crystal light valve 17 includes a first polarizing film 17b, a liquid crystal panel 17c, a first retardation film 17a, a second retardation film 17e, and a second polarizing film 17d.

The relay system 20 includes relay lenses 24a and 24b and reflecting mirrors 25a and 25b. The relay lenses 24a and 24b are disposed to prevent the loss of light due to a long optical path of the blue beam LB. The relay lens 24a is disposed between the dichroic mirror 14 and the reflecting mirror 25a. The relay lens 24b is disposed between the reflecting mirrors 25a and 25b. The reflecting mirror 25a is disposed to reflect the blue beam LB transmitted by the dichroic mirror 14 and emitted from the relay lens 24a to the relay lens 24b. The reflecting mirror 25b is disposed to reflect the blue light LB emitted from the relay lens 24b to the liquid crystal light valve 17.

The cross dichroic prism 19 is a color-synthesizing optical system in which two dichroic films 19a and 19b are perpendicularly disposed in an X shape. The dichroic film 19a reflects the blue beam LB and transmits the green beam LG. The dichroic film 19b reflects the red beam LR and transmits the green beam LG. Accordingly, the cross dichroic prism 19 is configured to synthesize the red beam LR, the green beam LG, and the blue beam LB modulated by the liquid crystal light valves 15 to 17, respectively, and to emit the synthesized beam to the projecting optical system 18. The projecting optical system 18 includes a projection lens (not shown) and is configured to project the beam synthesized by the cross dichroic prism 19 onto the screen 11.

A configuration may be employed in which a $\lambda/2$ wave plate is disposed in the liquid crystal light valves 15 and 17 for red and blue, the beams incident on the cross dichroic prism 19 from the liquid crystal light valves 15 and 17 are converted into S polarized beams, and the beam incident on the cross dichroic prism 19 from the liquid crystal light valve 16 is converted into a P polarized beam by not disposing a $\lambda/2$ wave plate in the liquid crystal light valve 16. The beams incident on the cross dichroic prism 19 are set to different kinds of beams to form an optimized color-synthesizing optical system in consideration of reflecting characteristics of the dichroic films 19a and 19b. Since the dichroic films 19a and 19b are generally excellent in reflecting characteristic of the S polarized beam, the read beam LR and the blue beam LB reflected by the dichroic films 19a and 19b can be set to the S polarized beam as described above and the green beam LG passing through the dichroic films 19a and 19b can be set to the P polarized beam.

Liquid Crystal Light Valve

The liquid crystal light valves (liquid crystal devices) 15 to 17 will be described now.

The liquid crystal light valves 15 to 17 have the same basic configuration, except for the wavelength region of light modulated thereby. Accordingly, the liquid crystal panel 15c and the liquid crystal light valve 15 having the liquid crystal panel will be representatively described in the following.

Figure 2B:
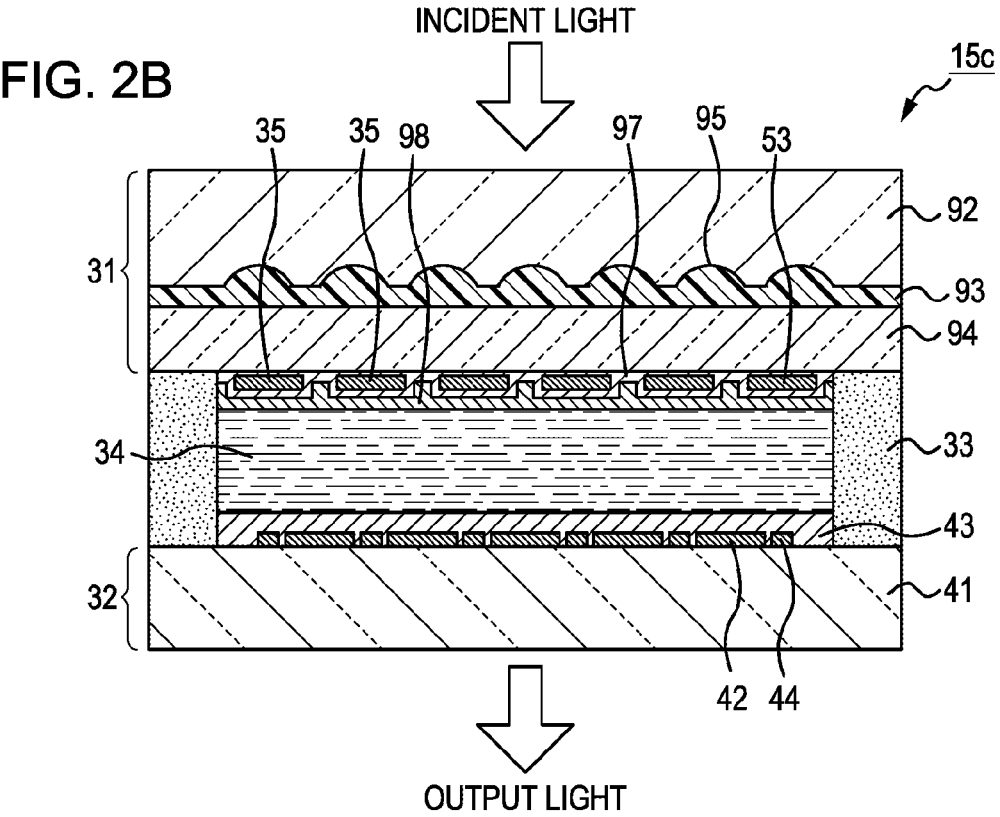
Figure 4:
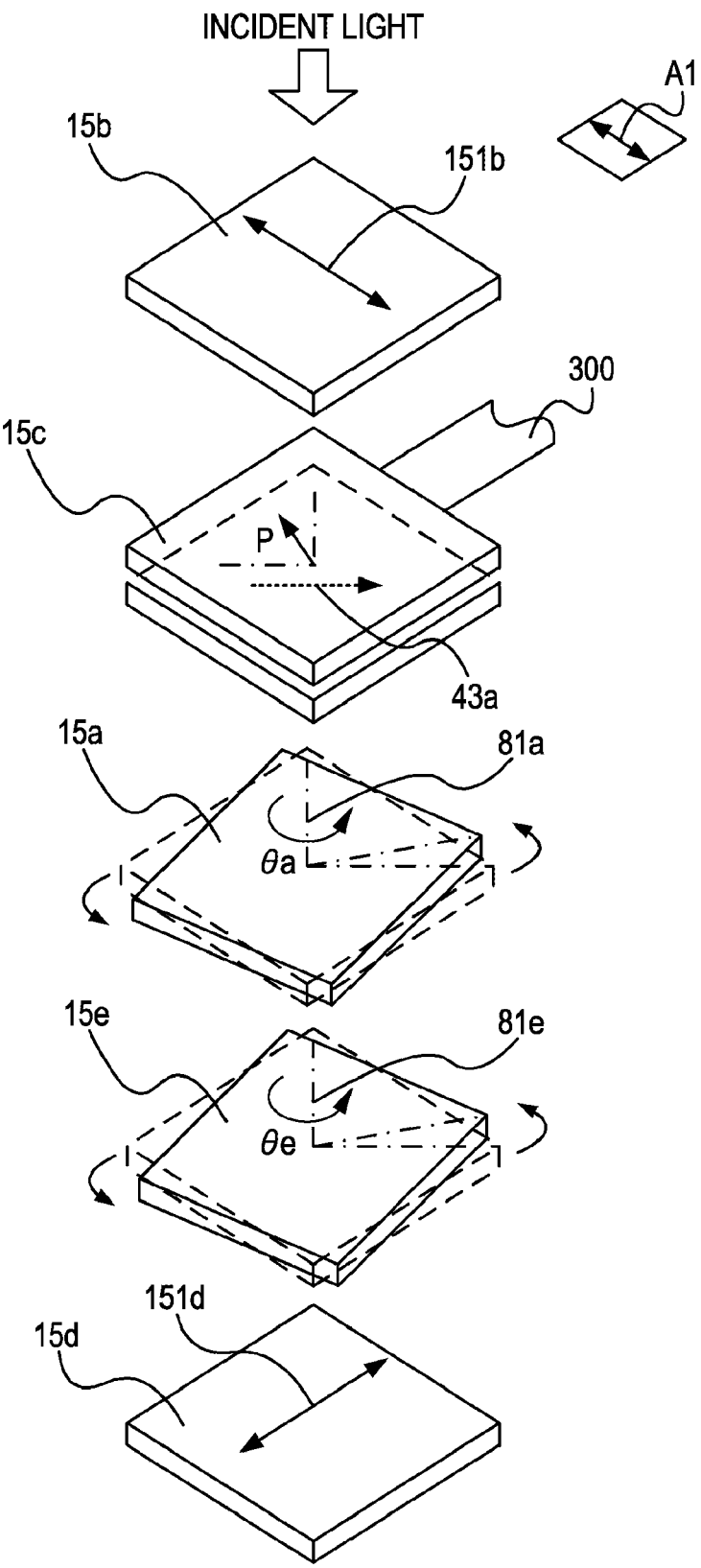
FIG. 4 is a diagram illustrating an arrangement of optical axes of constituent members in FIG. 3 according to the first embodiment.

FIGS. 2A and 2B are a diagram illustrating an entire configuration of the liquid crystal panel according to this embodiment and a diagram illustrating a sectional configuration taken along line IIB-IIB' of FIG. 2A, respectively. FIG. 3 is a diagram illustrating a configuration of a liquid crystal light valve according to this embodiment. FIG. 4 is a diagram illustrating an arrangement of optical axes of constituent members in FIG. 3.

The liquid crystal panel 15c includes a counter substrate 31 and a TFT array substrate 32 opposed to each other as shown in FIG. 2 and both substrates are bonded to each other with a sealing member 33 interposed therebetween. A liquid crystal layer 34 is enclosed in an area surrounded by the counter substrate 31, the TFT array substrate 32, and the sealing member 33. The liquid crystal layer 34 includes a liquid crystal having negative dielectric anisotropy and the liquid crystal panel 15c according to this embodiment has a configuration in which liquid crystal molecules 51 are vertically aligned between the alignment films 43 and 98 with a predetermined slope (pretilt angle) as shown in FIG. 3.

The liquid crystal panel 15c has the liquid crystal layer 34 enclosed in the area defined by the TFT array substrate 32, the counter substrate 31, and the sealing member 33. Light blocking films 35 serving as frames or peripheral edges are formed in the formation area of the sealing member 33 in the liquid crystal panel 15c. Inter-substrate conductive members 57 for electrical connection between the TFT array substrate 32 and the counter substrate 31 are disposed in outer corners of the sealing member 33.

A data line driver circuit 71, an external circuit mounting terminal 75, and two scanning line driver circuits 73 are formed in an area of the TFT array substrate 32 outside the formation area of the sealing member 33 in the plan view. Plural wires 74 connecting the scanning line driver circuits 73 disposed on both sides of the image display area are formed in the area of the TFT array substrate 32. Instead of forming the data line driver circuit 71 and the scanning line driver circuits 73 on the TFT array substrate 32, a tape automated bonding (TAB) substrate mounted with a driving LSI and a terminal group formed in the peripheral section of the TFT array substrate 32 may be electrically and mechanically connected to each other with an anisotropic conductive film interposed therebetween.

As shown in FIG. 2B, the counter substrate 31 is a micro lens substrate (light concentrating substrate) including plural micro lenses two-dimensionally arranged. The counter substrate 31 mainly includes a substrate 92, a resin layer 93, and a cover glass 94.

The substrate 92 and the cover glass 94 are transparent substrates formed of glass and substrates formed of quartz, borosilicate glass, soda-lime glass (blue sheet glass), crown glass (white sheet glass), or the like may be used. Plural concave portions (micro lenses) 95 are formed on a side (lower side in the drawing) of the substrate 92 close to the liquid crystal layer 34. The micro lenses 95 serve to concentrate light incident on the substrate 92 from the opposite side of the liquid crystal layer 34 and to emit the concentrated light to the liquid crystal layer 34.

The resin layer 93 is a layer formed of a resin material filled in the micro lenses 95 of the substrate 92 and is formed a light-transmittable resin material such as acryl resins. The resin layer 93 is disposed to cover one surface of the substrate 92 and to fill the concave portions of the micro lenses 95. The top surface of the resin layer 93 is flat and the cover glass 94 is bonded to the flat surface.

Light blocking films 35, a common electrode 97, and an alignment film 98 are formed on a surface of the micro lens substrate 36 close to the liquid crystal layer 34. The light blocking films 35 are formed on the cover glass 94 to form a substantially lattice shape in a plan view. The micro lenses 95 are located between the light blocking films 35 and are disposed in areas overlapping with pixel areas (formation areas of pixel electrodes 42) of the liquid crystal panel 15c in a plan view. The alignment film 98 is a vertical alignment film aligning the liquid crystal molecules of the liquid crystal layer 34 to be substantially perpendicular to the substrate surface and is formed, for example, a silicon oxide film formed with a column-like structure by oblique deposition or a polyimide film subjected to an alignment process.

The TFT array substrate 32 mainly includes a transparent substrate 41 formed of glass or quartz, pixel electrodes 42 formed on a surface of the substrate 41 close to the liquid crystal layer 34, TFTs 44 driving the pixel electrodes, and an alignment film 43.

The pixel electrodes 42 are conductive films formed of a transparent conductive material such as ITO with a substantially rectangular shape in a plan view, are arranged in a matrix in a plan view on the substrate 41, and are formed in the areas overlapping with the micro lenses 95 in a plan view as shown in FIG. 2A.

The TFTs 44 are simply shown, but are formed on the substrate 41 to correspond to the pixel electrodes 42, and are usually disposed in the areas (non-display areas, light blocking areas) overlapping with the light blocking films 35 of the counter substrate 31 in a plan view.

The alignment film 43 formed to cover the pixel electrodes 42 is a vertical alignment film formed of a silicon oxide film formed by oblique deposition, similarly to the alignment film 98.

The alignment films 43 and 98 are formed to that alignment directions thereof (alignment directions of column-like structures) are substantially parallel to each other in a plan view and serve to substantially vertically align the liquid crystal molecules of the liquid crystal layer 34 with a predetermined slope about the substrate surface and to uniformize the slope of the liquid crystal molecules in the substrate in-plane direction.

Data lines (not shown) or scanning lines (not shown) connecting the pixel electrodes 42 or the TFTs 44 are formed in the area on the surface of the substrate 41, which is close to the liquid crystal layer 34, inside the formation area of the sealing member 33 in a plan view. The data lines and the scanning lines are formed in the area overlapping with the light blocking films 35 in a plan view. The areas of which the edge is defined by the light blocking films 35, the TFTs 44, the data lines, and the scanning lines serve as pixel areas of the liquid crystal panel 15c. Plural pixel areas are arranged in a matrix in a plan view to form an image display area.

Polarizing Film and First and Second Retardation Film

As shown in FIG. 3, the liquid crystal light valve 15 includes the liquid crystal panel 15c, a first polarizing film 15b disposed outside the counter substrate 31 of the liquid crystal panel 15c, a first retardation film 15a disposed outside the TFT array substrate 32, a second retardation film 15e disposed outside the first retardation film 15a, and a second polarizing film 15d disposed outside the second retardation film 15e.

In the liquid crystal light valve 15 according to this embodiment, a side (upper side in the drawing) on which the first polarizing film 15b is disposed is a light incidence side and a side on which the second polarizing film 15d is disposed is a light output side.

In the liquid crystal panel 15c, the alignment films 43 and 98 opposed to each other with the liquid crystal layer interposed therebetween are formed by depositing silicon oxide in a tilt direction which is deviated by 50° from the normal direction of the substrate. The thicknesses thereof both are about 40 nm. The alignment directions 43a and 98a indicated by arrows in the alignment films 43 and 98 shown in FIG. 3 are parallel to the substrate in-plane direction of the deposition directions at the time formation. The alignment direction 43a of the alignment film 43 and the alignment direction 98a of the alignment film 98 are parallel to each other.

By the alignment control force of the alignment films 43 and 98, the liquid crystal molecules 51 are aligned in a state where the liquid crystal molecules are tilted by 2° to 8° from the normal line of the substrate and the direction of a director (pretilt direction P) of the liquid crystal molecules is parallel the alignment directions 43a and 98a in the substrate in-plane direction.

The first polarizing film 15b and the second polarizing film 15d both have a three-layered structure in which a polarizing element 151 formed of dyed polyvinyl alcohol (PVA) is interposed between two protective films 152 formed of triacetyl cellulose (TAC). As shown in FIG. 4, the transmission axis 151b of the first polarizing film 15b and the transmission axis 151d of the second polarizing film 15d are disposed to perpendicular to each other. The directions of the transmission axes 151b and 151d of the polarizing films 15b and 15d are deviated from the alignment direction (deposition direction) 43a of the alignment film 43 of the liquid crystal panel 15c by about 45° in a plan view.

The first retardation film 15a includes (i) a first substrate 1501a, (ii) a vertically-deposited film 1501c formed by vertically depositing a refractive anisotropic medium 255c maintaining uniaxial refractive anisotropy thereon, (iii) a first deposited film 1503a formed by obliquely depositing a refractive anisotropic medium maintaining first refractive anisotropy thereon, and (iv) a third substrate 1502a.

Primary refractive indexes in an optical axis direction of an index ellipsoid of the refractive anisotropic medium 255a are shown aside the first deposited film 1503a of the first retardation film 15a in FIG. 3. In this embodiment, the primary refractive indexes nx', ny', and nz' satisfy a relation of nx'>ny'>nz'. That is, the refractive index nx' in the direction tilted from the normal direction of the substrate 1501a or the substrate 1502a is greater than the refractive indexes ny' and nz' in the other directions and thus the index ellipsoid has a rice grain shape.

An average index ellipsoid of the refractive anisotropic medium 255c of the vertically-deposited film 1501c is schematically shown aside the vertically-deposited film 1501c of the first retardation film 15a in FIG. 3. In the drawing, nxc' and nyc' represent primary refractive indexes in the in-plane direction of the vertically-deposited film 1501c and nzc' represents a primary refractive index in the thickness direction of the vertically-deposited film 1501c. In this embodiment, the primary refractive indexes nxc', nyc', and nzc' satisfy a relation of nxc'=nyc'>nzc'. That is, the refractive index nzc' in the thickness direction is smaller than the refractive indexes in the other directions and thus the index ellipsoid has a disk shape. The index ellipsoid of the refractive anisotropic medium 255c is aligned to be parallel to the surface of the vertically-deposited film 1501c and the optical axis direction (short axis direction of the index ellipsoid) of the vertically-deposited film 1501c is parallel to the normal direction of the surface.

The second retardation film 15e includes (i) a second substrate 1501e, (ii) a second deposited film 1503e formed by obliquely depositing a refractive anisotropic medium 255e maintaining refractive anisotropy thereon, and (iii) a fourth substrate 1502e. Primary refractive indexes in the optical axis direction of an index ellipsoid of the refractive anisotropic medium 255e are shown aside the second retardation film 15e in FIG. 3. In this embodiment, the primary refractive indexes nx", ny", and nz" satisfy a relation of nx">ny">nz". That is, the refractive index nx" in the direction tilted from the normal direction of the fourth substrate 1502e of the second substrate 1501e is greater than the refractive indexes ny" and nz" in the other directions and thus the index ellipsoid has a rice grain shape.

Particularly, in certain embodiments, as viewed in the normal direction of the second retardation film 15e (or the first retardation film 15a), the tilted direction of the optical axis of the primary refractive index nx" of the second retardation film 15e and the tilted direction of the optical axis of the primary refractive index nx' of the first retardation film 15a are perpendicular to each other. Details of the first retardation film 15a and the second retardation film 15e will be described later.

Specifically, a representative example of the refractive anisotropic medium 255a (or the refractive anisotropic medium 255e) is a biaxial plate.

Detailed Configuration of First and Second Retardation Films

Figure 5A:
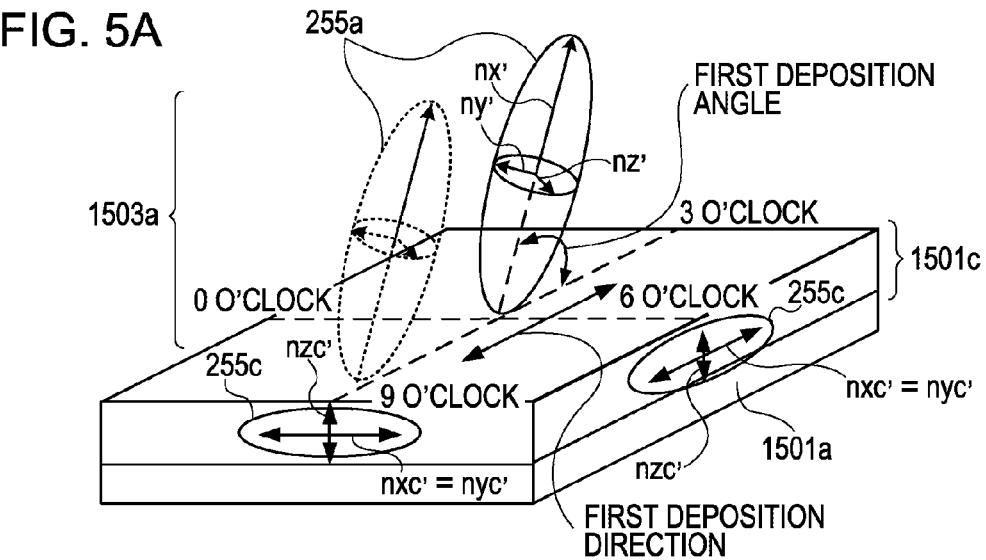
FIG. 5A is a perspective view schematically illustrating a deposition direction, etc. defining a relative position relation between a refractive anisotropic medium of a first retardation film and a substrate corresponding to the first retardation film according to the first embodiment.
Figure 5B:
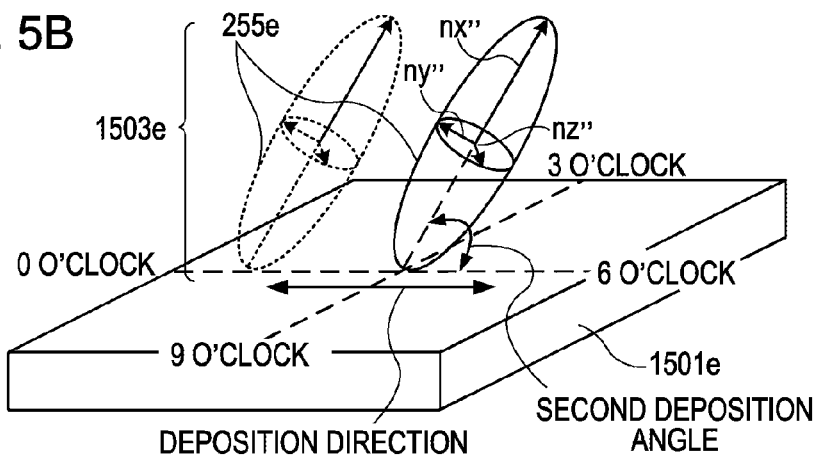
FIG. 5B is a perspective view schematically illustrating a deposition direction, etc. defining a relative position relation between a refractive anisotropic medium of a second retardation film and a substrate corresponding to the second retardation film.
Figure 5C:
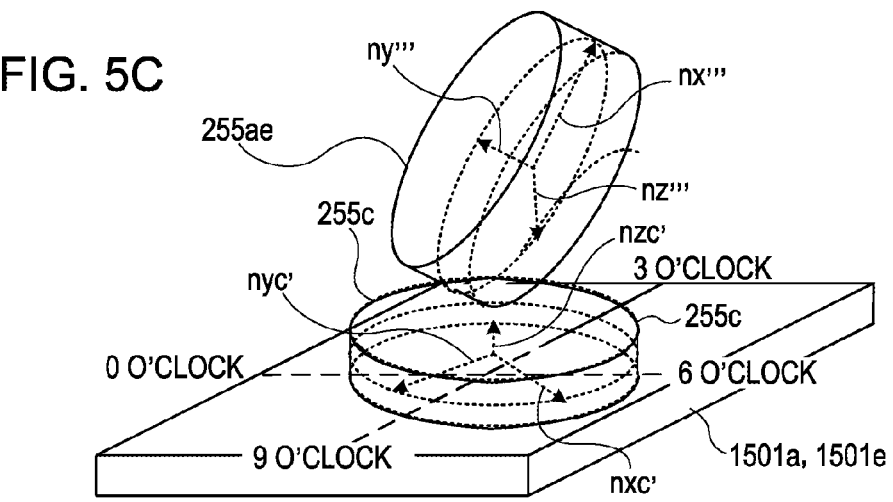
FIG. 5C is a perspective view schematically illustrating a relative position relation between a substrate and a refractive anisotropic medium in which the refractive anisotropic medium of the first retardation film and the refractive anisotropic medium of the second retardation film are combined.
Figure 6A:
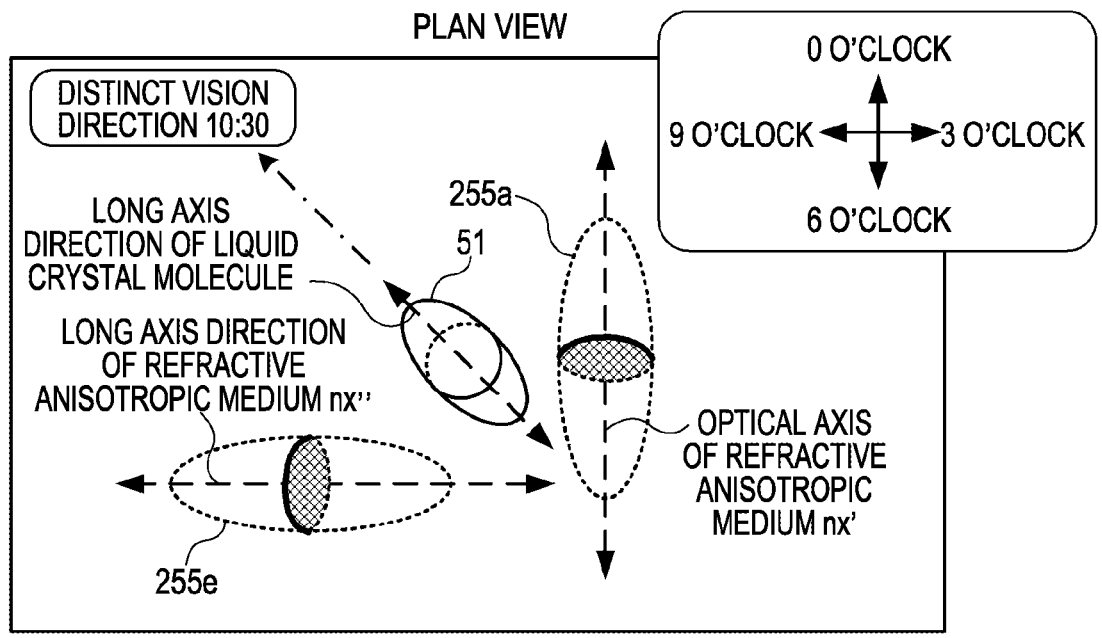
FIGS. 6A and 6B are a plan view and an elevation view schematically illustrating a relative position relation between optical axes of the refractive anisotropic mediums of the first and second retardation films according to the first embodiment and an optical axis of liquid crystal molecules of the liquid crystal panel, respectively.
Figure 6B:
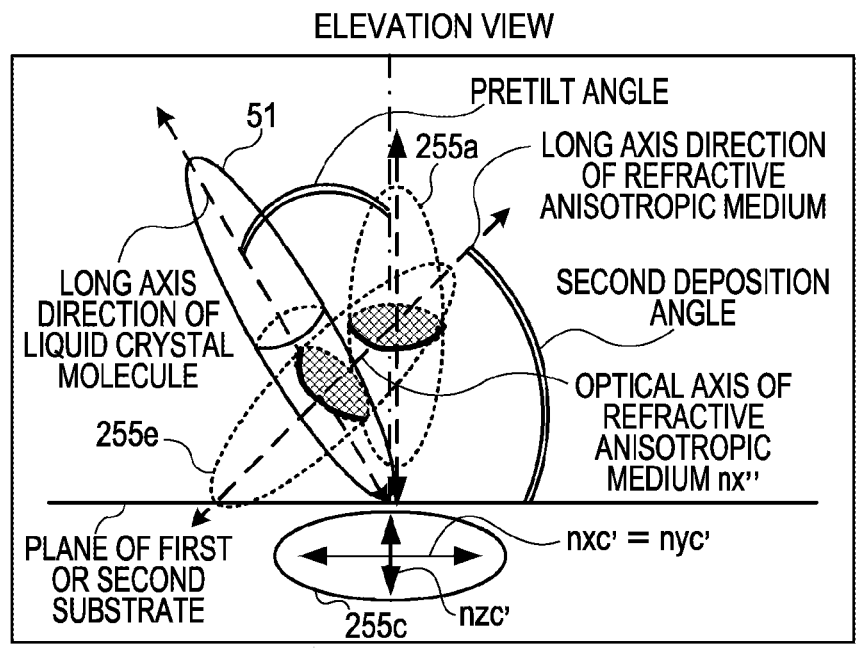
Figure 7:
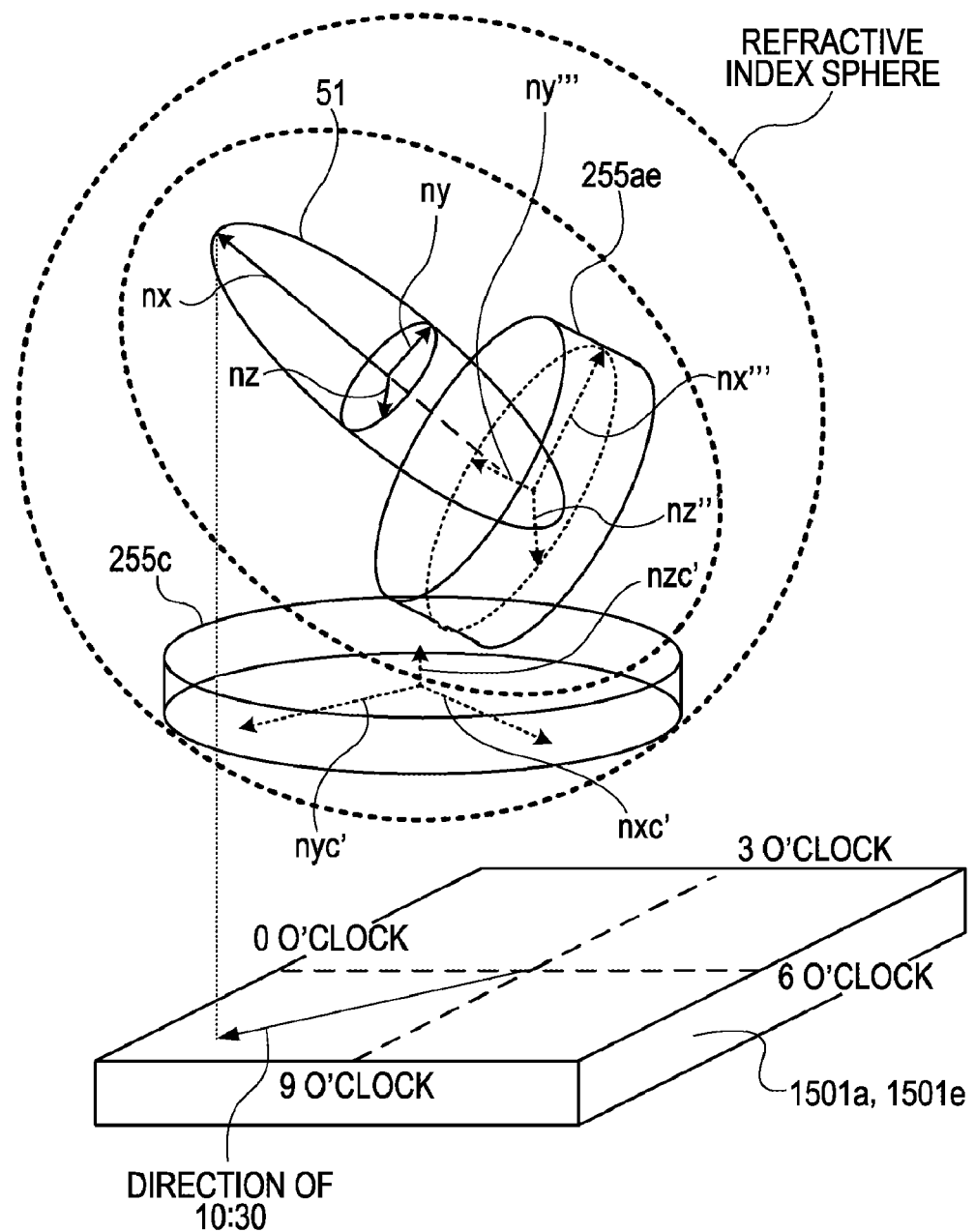
FIG. 7 is a conceptual diagram schematically illustrating a state where optical isotropy is embodied by combining the optical anisotropy of the refractive anisotropic medium in which the refractive anisotropic medium of the first retardation film and the refractive anisotropic medium of the second retardation film are combined with the optical anisotropy of the liquid crystal molecules of the liquid crystal panel according to the first embodiment.

Detailed configurations of the first and second retardation films according to this embodiment will be described now with reference to FIGS. 5A to 7. Here, FIG. 5A is a perspective view schematically illustrating a deposition direction and a deposition angle defining a relative position relation between the refractive anisotropic medium of the first retardation film and a substrate corresponding to the first retardation film according to this embodiment, FIG. 5B is a perspective view schematically illustrating a deposition direction and a deposition angle defining a relative position relation between the refractive anisotropic medium of the second retardation film and a substrate corresponding to the second retardation film, and FIG. 5C is a perspective view schematically illustrating a relative position relation between the substrate and the refractive anisotropic medium in which the refractive anisotropic medium of the first retardation film and the refractive anisotropic medium of the second retardation film are combined. FIGS. 6A and 6B are a plan view and an elevation view schematically illustrating a relative position relation between the optical axes of the refractive anisotropic mediums of the first and second retardation films according to this embodiment and the optical axis of the liquid crystal molecules of the liquid crystal panel, respectively. FIG. 7 is a conceptual diagram schematically illustrating a state where optical isotropy is embodied by combining the optical anisotropy of the refractive anisotropic medium in which the refractive anisotropic medium of the first retardation film and the refractive anisotropic medium of the second retardation film are combined with the optical anisotropy of the liquid crystal molecules of the liquid crystal panel according to this embodiment.

As shown in FIG. 5A, in the vertically-deposited film 1501c of the first retardation film 15a, the refractive anisotropic medium 255c is vertically deposited on the first substrate 1501a as described above. Specifically, as described above, the primary refractive indexes nxc', nyc', and nzc' of the vertically-deposited film 1501c satisfy a relation of nxc'=nyc'>nzc'.

As shown in FIG. 5A, the refractive anisotropic medium 255a of the first retardation film 15a is obliquely deposited as the first deposited film 1503a on the first substrate 1501a in a first predetermined direction, that is, a first deposition direction. The first deposition direction in this embodiment is a direction connecting 3 o'clock and 9 o'clock. Accordingly, the primary refractive index nx' of the refractive anisotropic medium 255a extends in the direction connecting direction connecting 3 o'clock and 9 o'clock. Directions in this embodiment are expressed by the use of the direction of a short hand of a clock. Specifically, the direction of 1:30 is the direction of the short hand when a clock placed on the first substrate or the second substrate in FIG. 5A indicates 1:30.

The refractive anisotropic medium 255a is obliquely deposited so that the optical axis corresponding to the primary refractive index nx' of the refractive anisotropic medium 255a forms a first predetermined angle, that is, a first deposition angle, about the plane direction of the first substrate 1501a. In other words, the first deposition angle can be said to be a value obtained by subtracting the angle between the normal line of the substrate 1501a and the optical axis corresponding to the primary refractive index nx' of the refractive anisotropic medium 255a from 90 degrees. Alternatively, the first deposition angle can be said to be an angle formed by the optical axis corresponding to the primary refractive index nx' of the refractive anisotropic medium 255a and the first deposition direction.

As shown in FIG. 5B, the refractive anisotropic medium 255e of the second retardation film 15e is obliquely deposited as the second deposited film 1503e on the second substrate 1501e in a second predetermined direction, that is, a second deposition direction. The second deposition direction in this embodiment is a direction connecting 0 o'clock and 6 o'clock. Accordingly, the primary refractive index nx" of the refractive anisotropic medium 255e extends in the direction connecting direction connecting 0 o'clock and 6 o'clock. The refractive anisotropic medium 255e is obliquely deposited so that the optical axis corresponding to the primary refractive index nx" of the refractive anisotropic medium 255e forms a second predetermined angle, that is, a second deposition angle, about the plane direction of the second substrate 1501e. In other words, the second deposition angle can be said to be a value obtained by subtracting the angle between the normal line of the second substrate 1501e and the optical axis corresponding to the primary refractive index nx" of the refractive anisotropic medium 255e from 90 degrees. Alternatively, the second deposition angle can be said to be an angle formed by the optical axis corresponding to the primary refractive index nx" of the refractive anisotropic medium 255e and the second deposition direction.

As shown in FIG. 5C, the primary refractive index nx''' of a refractive anisotropic medium 255ae obtained by combining the refractive anisotropic medium of the first retardation film 15a and the refractive anisotropic medium of the second retardation film 15e extend in a direction connecting 4:30 and 10:30. This is because the primary refractive index nx' of the refractive anisotropic medium 255a extending in the direction connecting 3 o'clock and 9 o'clock and the primary refractive index nx" of the refractive anisotropic medium 255e extending in the direction connecting 0 o'clock and 6 o'clock are combined.

The direction in which the uniaxial optical axis of a refractive anisotropic medium 255c of the vertically-deposited film 1501c in the first retardation film 15a extends, that is, the direction of the primary refractive index nzc' is the normal direction of the plane of the first substrate 1501a or the second substrate 1501e.

Specifically, paying attention to the relative position relation between the liquid crystal molecules 51 enclosed in the liquid crystal panel 15c, the refractive anisotropic medium 255a of the first retardation film 15a, and the refractive anisotropic medium 255e of the second retardation film 15e, as shown in FIG. 6A, the direction in which the optical axis of the primary refractive index nx' of the refractive anisotropic medium 255a obliquely deposited on the substrate 1501a of the first retardation film 15a extends and the long axis direction of the pretilted liquid crystal molecules intersect each other, for example, at an angle of about 45 degrees as viewed in the normal direction of the first substrate 1501a (or the second substrate 1501e) in a plan view. As viewed in the normal direction of the first substrate 1501a (or the second substrate 1501e) in a plan view, the direction in which the optical axis of the primary refractive index nx" of the refractive anisotropic medium 255e obliquely deposited on the substrate 1501e of the second retardation film 15e extends and the long axis direction of the pretilted liquid crystal molecules intersect each other, for example, at an angle of about 45 degrees.

In FIG. 6a, the long axis direction of the pretilted liquid crystal molecules is the direction of 1:30 which is a distinct vision direction. The long axis direction of the liquid crystal molecules means a direction in which a vertex closer to the light incidence side of two vertexes of the long axis of the liquid crystal molecules is directed.

As shown in FIG. 6B, as viewed from a vertical plane direction of the first substrate 1501a in an elevation view, the optical axis of the primary refractive index nx' of the refractive anisotropic medium 255a intersects the plane of the first substrate 1501a at the first predetermined angle, that is, the first deposition angle (not shown). As viewed from a vertical plane direction of the second substrate 1501e in an elevation view, the optical axis of the primary refractive index nx" of the refractive anisotropic medium 255e intersects the plane of the second substrate 1501e at the second predetermined angle, that is, the second deposition angle (shown). In other words, the optical axis of the primary refractive index nx' of the refractive anisotropic medium 255a and the optical axis of the primary refractive index nx' of the refractive anisotropic medium 255e may have a twisted position relation. Alternatively, the optical axis of the primary refractive index nx' of the refractive anisotropic medium 255a and the long axis direction of the liquid crystal molecules may have a twisted position relation. Alternatively, the optical axis of the primary refractive index nx' of the refractive anisotropic medium 255e and the long axis direction of the liquid crystal molecules may have a twisted position relation. The first deposition angle or the second deposition angle may be smaller than the angle obtained by subtracting the pretilt angle of the liquid crystal molecules from 90 degrees.

Accordingly, since the direction in which the optical axis of the first retardation film 15a, that is, the optical axis of the primary refractive index nx' of the refractive anisotropic medium 255a, extends intersects the long axis direction of the liquid crystal molecules 51 tilted by the pretilt angle, the optical axis of the first retardation film 15a compensates for optical anisotropy of the liquid crystal molecules 51 into optical isotropy in the plane direction and the vertical plane direction of the first substrate 1501a.

Since the direction in which the optical axis of the second retardation film 15e, that is, the optical axis of the primary refractive index nx" of the refractive anisotropic medium 255e, extends intersects the long axis direction of the liquid crystal molecules 51 tilted by the pretilt angle, the optical axis of the second retardation film 15e compensates for the optical anisotropy of the liquid crystal molecules 51 into optical isotropy in the plane direction and the vertical plane direction of the second substrate 1501e.

More specifically, as shown in FIG. 7, since the long axis of the index ellipsoid formed by the liquid crystal molecules 51 and the long axis of the index ellipsoid formed by the refractive anisotropic medium 255ae obtained by combining the refractive anisotropic medium of the first retardation film 15a and the refractive anisotropic medium of the second retardation film 15e intersect each other, the index ellipsoid formed by the first and second retardation films can be made to three-dimensionally approach a refractive index sphere. A so-called O plate is approximately embodied by the refractive anisotropic medium 255ae obtained by combining the refractive anisotropic medium of the first retardation film 15a and the refractive anisotropic medium of the second retardation film 15e.

In addition, the direction, that is, the plane direction of the vertically-deposited film 1501c, in which the uniaxial optical axis (that is, an example of the uniaxial optical axis in the claims) of the vertically-deposited film 1501c of the first retardation film 15a, that is, the optical axis of the primary refractive index nxc' (or primary refractive index nyc') of the refractive anisotropic medium 255c, extends intersects the long axis direction of the liquid crystal molecules 51 tilted by the pretilt angle. Accordingly, the index ellipsoid formed by four of the liquid crystal molecules 51, the vertically-deposited film 1501c, the first deposited film 1503a, and the second deposited film 1503e can be made to three-dimensionally approach the refractive index sphere.

Therefore, it is possible to cancel (that is, compensate for) a phase difference (in other words, birefringent effect) generated in the liquid crystal by the use of the first retardation film 15a and the second retardation film 15e. As a result, at the time of operation of the projector, the phase difference of light occurring when the light emitted from the light source passes through the liquid crystal including the liquid crystal molecules tilted by the pretilt angle can be compensated for by the use of the first retardation film 15a and the second retardation film 15e. Accordingly, it is possible to prevent the light passing through the liquid crystal panel from being incident on the polarizing film on the output side with the different phase. As a result, the possibility that the light not to be transmitted leaks decreases, thereby preventing a deterioration in contrast or a decrease in viewing angle.

When the liquid crystal light valve 15 does not include the first retardation film 15a and the second retardation film 15e, the liquid crystal layer 34 enclosed in the liquid crystal panel 15c exhibits an optically positive uniaxial property and the refractive index in the director direction of the liquid crystal molecules 51 is greater than the refractive indexes in the other directions. That is, the liquid crystal layer 34 forms an index ellipsoid like a rugby ball, where the average index ellipsoid 250a is shown in FIG. 3. Here, the liquid crystal molecules 51 of the liquid crystal layer 34 are aligned obliquely in the pretilt direction P, generates a residual phase difference at the time of displaying black, and has a time-dependent phase difference because the shapes of the ellipsoids are different as viewed in the tilt direction. The phase difference causes the loss of light in the black display and reduces the contrast ratio of the liquid crystal panel.

Alternatively, for example, when a retardation film in which the optical axis of a C plate or a retardation film having uniaxial refractive anisotropy is parallel to the thickness direction is used and the optical anisotropy of the liquid crystal molecules is compensated for by tilting the retardation film, a space for tilting the retardation film is limited in the projector in view of a cooling effect by circulation of air, thereby making it difficult to prevent the deterioration in contrast. Alternatively, a mechanism for tilting the retardation film is complicated and it is thus difficult to technically adjust the tilting of the retardation film in the assembly process thereof.

However, in this embodiment, as described above, the optical axis of the first retardation film 15a intersects the first substrate 1501a at the first predetermined angle, that is, the first deposition angle, in the first predetermined direction, that is, the first deposition direction so as to compensate for the optical anisotropy of the liquid crystal molecules 51 by depositing the refractive anisotropic medium 255a. Accordingly, by adjusting the first deposition direction and the first deposition angle in which the refractive anisotropic medium 255a of the first retardation film 15a is deposited, it is possible to easily compensate for the optical anisotropy of the liquid crystal molecules 51 with high precision.

As described above, the optical axis of the second retardation film 15e intersects the second substrate 1501e at the second predetermined angle, that is, the second deposition angle, in the second predetermined direction, that is, the second deposition direction so as to compensate for the optical anisotropy of the liquid crystal molecules 51 by depositing the refractive anisotropic medium 255e. Accordingly, by adjusting the second deposition direction and the second deposition angle in which the refractive anisotropic medium 255e of the second retardation film 15e is deposited, it is possible to easily compensate for the optical anisotropy of the liquid crystal molecules 51 with high precision.

In addition, as described above, the vertically-deposited film is vertically deposited on the substrate 1501a so that the long axis and the short axis of the optical axis of the vertically-deposited film 1501c of the first retardation film 15a compensate for the optical anisotropy of the liquid crystal molecules 51. Accordingly, by adjusting the primary refractive index of the uniaxial optical axis of the vertically-deposited film 1501c of the first retardation film 15a, it is possible to easily compensate for the optical anisotropy of the liquid crystal molecules 51 of the liquid crystal panel with high precision.

Particularly, since three kinds of refractive anisotropic mediums of the refractive anisotropic medium 255c, the refractive anisotropic medium 255a, and the refractive anisotropic medium 255e individually compensate for the optical anisotropy of the liquid crystal molecules, it is possible to markedly improve the compensation effect. Typically, by adjusting three parameters, that is, more physical quantities of the primary refractive index of the uniaxial optical axis of the refractive anisotropic medium 255c, the first deposition direction and the first deposition angle of the refractive anisotropic medium 255a, and the second deposition direction and the second deposition angle of the refractive anisotropic medium 255e, it is possible to compensate for the optical anisotropy of the liquid crystal molecules with high precision.

Since it is hardly or never necessary to tilt the first retardation film 15a and the second retardation film 15e so as to compensate for the optical anisotropy of the liquid crystal molecules 51 of the liquid crystal panel, the adjustment process of tilting the first retardation film 15a and the second retardation film 15e can be omitted in the assembly process, thereby simply compensating for the optical anisotropy of the liquid crystal molecules with low cost and enhancing the contrast. As a result, in the projector according to this embodiment, it is possible to enhance the effect of compensating for the phase difference occurring due to the liquid crystal by the use of the first retardation film 15a and the second retardation film 15e, thereby enhancing the contrast.

As described above, in the projector according to this embodiment, at least one of (i) the adjustment of the first deposition direction and the first deposition angle in which the refractive anisotropic medium 255a of the first retardation film 15a is obliquely deposited, (ii) the adjustment of the second deposition direction and the second deposition angle in which the refractive anisotropic medium 255e of the second retardation film 15e is deposited, and (iii) the adjustment of the primary refractive index of the uniaxial optical axis of the refractive anisotropic medium 255c of the first retardation film 15a is carried out. Accordingly, it is possible to satisfactorily compensate for the phase difference due to the liquid crystal by the use of the first retardation film 15a and the second retardation film 15e. As a result, it is possible to obtain high-contrast and high-quality display.

Particularly, by adjusting the first deposition direction and the first deposition angle in which the refractive anisotropic medium of the first retardation film 15a is obliquely deposited and the second deposition direction and the second deposition angle in which the refractive anisotropic medium of the second retardation film 15e is deposited so that the long axis direction of the liquid crystal molecules 51 tilted by the pretilt angle is interposed therebetween, it is possible to properly compensate for the optical anisotropy of the liquid crystal molecules 51 into the optical isotropy, thereby obtaining higher-contrast and higher-quality display. According to the inventor's study, it is proved that the contrast can be further enhanced by setting the angle between the first deposition direction and the second deposition direction to the range of about 70 degrees to about 110 degrees. As described later, by rotating the first retardation film 15a using the normal direction of the first retardation film 15a as a rotation center and rotating the second retardation film 15e using the normal direction of the second retardation film 15e as a rotation center, the relative position relation of the long axis direction of the liquid crystal molecules tilted by the pretilt angle, the first deposition direction, and the second deposition direction can be adjusted with higher precision so as to obtain higher contrast. Specifically, by adjusting the angle between the long axis direction of the tilted liquid crystal molecules 51 and the first deposition angle and the angle between the long axis direction of the tilted liquid crystal molecules 51 and the second deposition direction, in addition to four physical quantities of the first deposition direction, the first deposition angle, the second deposition direction, and the second deposition angle, it is possible to compensate for the optical anisotropy of the liquid crystal molecules 51 with higher precision by the adjustment of more parameters.

By forming the deposited film, which is formed by obliquely depositing the refractive anisotropic medium, out of, for example, an inorganic material such as $Ta_2O_5$, it is possible to effectively prevent the first retardation film 15a or the second retardation film 15e from being deteriorated due to the radiation of light or the increase in temperature, thereby constructing a projector with excellent reliability.

Figure 8A:
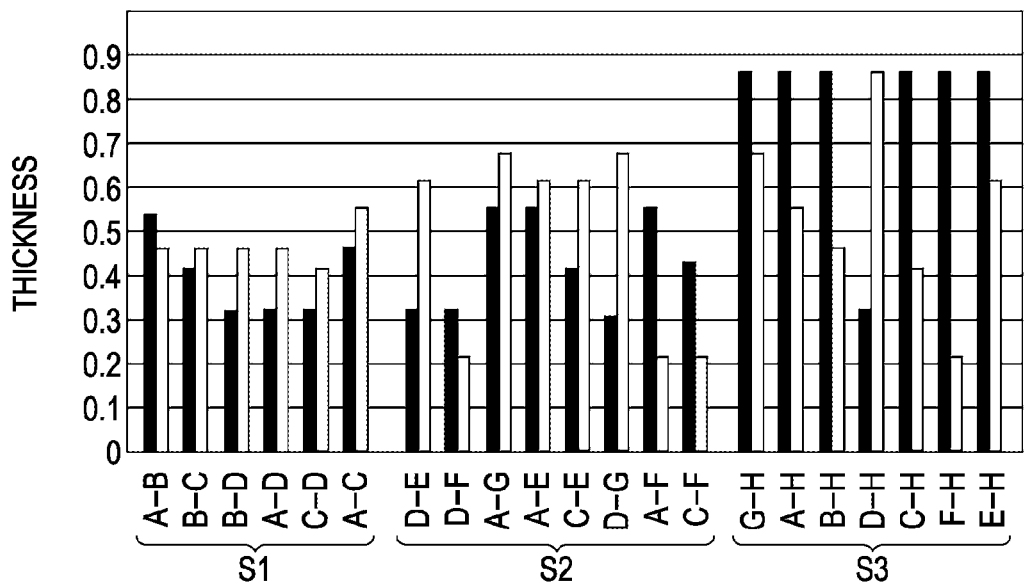
FIG. 8A is a bar graph illustrating a relation between thicknesses of first and second retardation films and a combination of the first retardation film and the second retardation film.
Figure 8B:
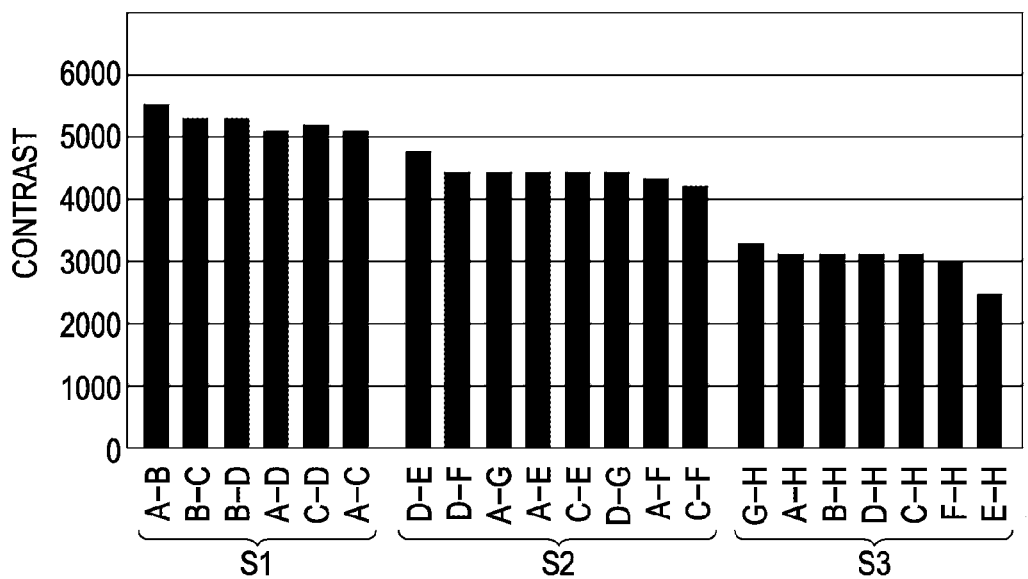
FIG. 8B is a graph quantitatively illustrating a correlation between the thicknesses of the first and second retardation films and contrast of light according to the first embodiment.

Quantitative Analysis of Improvement in Contrast Due to Thicknesses of First and Second Retardation Films The quantitative analysis for improvement in contrast due to the thicknesses of the first and second retardation films according to this embodiment will be described now with reference to FIGS. 8A and 8B. FIG. 8A is a bar graph illustrating a relation between the thicknesses of the first and second retardation films and a combination of the first retardation film and the second retardation film according to this embodiment and FIG. 8B is a graph quantitatively illustrating a correlation between the thicknesses of the first and second retardation films and the contrast of light according to this embodiment. In FIG. 8A, the horizontal axis represents the combination of the first retardation film and the second retardation film and the vertical axis represents the thicknesses of the first and second retardation films. In FIG. 8B, the horizontal axis represents the combination of the first retardation film and the second retardation film and the vertical axis represents the magnitude of contrast. In FIG. 8B and FIGS. 9, 13, 15, 22, and 24B, the contrast values are different depending on the kind, the shape, or the performance of the liquid crystal panel used for measuring the contrast. In other words, in FIG. 8B and FIGS. 9, 13, 15, 22, and 24B, it is proved that this embodiment is more advantageous by relatively comparing the magnitudes of contrast.

The refractive index in the thickness direction of the first retardation film can be uniquely defined on the basis of the primary refractive indexes nx', ny', and nz', the first deposition angle, and the material of the refractive anisotropic medium 255a of the first retardation film. Similarly, the refractive index in the thickness direction of the second retardation film can be uniquely defined on the basis of the primary refractive indexes nx", ny", and nz", the second deposition angle, and the material of the refractive anisotropic medium 255e of the second retardation film.

As shown in FIG. 8B, when sampled sets S1, S2, and S3 in which the ratios at which the difference between the thickness of the first retardation film and the thickness of the second retardation film is in the range of 0.3 µm to 0.6 µm are a high level, a middle level, and a low level, respectively, are compared, all magnitudes of contrast are greater than 5000 in the sampled set S1 in which the ratio at which the difference between the thickness of the first retardation film and the thickness of the second retardation film is in the range of 0.3 µm to 0.6 µm is a high level, thereby embodying higher contrast.

Specifically, as shown in FIG. 8A, the sampled set S1 in which the ratio at which the difference between the thickness of the first retardation film and the thickness of the second retardation film is in the range of 0.3 µm to 0.6 µm is a high level includes the following six combinations where a combination of sample X corresponding to the first retardation film and sample Y corresponding to the second retardation film is expressed by (sample X, sample Y). That is, the sampled set S1 includes (sample A, sample B), (sample B, sample C), (sample B, sample D), (sample A, sample D), (sample C, sample D), and (sample A, sample C). Sample A has a thickness of 0.55 µm, sample B has a thickness of 0.45 µm, sample C has a thickness of 0.40 µm, and sample D has a thickness of 0.30 µm.

Similarly, the sampled set S2 in which the ratio at which the difference between the thickness of the first retardation film and the thickness of the second retardation film is in the range of 0.3 µm to 0.6 µm is a middle level includes the following eight combinations: (sample D, sample E), (sample D, sample F), (sample A, sample G), (sample A, sample E), (sample C, sample E), (sample D, sample G), (sample A, sample F), and (sample C, sample F). Sample E has a thickness of 0.60 µm, sample F has a thickness of 0.20 µm, and sample G has a thickness of 0.70 µm.

Similarly, the sampled set S3 in which the ratio at which the difference between the thickness of the first retardation film and the thickness of the second retardation film is in the range of 0.3 µm to 0.6 µm is a low level includes the following seven combinations: (sample G, sample H), (sample A, sample H), (sample B, sample H), (sample D, sample H), (sample C, sample H), (sample F, sample H), and (sample E, sample H). Sample H has a thickness of 0.85 µm.

As a result, it can be seen that the magnitude of contrast increases when the ratio at which the difference between the thickness of the first retardation film and the thickness of the second retardation film is in the range of 0.3 µm to 0.6 µm is a high level.

Figure 9:
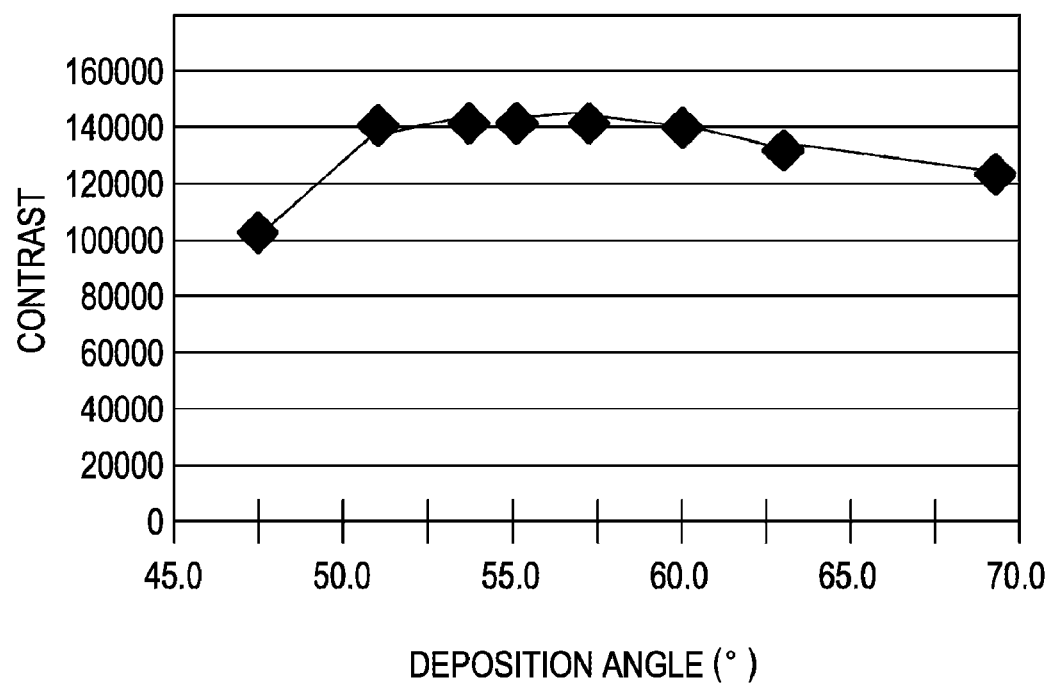
FIG. 9 is a graph quantitatively illustrating a correlation between a deposition angle of the refractive anisotropic mediums of the first and second retardation films about the first substrate and the contrast according to the embodiment.
Figure 10A:
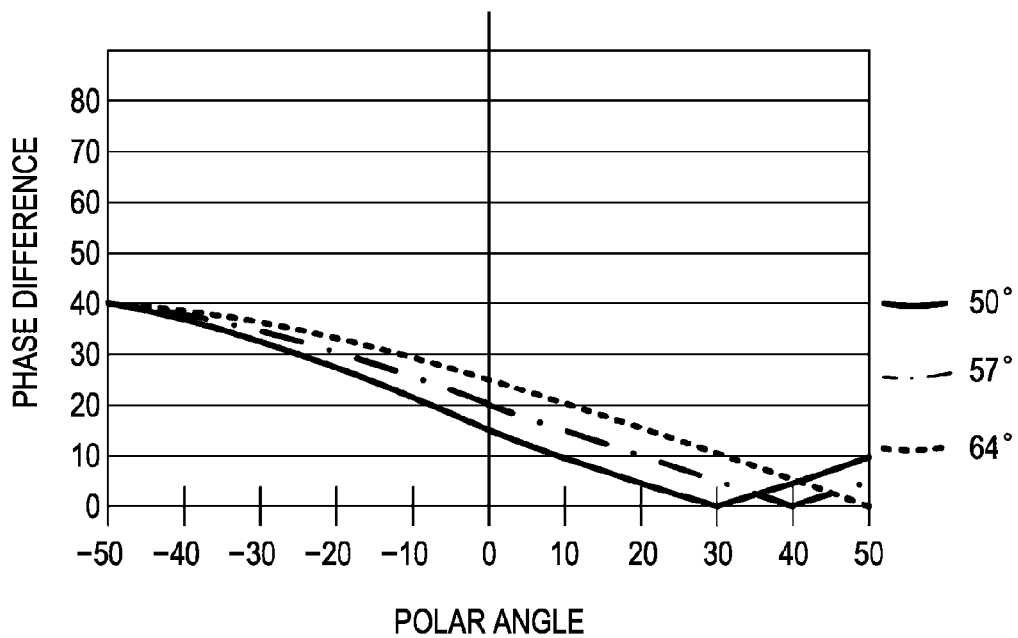
FIGS. 10A and 10B are graphs quantitatively illustrating correlations between first and second phase differences and polar angles where thicknesses of the first and second retardation films and the deposition angles of the refractive anisotropic mediums of the retardation films are used as variables.
Figure 10B:
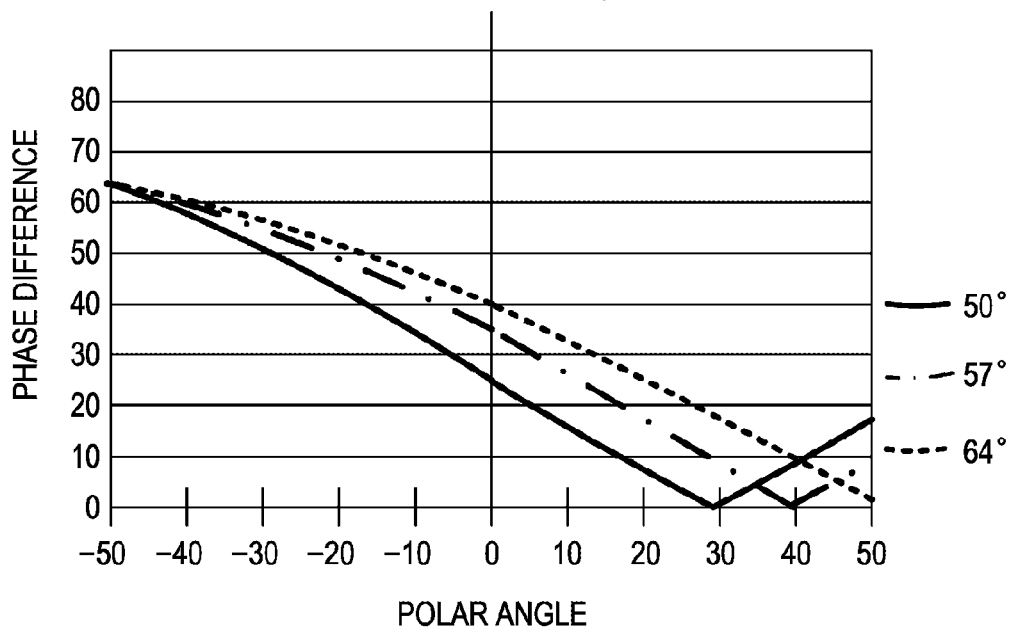

Quantitative Analysis of Variation in Phase Difference Due to Deposition Thicknesses and Deposition Angles of First and Second Retardation Films The quantitative analysis of a variation in phase difference due to the thicknesses of the first and second retardation films and the first and second deposition angles of the refractive anisotropic mediums of the first and second retardation films will be described now with reference to FIGS. 9, 10A, and 10B. FIG. 9 is a graph quantitatively illustrating a correlation between the deposition angle of the refractive anisotropic mediums of the first and second retardation films about the first substrate and the contrast according to the embodiment. In FIG. 9, the vertical axis represents the magnitude of contrast and the horizontal axis represents the deposition angle. FIGS. 10A and 10B are graphs quantitatively illustrating correlations between first and second phase differences and polar angles where the thicknesses of the first and second retardation films and the deposition angles of the refractive anisotropic mediums of the retardation films are used as variables. FIG. 10A corresponds to a case where the thickness is 0.5 µm and FIG. 10B corresponds to a case where the thickness is 0.8 µm. In FIGS. 10A and 10B, the solid curve represents the variation in phase difference when the deposition angle is 50 degrees, the one-dot chained curve represents the variation in phase difference when the deposition angle is 57 degrees, and the dotted curve represents the variation in phase difference when the deposition angle is 64 degrees. The unit of the phase difference is expressed by "nm", but can be expressed by radian by dividing nm by the wavelength of light and multiplying 360 degrees thereby. Since the quantitative properties of the variation in phase difference due to the thicknesses and the deposition angles of the first retardation film and the second retardation film are substantially equal to each other, the first retardation film will be described for the purpose of convenient explanation.

According to the inventor's study, it is proved as a statistical analysis result that the first deposition angle of the refractive anisotropic medium of the first retardation film about the first substrate is preferably in the range of 50 to 70 degrees when the magnitude of contrast is intended to be greater than 120,000, as shown in FIG. 9. The first deposition angle means an angle between the optical axis corresponding to the primary refractive index nx' of the refractive anisotropic medium 255a and the plane direction of the first substrate 1501a at the time of obliquely depositing the refractive anisotropic medium 255a on the first substrate 1501a, as described above. In other words, the first deposition angle can be said to be a value obtained by subtracting the angle between the normal line of the substrate 1501a and the optical axis corresponding to the primary refractive index nx' of the refractive anisotropic medium 255a from 90 degrees. Alternatively, the first deposition angle can be said to be an angle formed by the optical axis corresponding to the primary refractive index nx' of the refractive anisotropic medium 255a and the first deposition direction.

As shown in FIG. 10A, under the condition of the thickness of 0.5 μm, the phase difference generated by the first retardation film 15a can be varied from about 40 nm to 0 nm by varying the polar angle, which indicates an angle of the sight line when the sight line is 0 degrees as viewed from the front surface of the liquid crystal light valve 15, from −50 degrees to +50 degrees. Specifically, as indicated by the solid curve in FIG. 10A, when the first deposition angle is 50 degrees, it can be seen that the front phase difference which is a phase difference at the polar angle of zero is about 15 nm. It can be also seen that the phase difference is zero at the polar angle of about 30 degrees. As indicated by the one-dot chained curve in FIG. 10A, when the first deposition angle is 57 degrees, it can be seen that the front phase difference is about 20 nm. It can be also seen that the phase difference is zero at the polar angle of about 40 degrees. As indicated by the dotted curve in FIG. 10A, when the first deposition angle is 64 degrees, it can be seen that the front phase difference is about 25 nm. It can be also seen that the phase difference is zero at the polar angle of about 50 degrees.

Similarly, as shown in FIG. 10B, under the condition of the thickness of 0.8 μm, the phase difference generated by the first retardation film 15a can be varied from about 65 nm to 0 nm by varying the polar angle from −50 degrees to +50 degrees. Specifically, as indicated by the solid curve in FIG. 10B, when the first deposition angle is 50 degrees, it can be seen that the front phase difference is about 25 nm. It can be also seen that the phase difference is zero at the polar angle of about 30 degrees. As indicated by the one-dot chained curve in FIG. 10B, when the first deposition angle is 57 degrees, it can be seen that the front phase difference is about 35 nm. It can be also seen that the phase difference is zero at the polar angle of about 40 degrees. As indicated by the dotted curve in FIG. 10B, when the first deposition angle is 64 degrees, it can be seen that the front phase difference is about 40 nm. It can be also seen that the phase difference is zero at the polar angle of about 50 degrees.

In this way, by varying the first deposition angle of the refractive anisotropic medium of the first retardation film from about 50 degrees to about 70 degrees with the thickness of the first retardation film, it is possible to control the phase difference such as the front phase difference generated by the first retardation film 15a with high precision. Accordingly, in the process of mounting the liquid crystal light valve 15 according to this embodiment on the projector, the rotation angle of the first retardation film 15a at the time of setting possible contrast with high precision can be limited to a predetermined range by rotating the first retardation film 15a using the incident direction of light as a rotation axis. Accordingly, since the first retardation film 15a is rotated within the limited range, it is possible to simply adjust the contrast.

Second Embodiment

Figure 12:
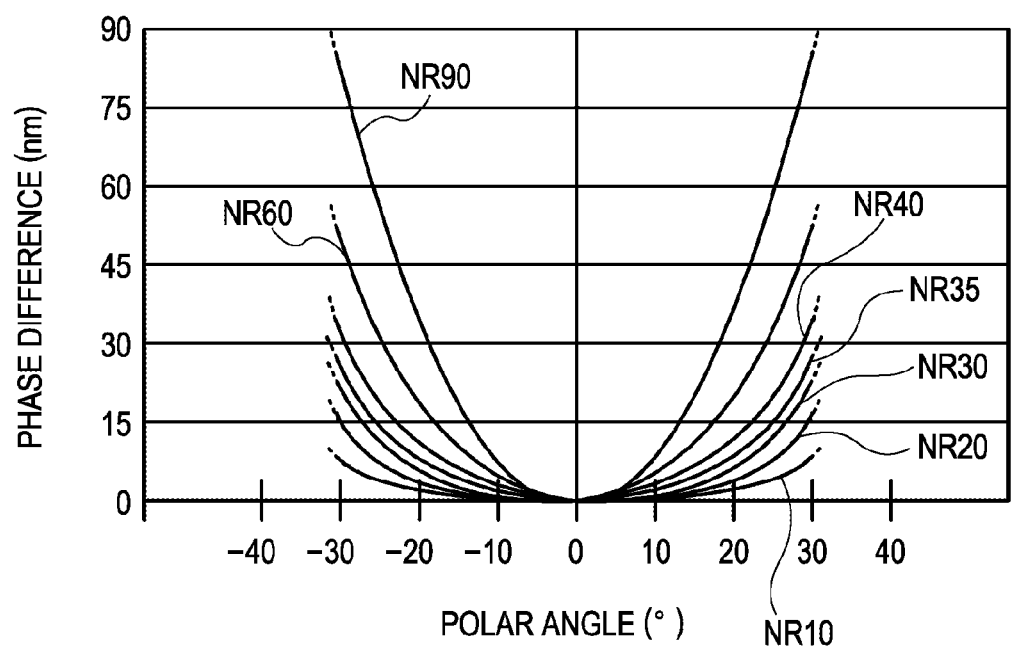
FIG. 12 is a graph illustrating correlations between types of a retardation film, phase differences, and polar angles in the retardation film according to the second embodiment of the disclosure.
Figure 13:
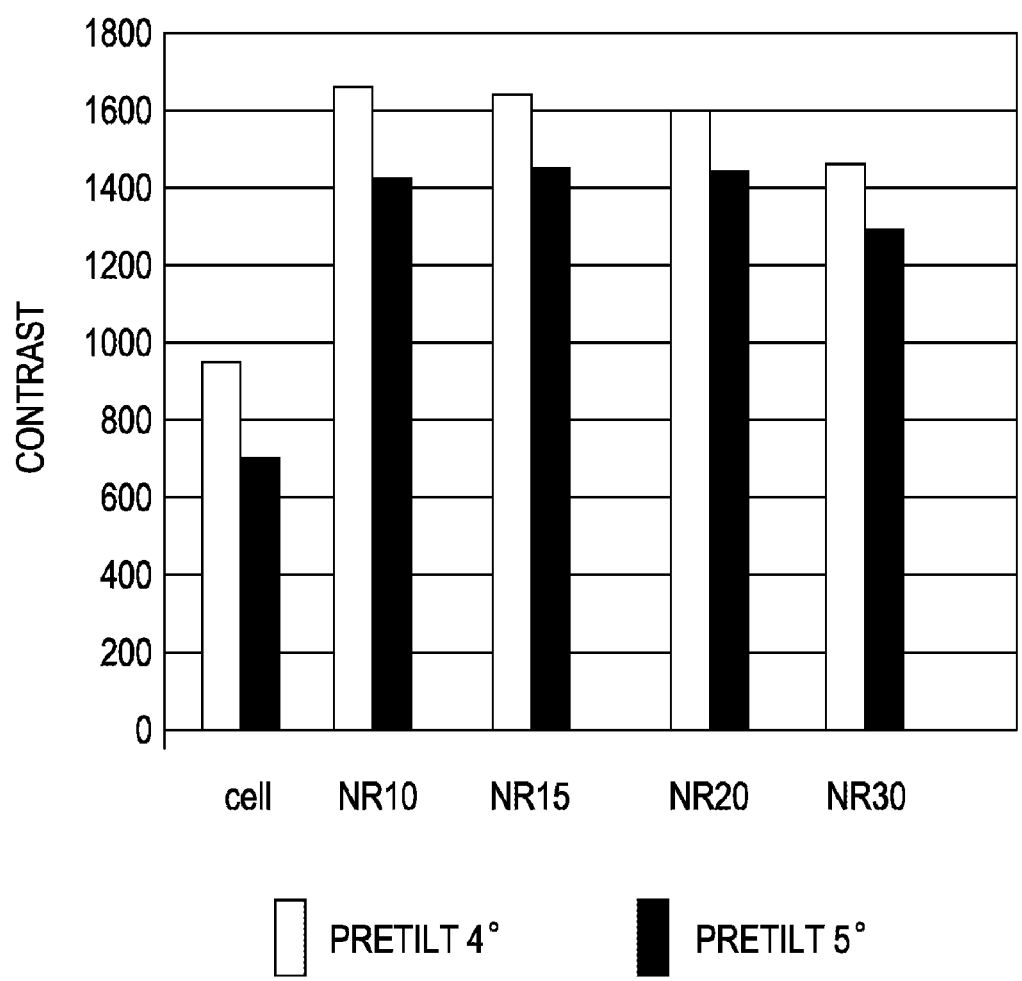
FIG. 13 is a graph illustrating a correlation between types of the retardation film and contrast in the retardation film according to the second embodiment of the disclosure.
Figure 14:
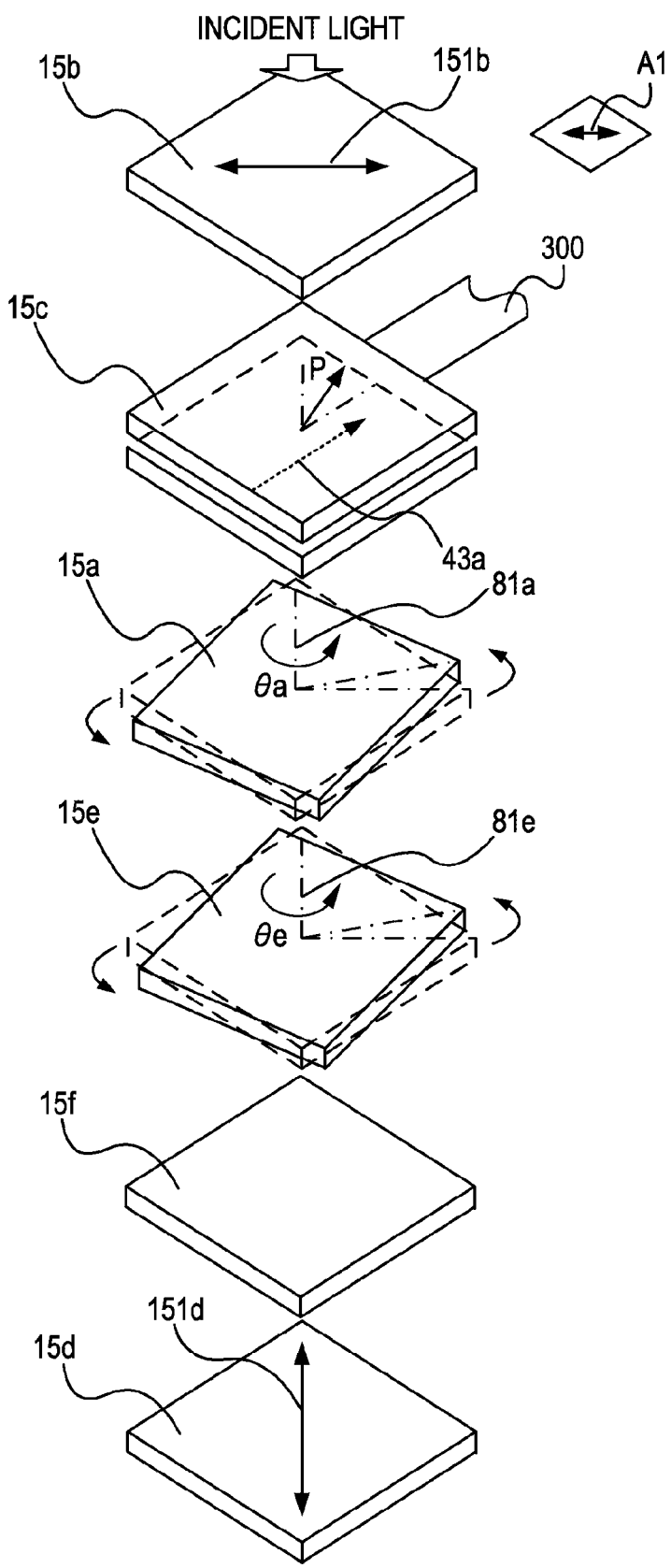
FIG. 14 is a diagram illustrating an arrangement of optical axes of constituent members shown in FIG. 11.

A second embodiment of the disclosure will be described now with reference to FIGS. 11 to 14. FIG. 11 is a diagram schematically illustrating a liquid crystal light valve according to the second embodiment of the disclosure. In FIG. 11, elements substantially like those of the first embodiment are denoted by like reference numerals and description thereof is omitted. FIG. 12 is a graph illustrating correlations between types of a retardation film, phase differences, and polar angles in the retardation film according to the second embodiment of the disclosure. The polar angle indicates an angle of the sight line when the sight line is 0 degrees as viewed from the front surface of the liquid crystal light valve 15. FIG. 13 is a graph illustrating a correlation between the type of the retardation film and the contrast in the retardation film according to the second embodiment of the disclosure. A black bar graph in FIG. 13 corresponds to a case where the pretilt angle of the liquid crystal molecules is 5 degrees and a white bar graph in FIG. 13 corresponds to a case where the pretilt angle of the liquid crystal molecules is 4 degrees. FIG. 14 is a diagram illustrating an arrangement of the optical axes of the constituent members shown in FIG. 11.

As shown in FIG. 11, a liquid crystal projector according to the second embodiment includes a first retardation film 15a1 and a third retardation film 15f (that is, an example of the uniaxial retardation film in the claims), instead of the first retardation film 15a of the liquid crystal projector according to the first embodiment. The third retardation film 15f may be formed by the vertical deposition of a refractive anisotropic medium 255c or may be formed of an optical film. Another example of the first retardation film in the claims is embodied by the first retardation film 15a1. An example of the third retardation film in the claims is embodied by the third retardation film 15f.

The first retardation film 15a1 includes (i) a first substrate 1501a, (ii) a first deposited film 1503a formed by obliquely depositing a refractive anisotropic medium maintaining first refractive anisotropy thereon, and (iii) a third substrate 1502a. The primary refractive indexes in the optical axis direction of an index ellipsoid of the refractive anisotropic medium 255a are shown aside the first retardation film 15a1 in FIG. 11. In this embodiment, the primary refractive indexes nx', ny', and nz' satisfy a relation of nx'>ny'>nz'. That is, the refractive index nx' in the direction tilted from the normal direction of the first substrate 1501a or the second substrate 1502 is greater than the refractive indexes ny' and nz' in the other directions and thus the index ellipsoid has a rice grain shape. Specifically, a representative example of the refractive anisotropic medium 255a is a biaxial plate.

The second retardation film 15e includes (i) a second substrate 1501e, (ii) a second deposited film 1503e formed by obliquely depositing a refractive anisotropic medium 255e maintaining the refractive anisotropy, and (iii) and a fourth substrate 1502e.

An average index ellipsoid 255c of the third retardation film 15f is schematically shown aside the third retardation film 15f in FIG. 11. In the drawing, nxc' and nyc' represent the primary refractive indexes in the in-plane direction of the third retardation film 15f and nzc' represents the primary refractive index in the thickness direction of the third retardation film 15f. In this embodiment, the primary refractive indexes nxc', nyc', and nzc' satisfy a relation of nxc'=nyc'>nzc'. That is, the refractive index nzc' in the thickness direction is smaller than the refractive indexes in the other directions and thus the index ellipsoid has a disk shape. The index ellipsoid 255c is aligned to be parallel to the surface of the third retardation film 15f and the optical axis direction (short axis direction of the index ellipsoid) of the third retardation film 15f is parallel to the normal direction of the surface. Specifically, a negative C plate may be used as the third retardation film 15f and a C plate employing discotic liquid crystal is used in this embodiment. An optical film employing a non-stretched cellulose ester film (such as non-stretched triacetyl cellulose (TAC) and non-stretched cellulose acetate propionate (CAP)) and a biaxial stretched norbornene resin, or the like may be used.

As the third retardation film 15f, a C plate including a deposited film formed by alternately stacking a refractive anisotropic medium having a relatively high refractive index and a refractive anisotropic medium having a relatively low refractive index may be employed. In this way, by varying the thickness of the stacked deposited film, it is possible to accomplish a variation in characteristics of light such as a variation in traveling direction of light, a variation in polarized state, and a variation in frequency or phase.

Specifically, in the third retardation film 15f, it the phase difference may be in the range of about 10 to 20 nm at the polar angle of 30 degrees. Accordingly, it is possible to enhance the contrast. The width of the phase difference has a slight allowable error depending on the wavelength of light. Specifically, as shown in FIG. 12, the third retardation film 15f can be classified into NR10 in which the phase difference at the polar angle of 30 degrees is 10 nm, NR20 in which the phase difference is 20 nm, NR30 in which the phase difference is 30 nm, NR35 in which the phase difference is 35 nm, NR40 in which the phase difference is 40 nm, NR60 in which the phase difference is 60 nm, and NR90 in which the phase difference is 90 nm. As shown in FIG. 13, it is proved that the third retardation film 15f preferably employs NR10, NR15, and NR20 in view of the enhancement in contrast. Specifically, when the pretilt angle of the liquid crystal molecules is 4 degrees and the third retardation film 15f employs NR10, NR15, and NR20, the contrast can be greater than 1600. When the pretilt angle of the liquid crystal molecules is 5 degrees and the third retardation film 15f employs NR10, NR15, and NR20, the contrast can be greater than 1300.

As described above, the liquid crystal projector according to the second embodiment includes the first retardation film 15a1 and the third retardation film 15f instead of the first retardation film 15a of the liquid crystal projector according to the first embodiment. Accordingly, since the first retardation film 15a1, the second retardation film 15e, and the third retardation film 15f can be disposed in different optical positions or at least one of the first to third retardation films can be temporarily separated, it is possible to simply carry out the optical adjustment. Since different manufacturing methods or different materials can be used for the first to third retardation films, it is possible to carry out the optical adjustment at low cost. When the C plate is used as the retardation film 15e, it is possible to further enhance the contrast while coping with a diffraction phenomenon or a case where a focal position is closer in comparison with a standard value, in an MLA attached panel or a projector having a small value of F on the light incidence side.

Specifically, as show in FIG. 14, the optical adjustment of the liquid crystal light valve 15 in the projector according to the second embodiment can be carried out by a second optical adjustment process of adjusting the rotation angle of the second retardation film 15e disposed to be rotatable about the substrate normal line of the liquid crystal panel 15c, in addition to or instead of a first optical adjustment process of adjusting the rotation angle of the first retardation film 15a1 disposed to be rotatable about the substrate normal line of the liquid crystal panel 15c. Details of the first optical adjustment process and the second optical adjustment process will be described later.

Figure 15:
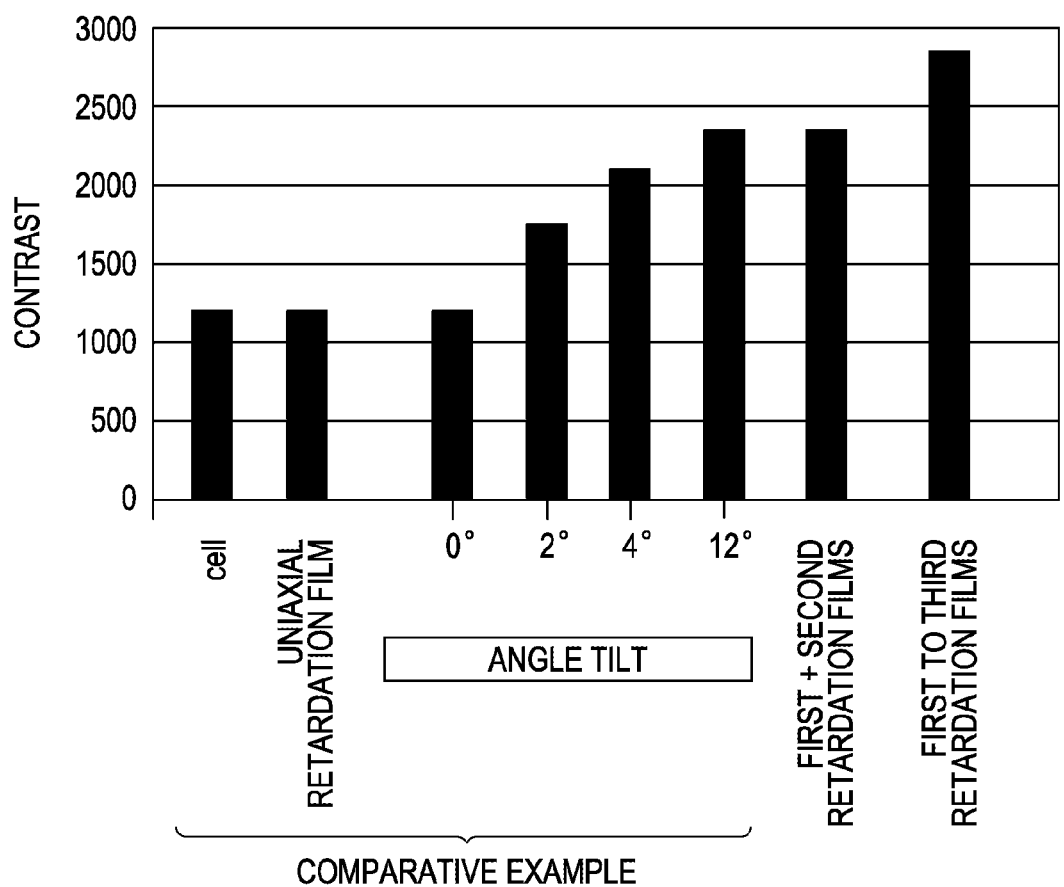
FIG. 15 is a bar graph quantitatively illustrating a correlation between contrast embodied by first to third retardation films according to the second embodiment and contrast embodied by retardation films according to a comparative example.
Figure 16A:
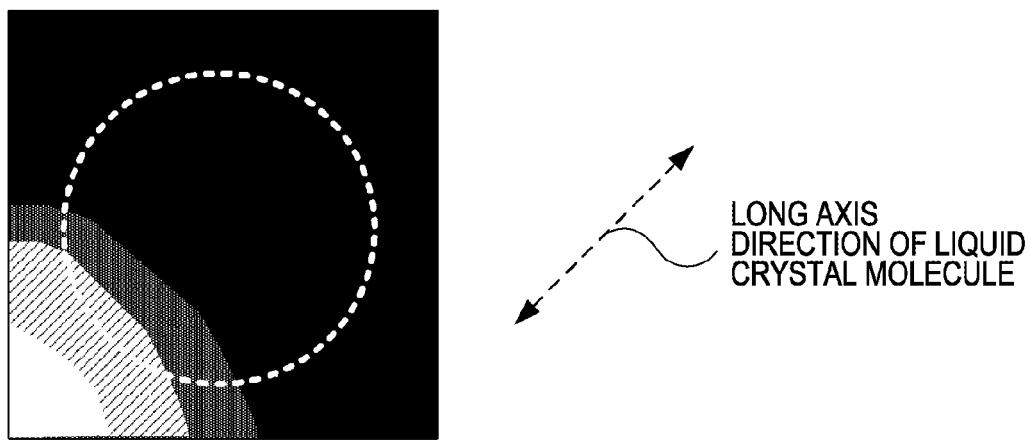
FIGS. 16A and 16B are distribution diagrams illustrating a difference in brightness in liquid crystal panels employing the retardation films according to the second embodiment and the comparative example.
Figure 16B:
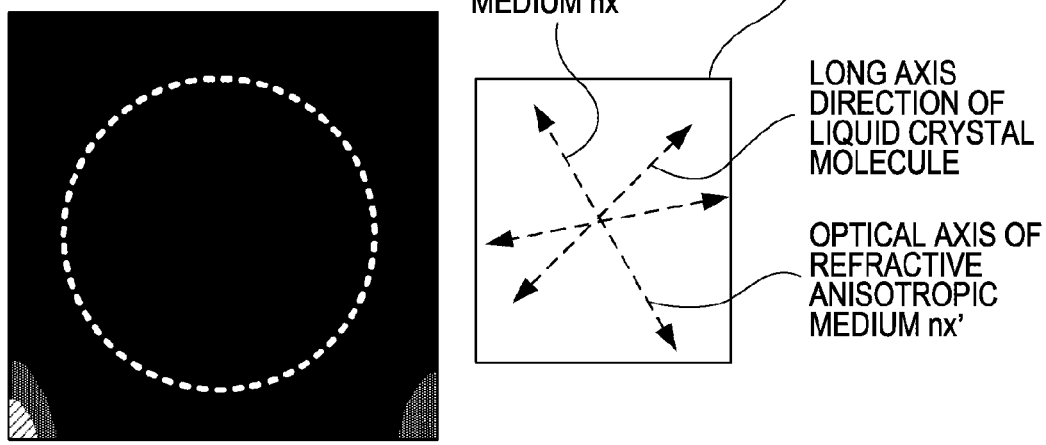

Quantitative Analysis of Improvement in Contrast Due to Rotation of First to Third Retardation Films The improvement in contrast due to the rotation of the first to third retardation films about the substrate normal line will be described now with reference to FIGS. 15, 16A, and 16B and FIG. 14 or 4. FIG. 15 is a bar graph quantitatively illustrating a correlation between the contrast embodied by the first to third retardation films according to the second embodiment and the contrast embodied by the retardation films according to a comparative example. FIGS. 16A and 16B are distribution diagrams illustrating a difference in brightness in the liquid crystal panels employing the retardation films according The optical adjustment of the liquid crystal light valve 15 in the projector according to this embodiment can be carried out by the second optical adjustment process of adjusting the rotation angle of the second retardation film 15e disposed to be rotatable about the substrate normal line of the liquid crystal panel 15c, in addition to or instead of the first optical adjustment process of adjusting the rotation angle of the first retardation film 15a1 disposed to be rotatable about the substrate normal line of the liquid crystal panel 15c. Details of the first optical adjustment process and the second optical adjustment process will be described later.

In the first optical adjustment process, as shown in FIG. 14, the rotation axis 81a of the first retardation film 15a1 opposed to the liquid crystal panel 15c is set to be parallel to the normal direction of the first retardation film 15a1 (and the liquid crystal panel 15c). By rotating the first retardation film 15a1 about the rotation axis 81a to adjust the rotation angle θa, the angle between the direction of the optical axis of the first retardation film 15a1, that is, the optical axis of the primary refractive index nx' of the refractive anisotropic medium 255a, and the long axis direction of the liquid crystal molecules 51 tilted by the pretilt angle is adjusted with high precision. In addition or instead, the rotation axis 81e of the second retardation film 15e opposed to the liquid crystal panel 15c is set to be parallel to the normal direction of the second retardation film 15e (and the liquid crystal panel 15c). By rotating the second retardation film 15e about the rotation axis 81e to adjust the rotation angle θe, the angle between the direction of the optical axis of the second retardation film 15e, that is, the optical axis of the primary refractive index nx" of the refractive anisotropic medium 255e, and the long axis direction of the liquid crystal molecules 51 tilted by the pretilt angle is adjusted with high precision.

Specifically, as described above, by adjusting the rotation angle θa corresponding to the angle between the long axis direction of the tilted liquid crystal molecules 51 and the first deposition direction and the rotation angle θe corresponding to the angle between the long axis direction of the tilted liquid crystal molecules 51 and the second deposition direction in addition to five parameters, that is, five physical quantities of the primary refractive index of the uniaxial optical axis of the third retardation film 15f, the first deposition direction, the first deposition angle, the second deposition direction, and the second deposition angle, it is possible to compensate for the optical anisotropy of the liquid crystal molecules 51 with high precision by the adjustment of more parameters.

As a result, the index ellipsoid formed by four elements of the liquid crystal molecules and the first to third retardation films can be made to approach the refractive index sphere, thereby obtaining desired contrast.

Specifically, as shown in FIG. 15, in the projector according to this embodiment, the contrast is greater than 2750 by using the first retardation film 15a1, the second retardation film 15e, and the third retardation film 15f, thereby simply embodying the higher contrast than that of the comparative example. Specifically, the projector employing the retardation film formed of, for example, an optical cell material according to the comparative example, the projector employing the uniaxial retardation film such as an optical film, or the projectors in which the retardation film such as a C plate having the optical axis parallel to the thickness direction is tilted by 2° to 4° and 12°, the contrast is less than 2500. On the contrary, according to this embodiment, in addition to or instead of rotating the first retardation film 15a1 about the rotation axis 81a to adjust the rotation angle θa without tilting the first retardation film 15a1, the second retardation film 15e, and the third retardation film 15f, the second retardation film 15e is rotated about the rotation axis 81e to adjust the rotation angle θe. Accordingly, the angle between the direction of the optical axis of the first retardation film 15a1 and the long axis direction of the liquid crystal molecules 51 tilted by the pretilt angle can be adjusted with high precision, thereby obtaining the desired contrast by the simple adjustment. In addition, the angle between the direction of the optical axis direction of the second retardation film 15e and the long axis direction of the liquid crystal molecules 51 tilted by the pretilt angle can be adjusted to obtain the desired contrast by the simple adjustment. In this embodiment, since the first and second retardation films need not be tilted in the space between the liquid crystal panel and the first and second retardation film and thus the circulation of air is not prevented, it is possible to minimize the accumulation of heat between the liquid crystal panel 15c and the first and second retardation films and thus this embodiment is advantageous in suppressing the deterioration of the liquid crystal panel and the retardation films.

As shown in FIG. 16B, according to this embodiment, it is possible to effectively prevent a deviation in brightness, that is, so-called uneven brightness, from occurring in the white dotted circle indicating that the polar angle in the liquid crystal panel is about 30 degrees. Specifically, as shown in FIG. 16A, it can be seen that the uneven brightness occurs in the left-lower portion of the white dotted circle indicating that the polar angle in the liquid crystal panel not using the retardation film according to the comparative example is about 30 degrees. From FIG. 16A, it can be seen that the uneven brightness in the liquid crystal panel occurs line-symmetric about the long axis of the liquid crystal molecules 51 due to the long axis direction of the liquid crystal molecules 51 tilted by the pretilt angle. On the contrary, in the projector according to this embodiment, the direction of the optical axis of the first retardation film 15a1, that is, the optical axis of the primary refractive index nx' of the refractive anisotropic medium 255a, intersects the long axis direction of the liquid crystal molecules 51 tilted by the pretilt angle at an angle and the direction of the optical axis of the second retardation film 15e, that is, the optical axis of the primary refractive index nx" of the refractive anisotropic medium 255e, intersects the long axis direction of the liquid crystal molecules 51 tilted by the pretilt angle at another angle. The primary refractive indexes nxc' and nyc' of the optical axis of the index ellipsoid 255c exist in the plane direction of the third retardation film 15f.

As a result, it is proved that the line-symmetric uneven brightness can be cancelled by the optical axis of the first retardation film 15a, the optical axis of the second retardation film 15e, and the third retardation film 15f, thereby effectively preventing the even brightness.

Particularly, when a biaxial plate is employed as a representative example of the refractive anisotropic medium 255a, the primary refractive indexes nx', ny', and nz' satisfy the relation of nx'>ny'>nz'. Accordingly, as shown in FIG. 14, the first retardation film 15a1 is rotated about the rotation axis 81a extending in the normal direction of the substrate to adjust the rotation angle θa. In addition or instead, when a biaxial plate is employed as a representative example of the refractive anisotropic medium 255e, the primary refractive indexes nx", ny", and nz" satisfy the relation of nx">ny">nz". Accordingly, as shown in FIG. 14, the rotation angle θe is adjusted by rotating the second retardation film 15e about the rotation axis 81e extending in the normal direction of the substrate.

Accordingly, by changing the position relation between the optical axes of the first and second retardation films 15a1 and 15e and the optical axis of the polarizing films 15b and 15d or the liquid crystal panel 15c, it is possible to optimize the positions of the first and second retardation films 15a1 and 15e. Specifically, by rotating the first or second retardation film 15a1 or 15e, the position relation between the first and second retardation films 15a1 and 15e and the first and second polarizing films 15b and 15d can be determined so that the primary refractive indexes nx, ny, and nz of, for example, an A plate, etc. have components satisfying nx=ny>nz. Accordingly, it is possible to compensate for the phase difference between the first and second polarizing films 15b and 15d or the phase difference resulting from the diffraction of the micro lenses 95. Particularly, by adjust the front phase difference of the first and second retardation films 15a1 and 15e in addition to adjusting the rotations of the first and second retardation films 15a1 and 15e, it is possible to more effectively compensate for the phase difference between the first and second polarizing films 15b and 15d and the phase difference resulting from the diffraction of the micro lenses 95.

By rotating the first retardation film 15a1 (or 15a) using the normal direction as the rotation axis 81a, an example of the "optical adjustment process" according to the disclosure is embodied. By rotating the second retardation film 15e using the normal direction as the rotation axis 81e, another example of the "optical adjustment process" according to the disclosure is constructed.

As described above, in the process of mounting the liquid crystal light valve 15 according to this embodiment on the projector by changing the thickness of the first retardation film 15a1 and the first deposition angle of the refractive anisotropic medium of the first retardation film 15a1 to more greatly change the front phase difference due to the first retardation film 15a1, the rotation angle of the first retardation film 15a1 can be limited to a predetermined range (for example, ±5 degrees) at the time of setting allowable contrast with high precision by rotating the first retardation film 15a1 using the light incident direction as the rotation axis. Accordingly, since the first retardation film 15a1 is rotated within the limited range, it is possible to more simply adjust the maximum contrast.

Similarly, as described above, in the process of mounting the liquid crystal light valve 15 according to this embodiment on the projector by changing the thickness of the second retardation film and the second deposition angle of the refractive anisotropic medium of the second retardation film to more greatly change the front phase difference due to the second retardation film 15e, the rotation angle of the second retardation film 15e can be limited to a predetermined range (for example, ±5 degrees) at the time of setting allowable contrast with high precision by rotating the second retardation film 15e using the light incident direction as the rotation axis. Accordingly, since the second retardation film 15e is rotated within the limited range, it is possible to more simply adjust the maximum contrast. Particularly, the adjustment of the rotation angle of the first retardation film 15a1 and the adjustment of the rotation angle of the second retardation film 15e may be carried out at the same time or in time series in consideration of influence on the contrast.

In certain embodiments, the optical adjustment of the first retardation film 15a1 and the optical adjustment of the second retardation film 15e are carried out while measuring the contrast (or the brightness of black display). In general, the optical axis in the plane direction of the protective film 152 of the polarizing film is not set to be constant, but the optical axis in the in-plane direction of a polarizing film may vary. Accordingly, since the rotation angle θa of the first retardation film 15a1 and the rotation angle θe of the second retardation film 15e cannot be set to a fixed angle, in certain embodiments the position where the maximum contrast is obtained or the position where the black level is the minimum is set to the optimal positions of the of the first retardation film 15a1 and the second retardation film 15e. In FIG. 14, by rotating the polarizing film about the normal direction, it is possible to further enhance the contrast.

In general, when the retardation films are formed by oblique deposition, an axis deviation that the optical axis is deviated from a desired deposition angle or direction may occur. Particularly, in this embodiment, since two kinds of retardation films obliquely deposited are rotated to perform the optical adjustment, it is possible to suppress the influence of the axis deviation, compared with the case where one kind of retardation film or monolithic retardation films are rotated to perform the optical adjustment. Accordingly, it is possible to compensate for the difference in optical characteristics at the time of manufacturing the retardation film.

Arrangement of First to Third Retardation Films

Figure 18:
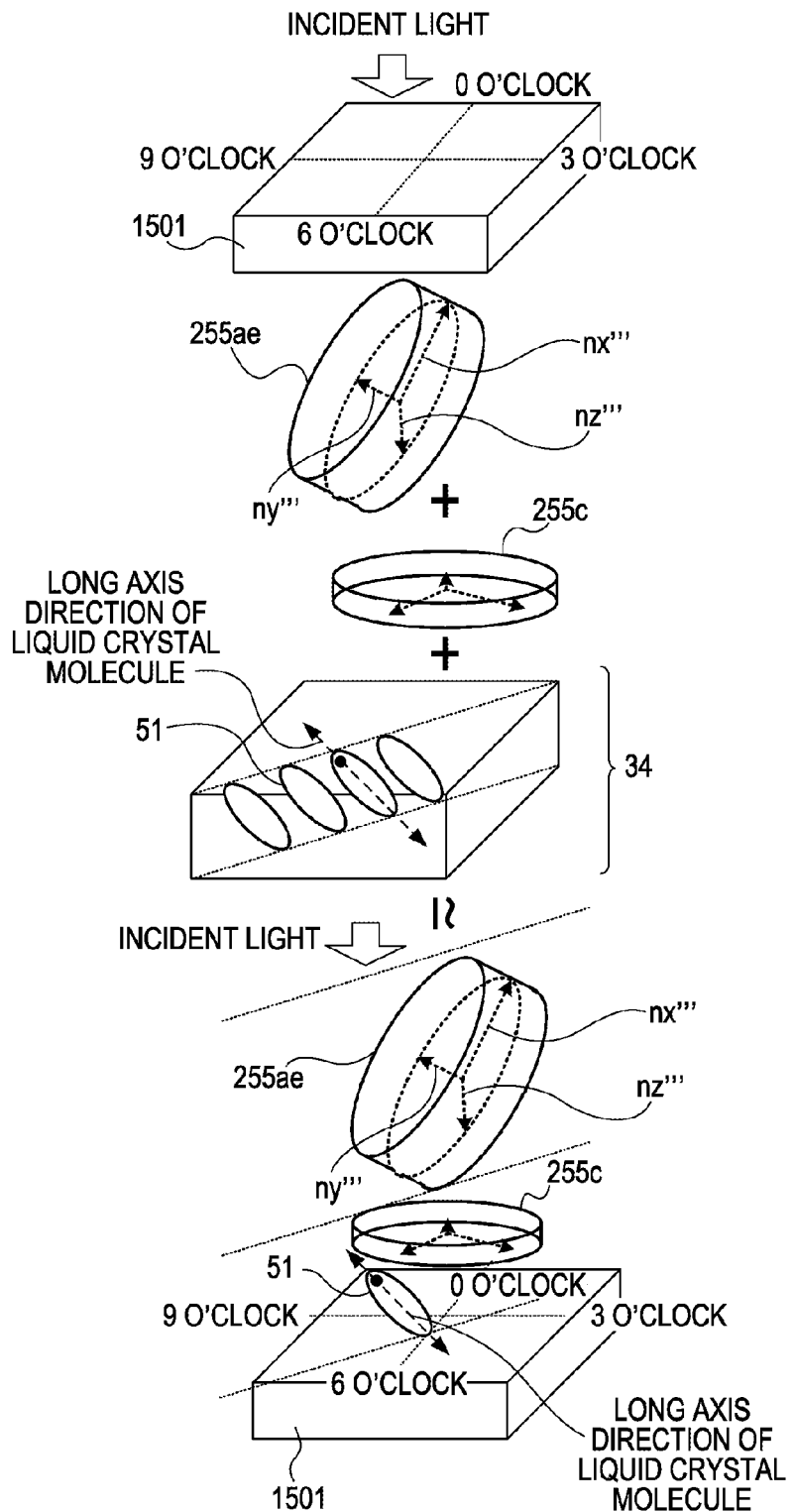
FIG. 18 is a diagram schematically illustrating relative position relations of a refractive anisotropic medium obtained by combining first refractive anisotropy of a first retardation film and second refractive anisotropy of a second retardation film, a deposition direction of the refractive anisotropic medium, uniaxial refractive anisotropy of a third retardation film, and liquid crystal molecules of the liquid crystal panel according to the second embodiment.
Figure 19:
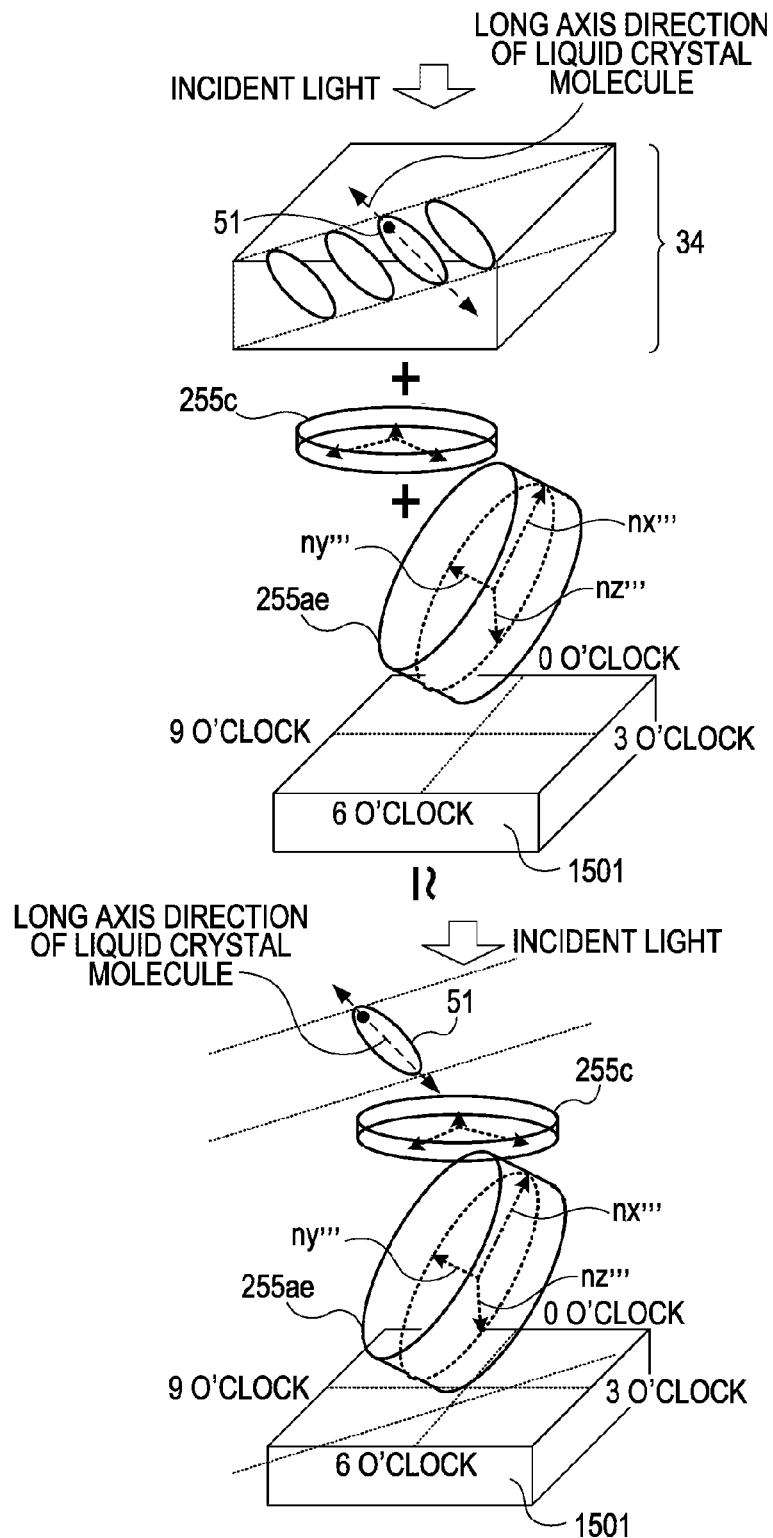
FIG. 19 is a diagram schematically illustrating relative position relations of a refractive anisotropic medium obtained by combining first refractive anisotropy of a first retardation film and second refractive anisotropy of a second retardation film, a deposition direction of the refractive anisotropic medium, uniaxial refractive anisotropy of a third retardation film, and liquid crystal molecules of the liquid crystal panel according to the second embodiment.

An arrangement of the first and second retardation films according to this embodiment will be described now with reference to FIGS. 17A to 19. FIGS. 17A to 17I are diagrams schematically illustrating arrangements of the constituent members of the liquid crystal light valve 15 according to this embodiment. FIG. 18 is a diagram schematically illustrating relative position relations of a refractive anisotropic medium obtained by combining the first refractive anisotropy of the first retardation film and the second refractive anisotropy of the second retardation film, a deposition direction of the refractive anisotropic medium, uniaxial refractive anisotropy of the third retardation film, and the liquid crystal molecules of the liquid crystal panel according to this embodiment. FIG. 19 is a diagram schematically illustrating relative position relations of a refractive anisotropic medium obtained by combining the first refractive anisotropy of the first retardation film and the second refractive anisotropy of the second retardation film, a deposition direction of the refractive anisotropic medium, the uniaxial refractive anisotropy of the third retardation film, and the liquid crystal molecules of the liquid crystal panel according to this embodiment.

Retardation Film on Incidence Side

Figure 17A:
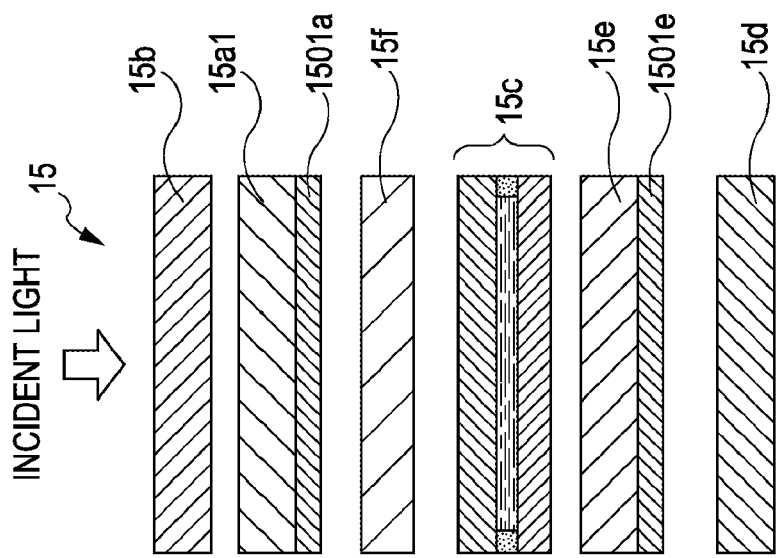

In FIG. 17A, the first retardation film 15a1 is disposed on a side where light is incident on the liquid crystal panel 15c so that the first substrate 1501a on which the first deposited film 1503a of the first retardation film 15a1 is deposited is close to the liquid crystal panel 15c. The optical axis of the first retardation film 15a1 is parallel to the direction of 00:00 as the distinct vision direction. In FIGS. 17A to 17G, the first polarizing film 15b is disposed at the uppermost and the second polarizing film 15d is disposed at the lowermost.

On the side where light is incident on the liquid crystal panel 15c, the second retardation film 15e is disposed closer to the liquid crystal panel 15c than the first retardation film 15a so that the second substrate 1501e on which the second deposited film 1503e of the second retardation film 15e is deposited is close to the liquid crystal panel 15c. The optical axis of the second retardation film 15e is parallel to the direction of 09:00 as the distinct vision direction.

n addition, the third retardation film 15f is disposed between the second retardation film 15e and the liquid crystal panel 15c. Particularly, as shown in FIG. 17G, the arrangement position of the third retardation film 15f may be an arrangement position P1 between the first polarizing film 15b and the first retardation film 15a1, an arrangement position P2 between the first retardation film 15a1 and the second retardation film 15e, or an arrangement position P3 between the liquid crystal panel 15c and the second polarizing film 15d.

In the arrangement shown in FIG. 17A, specifically, as shown in FIG. 18, since (i) the long axis direction of the liquid crystal molecules 51 tilted along 10:30 as the distinct vision direction and (ii) the primary refractive index nx" ' of the optical axis of the refractive anisotropic medium 255ae formed by the first retardation film 15a having the first optical axis parallel to the same direction as 00:00 as the distinct vision direction and the second retardation film 15e having the second optical axis parallel to the same direction as 09:00 intersect each other, the first retardation film 15a1, the second retardation film 15e, and the third retardation film 15f three-dimensionally compensate for the optical anisotropy of the liquid crystal molecules 51 into the optical isotropy.

Figure 17B:
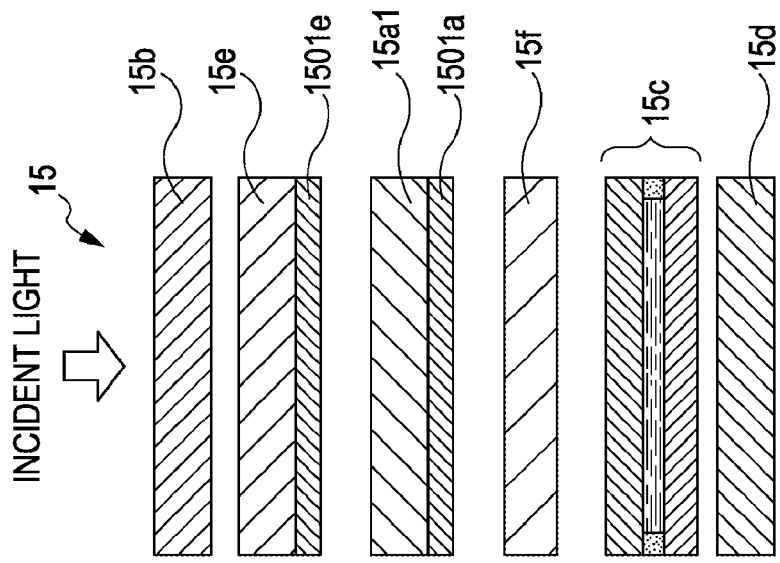

In FIG. 17B, the first retardation film 15a1 and the second retardation film 15e are exchanged in the arrangement shown in FIG. 17A.

In addition, the third retardation film 15f is disposed between the second retardation film 15e and the liquid crystal panel 15c.

Figure 17C:
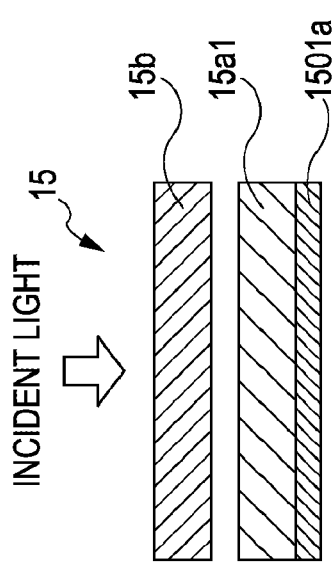

In FIG. 17C, the first retardation film 15a1 of which the optical axis is parallel to the same direction as 00:00 as the distinct vision direction is disposed on the side where light is incident on the liquid crystal panel 15c so that the first substrate 1501a1 on which the first deposited film 1503a of the first retardation film 15a1 is deposited is close to the liquid crystal panel 15c. The second retardation film 15e of which the optical axis is parallel to the same direction as 09:00 as the distinct vision direction is disposed on the side where light is output from the liquid crystal panel 15c so that the second substrate 1501e on which the second deposited film 1503e of the second retardation film 15e is deposited is apart from the liquid crystal panel 15c. The optical axis of the second retardation film 15e is parallel to the direction of 09:00 as the distinct vision direction.

In addition, the third retardation film 15f is disposed between the first retardation film 15a1 and the liquid crystal panel 15c. Particularly, as shown in FIG. 17H, the arrangement position of the third retardation film 15f may be an arrangement position P4 between the first polarizing film 15b and the first retardation film 15a1, an arrangement position P5 between the liquid crystal panel 15c and the second retardation film 15e, or an arrangement position P6 between the liquid crystal panel 15c and the second polarizing film 15d.

Figure 17D:
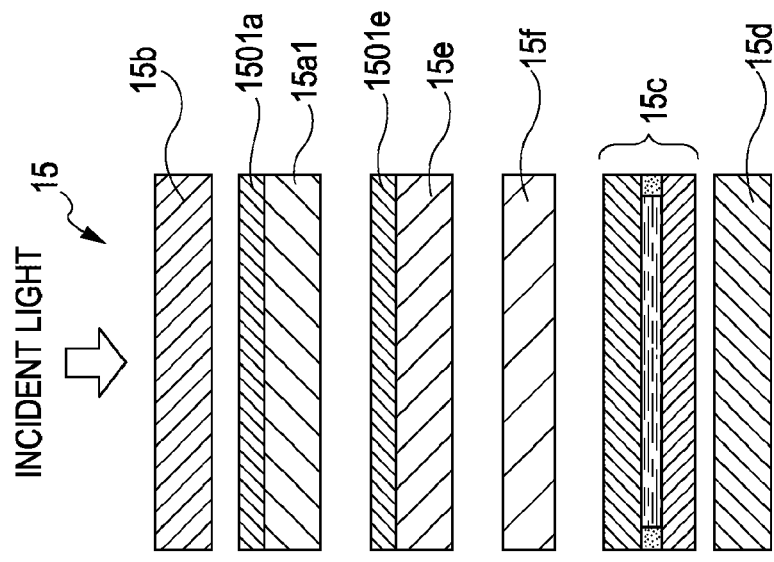
Figure 17E:
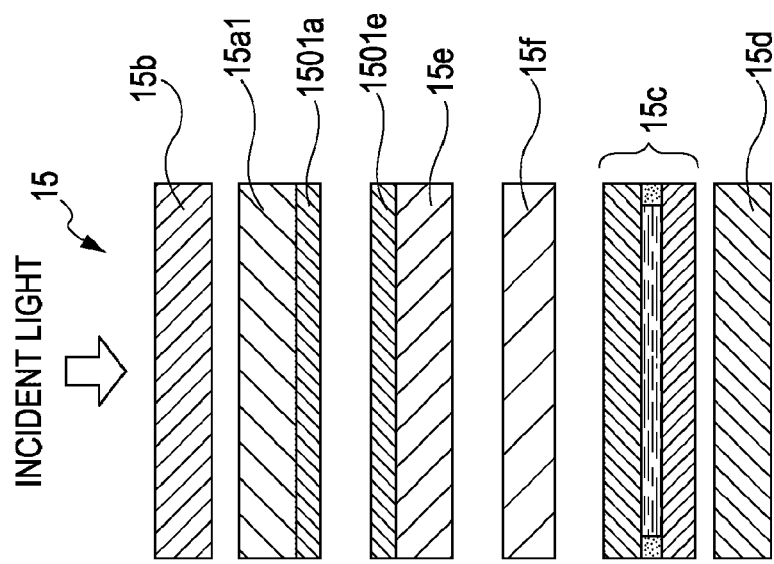
Figure 17F:
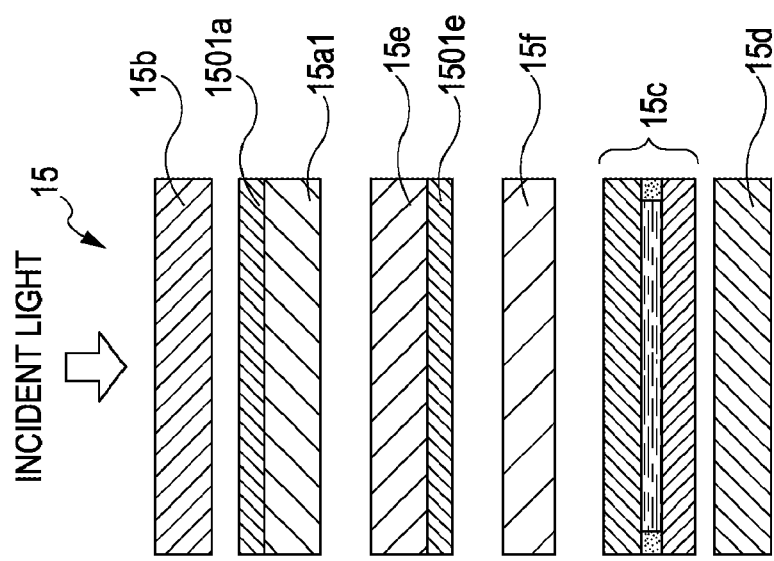

In FIGS. 17D to 17F, the third retardation film 15f is disposed between the second retardation film 15e and the liquid crystal panel 15c, the first retardation film 15a and the second retardation film 15e are disposed on the side where light is incident on the liquid crystal panel 15c, and the first substrate 1501a and the second substrate 1501e corresponding thereto are close to or apart from the liquid crystal panel 15c. Specifically, in FIG. 17D, the first substrate 1501a on which the first deposited film 1503a of the first retardation film 15a is deposited is apart from the liquid crystal panel 15c. The second substrate 1501e on which the second deposited film 1503e of the second retardation film 15e is close to the liquid crystal panel 15c. In FIG. 17E, the first substrate 1501a on which the first deposited film 1503a of the first retardation film 15a is deposited is close to the liquid crystal panel 15c. The second substrate 1501e on which the second deposited film 1503e of the second retardation film 15e is apart from the liquid crystal panel 15c. In FIG. 17F, the first substrate 1501a on which the first deposited film 1503a of the first retardation film 15a is deposited is apart from the liquid crystal panel 15c. The second substrate 1501e on which the second deposited film 1503e of the second retardation film 15e is apart from the liquid crystal panel 15c.

Retardation Film on Output Side

In FIG. 17G, the first retardation film 15a and the second retardation film 15e are disposed on the side where light is output from the liquid crystal panel 15c. Particularly, the first retardation film 15a and the second retardation film 15e disposed based on the output side can similarly take various arrangements based on the incidence side.

In the arrangement shown in FIG. 17G, specifically, as shown in FIG. 19, since (i) the long axis direction of the liquid crystal molecules 51 tilted along 10:30 as the distinct vision direction and (ii) the primary refractive index nx"" of the optical axis of the refractive anisotropic medium 255ae formed by the first retardation film 15a having the first optical axis parallel to the same direction as 00:00 as the distinct vision direction and the second retardation film 15e having the second optical axis parallel to the same direction as 09:00 intersect each other, the first retardation film 15a1, the second retardation film 15e, and the third retardation film 15f three-dimensionally compensate for the optical anisotropy of the liquid crystal molecules 51 into the optical isotropy.

In the projector according to the disclosure, one of various types of arrangements derived from the nine arrangements may be employed in addition to the nine arrangements shown in FIGS. 17A to 17I.

On the other hand, in the arrangement shown in FIG. 17G, since the first retardation film 15a1, the second retardation film 15e, and the third retardation film 15f are disposed on the light output side of the liquid crystal panel 15c, it is possible to compensate for the entire light passing through the liquid crystal panel 15c, thereby obtaining a better optical compensation effect. In the arrangement shown in FIG. 17G, since the first retardation film 15a1, the second retardation film 15e, and the third retardation film 15f are disposed on the light output side of the liquid crystal panel 15c, the first retardation film 15a1, the second retardation film 15e, and the third retardation film 15f can be apart from the light source and thus it is possible to effectively prevent the first retardation film 15a1, the second retardation film 15e, and the third retardation film 15f from being deteriorated due to the radiation of light or the increase in temperature resulting therefrom, thereby obtaining a projector with excellent reliability.

In the arrangements shown in FIGS. 17A, 17B, and 17D, to 17F, since the first retardation film 15a1, the second retardation film 15e, and the third retardation film 15f are disposed on the light incidence side of the liquid crystal panel 15c, it is possible to allow light to be incident on the liquid crystal panel 15c after properly adjusting the phase difference for the light from the light source.

Particularly, when the long axis direction of the liquid crystal molecules is another direction of 01:30 and the like as the distinct vision direction, the directions of the optical axes of the first retardation film 15a1 and the second retardation film 15e are changed accordingly, of course.

Third Embodiment

Figure 20A:
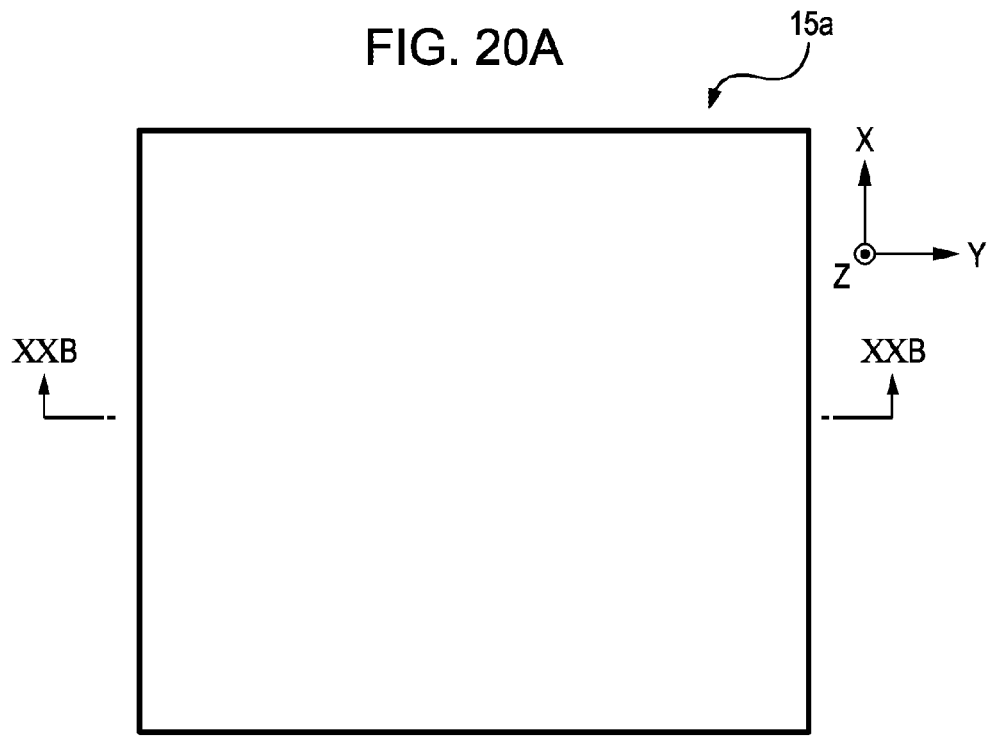
FIG. 20A is a plan view illustrating a retardation film according to a third embodiment of the disclosure.
Figure 20B:
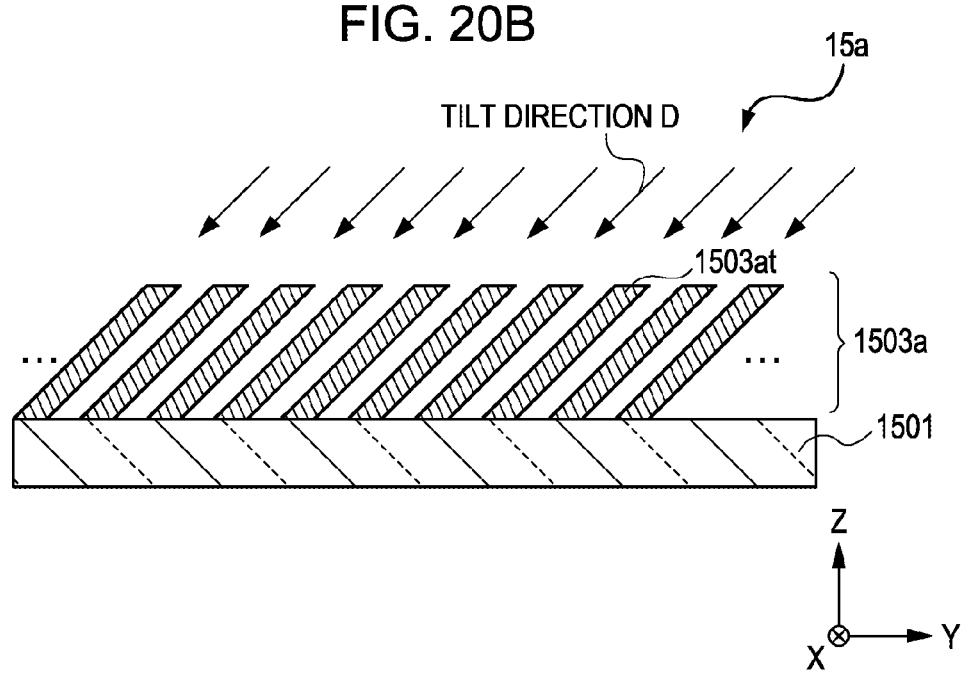
FIG. 20B is an enlarged sectional view taken along line XXB-XXB of FIG. 20A.
Figure 21A:
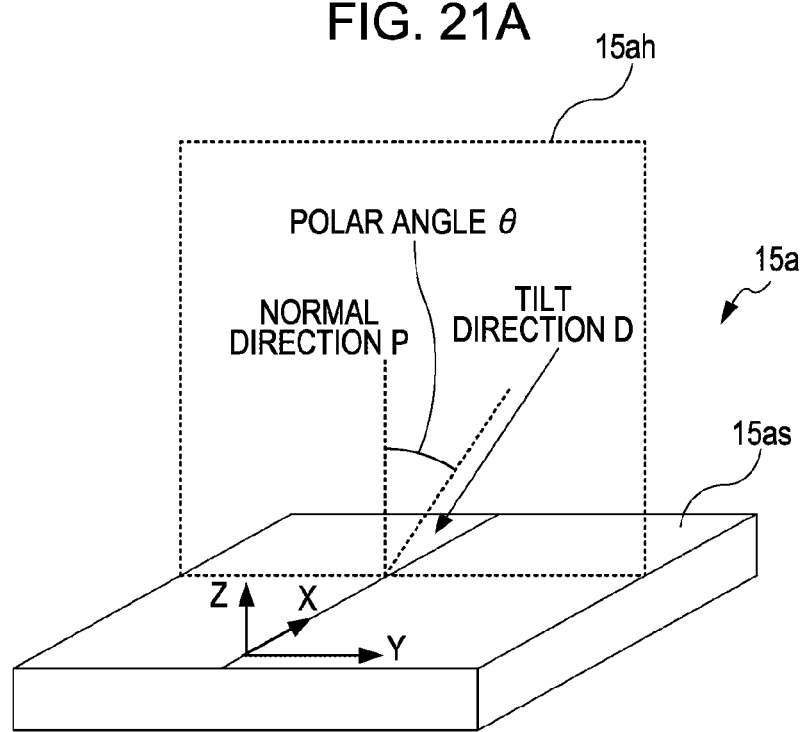
FIG. 21A is a perspective view illustrating an appearance of the retardation film according to the third embodiment of the disclosure.
Figure 21B:
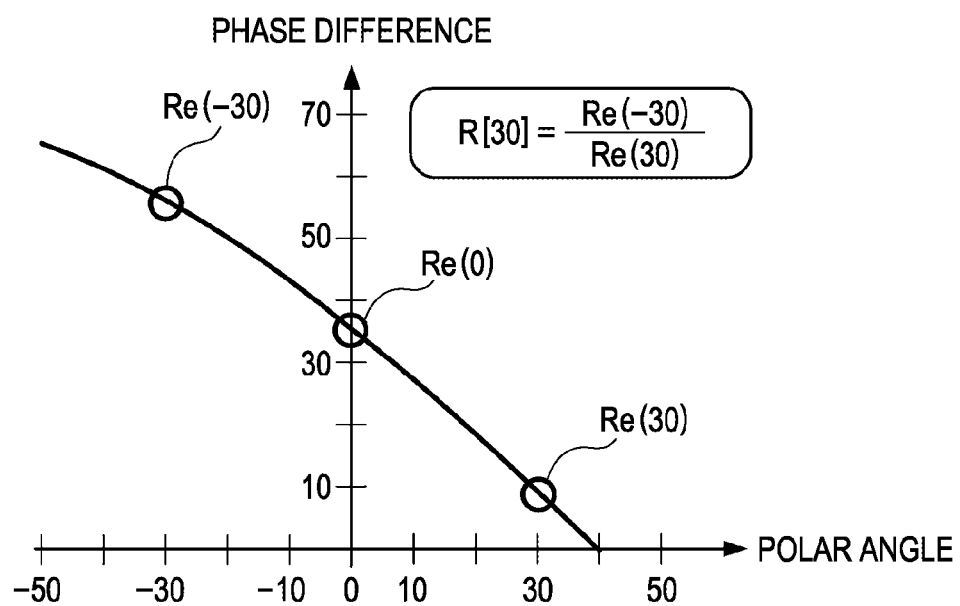
FIG. 21B is a graph quantitatively illustrating a ratio of the front phase difference according to the third embodiment and two phase differences.

A retardation film according to a third embodiment of the disclosure will be described now with reference to FIGS. 20A to 21B. FIG. 20A is a plan view illustrating a retardation film according to the third embodiment of the disclosure and FIG. 20B is an enlarged sectional view taken along line XXB-XXB of FIG. 20A. FIG. 21A is a perspective view illustrating an appearance of the retardation film according to the third embodiment of the disclosure and FIG. 21B is a graph quantitatively illustrating a front phase difference according to the third embodiment and a ratio of two phase differences. The X direction, the Y direction, and the Z direction shown in FIGS. 20A, 20B, and 21A are common to each other.

As shown in FIGS. 20A and 20B, the retardation film 15a according to the third embodiment includes a first substrate 1501 formed of, for example, a transparent glass substrate and a first deposited film 1503a formed on the first substrate 1501.

The first deposited film 1503a is formed on the first substrate 1501 by depositing inorganic materials such as $Ta_2O_5$ on the first substrate 1501 in an oblique direction D about the first substrate 1501.

As shown in FIG. 20B, the first deposited film 1503a microscopically has a film structure including a portion in which column structures obtained by allowing the inorganic materials to grow in the oblique direction D are formed. A phase difference is generated in the inorganic film having such a structure due to the minute structure. The first deposited film 1503a of the retardation film 15a microscopically has a column-like portion 1503at extending in the oblique direction D in which the inorganic material is obliquely deposited in the first substrate 1501 in a sectional view.

Particularly, as shown in FIG. 21A, the polar angle θ defining the measurement direction for measuring the phase difference of light is an angle oblique about the normal direction P of the substrate surface 15as. The polar angle is an angle of a sight line where the sight line as viewed from the front surface of the retardation film is 0 degrees. In this embodiment, the polar angle θ inclined in the oblique direction D from the normal line P is defined as minus and the polar angle θ inclined in the opposite direction is defined as plus. The orientation angle direction of the measurement direction for measuring the phase difference of light, that is, the in-plane direction of the substrate surface 15as, is set to a direction obtained by projecting onto the substrate surface 15as the oblique direction D in which the inorganic material is deposited, that is, the Y direction, for the purpose of convenient explanation. The deposition angle and the polar angle θ may be flush with the same plane 15ah. Accordingly, when the deposition angle and the polar angle θ are set to be equal to each other, the degrees of improvement in contrast of the liquid crystal device can be grasped depending on the phase difference of the inorganic material.

The ratio of two phase differences according to the third embodiment means a ratio between two phase differences using the polar angle as a variable. When the phase difference at the polar angle of "30 degrees" is used as a reference, the ratio R[30], which is a ratio between the phase difference at the polar angle of "30 degrees" and the phase difference at the polar angle of "−30 degrees", is defined by the following expression:

$$R[30]=Re(-30)/Re(30)$$

Here, Re(30) represents a phase difference at the polar angle of "30 degrees" and Re(−30) represents a phase difference at the polar angle of "−30 degrees." Specifically, as shown in FIG. 21B, when the phase difference at the polar angle of "30 degrees" is 9 nm and the phase difference at the polar angle of "−30 degrees" is 54 nm, the ration R[30]="6" can be obtained by replacing Re(30) of the expression with "9" and replacing Re(−30) with "54."

Particularly, the ratio of two phase differences using two polar angles symmetric about the normal direction as a variable is described in the third embodiment, but this embodiment is not limited thereto. The ratio of two phase differences according to the third embodiment may be a ratio of two phase differences using two polar angles asymmetric about the normal direction, such as a ratio of the phase difference at the polar angle of "30 degrees" and the phase difference at the polar angle of "−20 degrees." Alternatively, the ratio of phase differences according to this embodiment may be a ratio of two phase differences using two polar angles asymmetric about the normal direction as a variable, such as a ratio of a phase difference at the polar angle of "0 degrees", that is, a front phase difference, and a phase difference at the polar angle of "−30 degrees." As long as the ratio is a ratio of two phase differences using different two polar angles as a variable, a correlation between the front phase difference and the contrast can be determined theoretically, experimentally, experientially, or by simulation.

Figure 22:
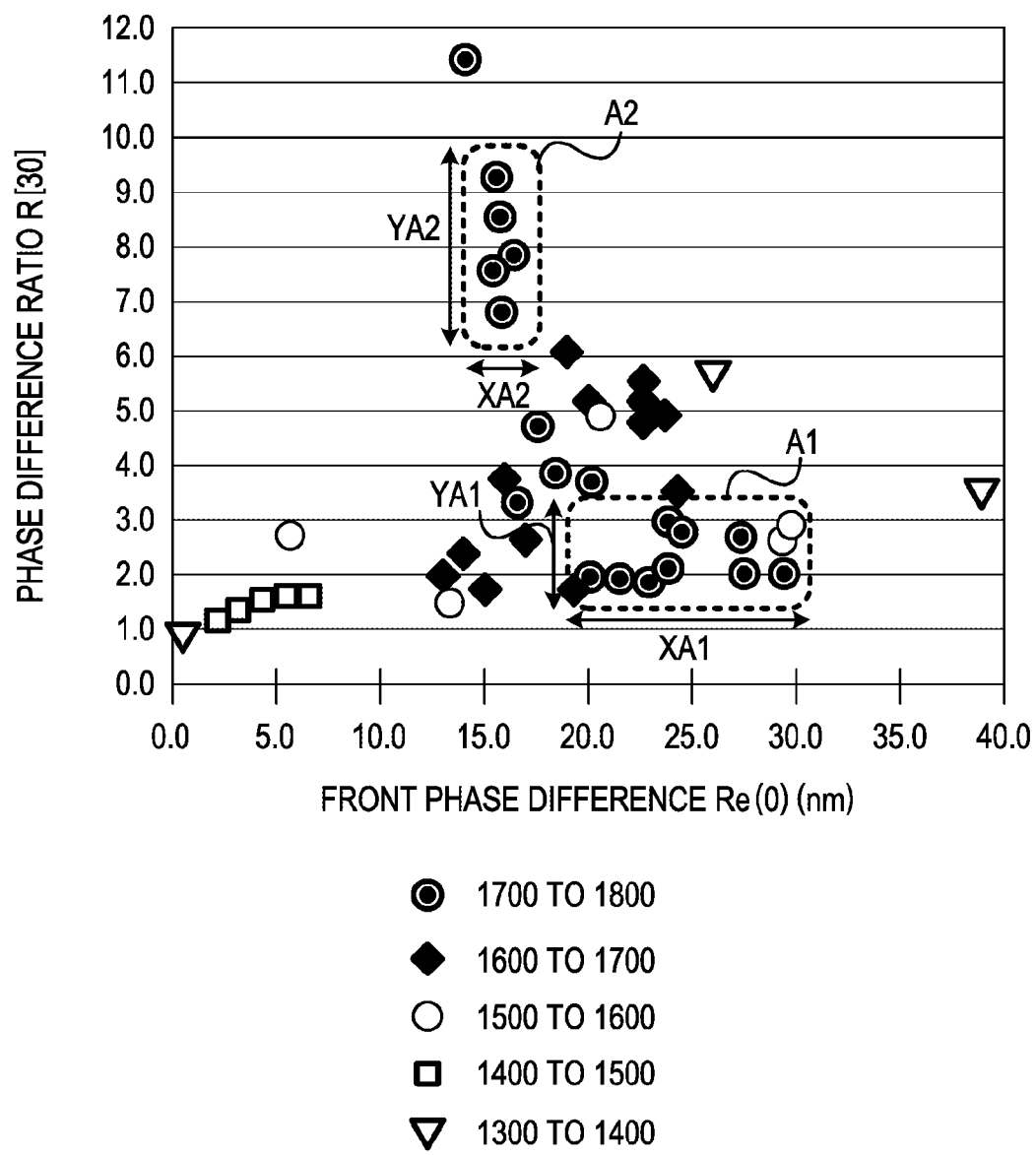
FIG. 22 is a graph illustrating a quantitative correlation between a front phase difference of the retardation film according to the third embodiment, a phase difference ratio, and the contrast.
Figure 23A:
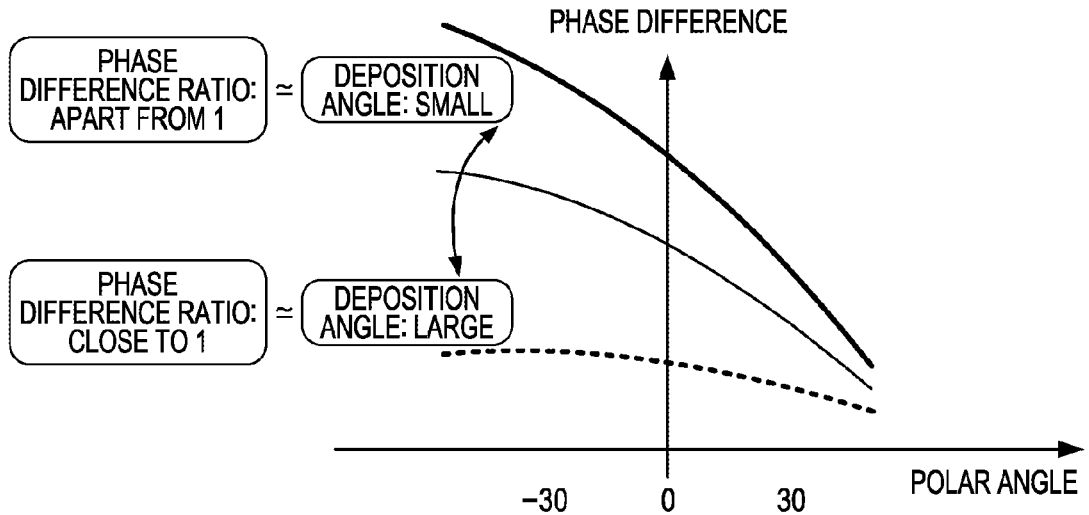
FIG. 23A is a graph illustrating a quantitative correlation between a phase difference, a polar angle, and a deposition angle where thicknesses of the retardation films are equal to each other according to the third embodiment.
Figure 23B:
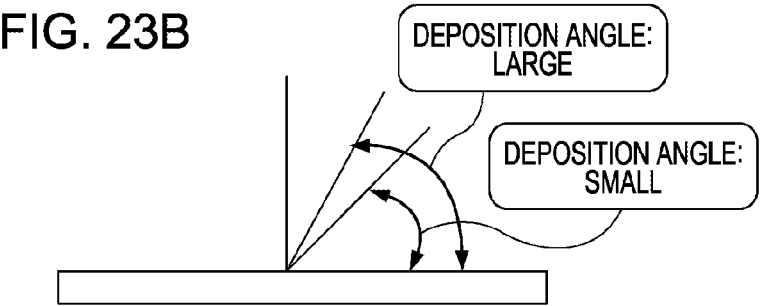
FIG. 23B is a diagram schematically illustrating a magnitude relation between the deposition angles according to the second embodiment.
Figure 23C:
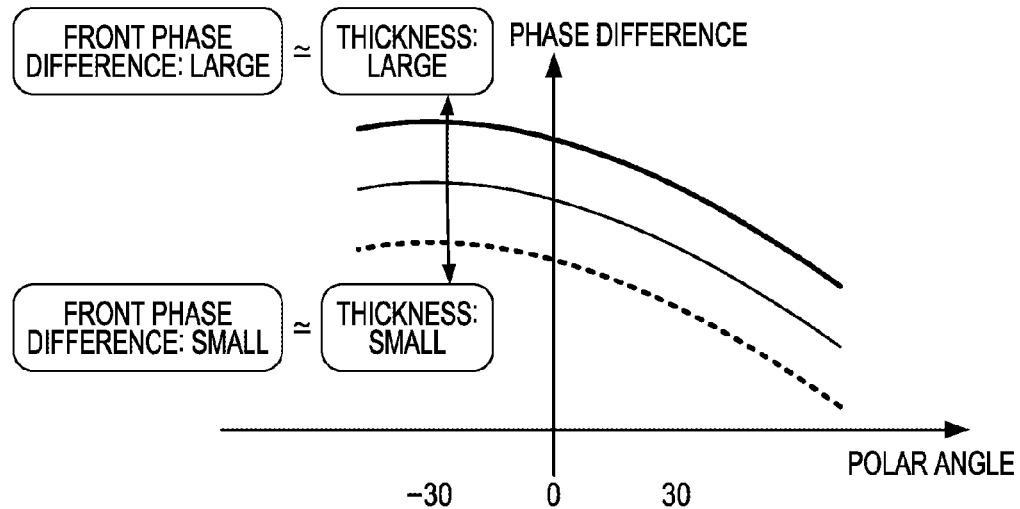
FIG. 23C is a graph illustrating a quantitative correlation between a phase difference, a polar angle, and a thickness of the retardation film where thicknesses of the retardation films are equal to each other according to the second embodiment.

Quantitative Analysis of Improvement in Contrast Due to Front Phase Difference, Deposition Angle, and Phase Difference Ratio Quantitative analysis of improvement in contrast due to the front phase difference of the retardation film according to the third embodiment, the deposition angle, and the phase difference ratio will be described now with reference to FIGS. 22, 23A, 23B, and 23C. FIG. 22 is a graph illustrating a quantitative correlation between the front phase difference of the retardation film according to the third embodiment, the phase difference ratio, and the contrast. In FIG. 22, a double circle, a black diamond, a white circle, a white rectangle, and a white inverted triangle correspond to the contrast values of "1700 to 1800", "1600 to 1700", "1500 to 1600", "1400 to 1500", and "1300 to 1400." FIG. 23A is a graph illustrating a quantitative correlation between a phase difference, a polar angle, and a deposition angle where thicknesses of the retardation films are equal to each other according to the third embodiment, FIG. 23B is a diagram schematically illustrating a magnitude relation between the deposition angles according to the second embodiment, and FIG. 23C is a graph illustrating a quantitative correlation between a phase difference, a polar angle, and a thickness of the retardation film where thicknesses of the retardation films are equal to each other according to the second embodiment. In FIGS. 23A and 23C, the horizontal axis represents the polar angle and the vertical axis represents the phase difference.

According to the inventor's study, as indicated by the double circle and area A1 in FIG. 22, in order to embody relatively high contrast in the range of "1700 to 1800", the phase difference ratio R[30] may be set to a range YA1 of about "1.5" to about "3.2" and the front phase difference is set to a range XA1 of about "20" to about "30." Alternatively, as indicated by the double circle and area A2 in FIG. 22, in order to embody relatively high contrast in the range of "1700 to 1800", the phase difference ratio R[30] may be set to a range YA2 of about "6.5" to about "9.5" and the front phase difference is set to a range XA2 of about "15" to about "17."

Specifically, according to the inventor's study, as shown in FIGS. 23A and 23B, for example, when the thickness of the retardation film 15a is constant, it is proved that the variation in phase difference per unit polar angle decreases as the deposition angle increases, that is, as the oblique direction for deposition becomes closer to the normal direction and the polar angle for deposition becomes closer to zero. Accordingly, it is proved that the phase difference ratio R[30] becomes closer to "1" as the deposition angle increases. Alternatively, according to the inventor's study, as shown in FIGS. 23A and 23B, for example, when the thickness of the retardation film 15a is constant, it is proved that the variation in phase difference per unit polar angle increases as the deposition angle decreases, that is, as the oblique direction for deposition becomes more apart from the normal direction and the polar angle for deposition becomes greater than zero. Accordingly, it is proved that the phase difference ratio R[30] becomes greatly apart from "1" as the deposition angle decreases.

According to the inventor's study, as shown in FIG. 23C, for example, when the deposition angle is fixed, it is proved that the phase difference at the polar angle of "0 degrees", that is, the front phase difference, increases as the thickness of the retardation film 15a increases. Alternatively, according to the inventor's study, as shown in FIG. 23C, for example, when the deposition angle is fixed, it is proved that the front phase difference decreases as the thickness of the retardation film 15a decreases. Specifically, the bold line corresponds to the relatively great thickness of the retardation film and the dotted line corresponds to the relatively small thickness of the retardation film.

In this way, by properly changing the deposition angle and the thickness of the retardation film, the phase difference ratio and the front phase difference can be set so that the contrast be the maximum. In other words, by the phase difference ratio as a variable in addition to or instead of using the deposition angle in the first embodiment as a variable, it is possible to further enhance the contrast in the retardation film.

Examples of the first predetermined range according to the disclosure are constructed by the ranges XA1 and XA2 of the front phase difference. Examples of the second predetermined range according to the disclosure are constructed by the phase difference ratios YA1 and YA2.

Figure 24A:
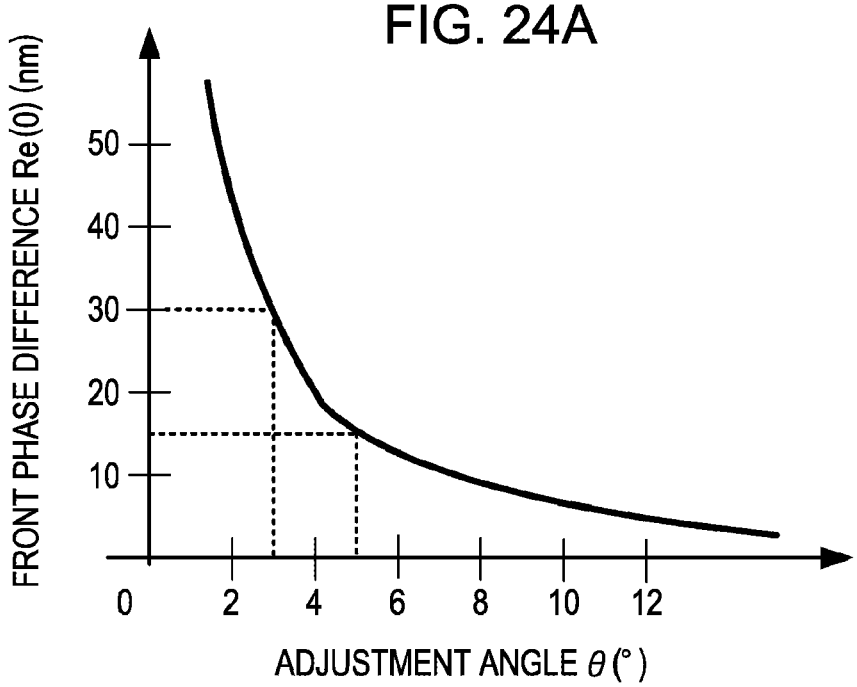
FIG. 24A is a graph illustrating a quantitative correlation between the front phase difference and an adjustment angle according to the third embodiment.

Correlation of Front Phase Difference, Rotation Angle Range of Retardation Film, and Contrast A correlation of the front phase difference, the range of rotation angle (hereinafter, referred to as "range of adjustment angle") of the retardation film, and the contrast according to the third embodiment will be described now with reference to FIGS. 24A and 24B. FIG. 24A is a graph illustrating a quantitative correlation between the front phase difference and an adjustment angle according to this embodiment and FIG. 24B is a graph illustrating a quantitative relation between the front phase difference, the adjustment angle of the retardation film, and the contrast according to the third embodiment.

As shown in FIG. 24A, the adjustment angle of the retardation film 15a for obtaining the maximum contrast can be made to decrease as the front phase difference increases. In other words, the adjustment angle of the retardation film 15a for obtaining the maximum contrast can be made to increase as the front phase difference decreases. Specifically, as shown in FIG. 24A, when the front phase difference Re(0) is "30 nm", the adjustment angle of the retardation film 15a can be set to, for example, 3 degrees. When the front phase difference Re(0) is "15 nm", the adjustment angle of the retardation film 15a can be set to, for example, 15 degrees.

Figure 24B:
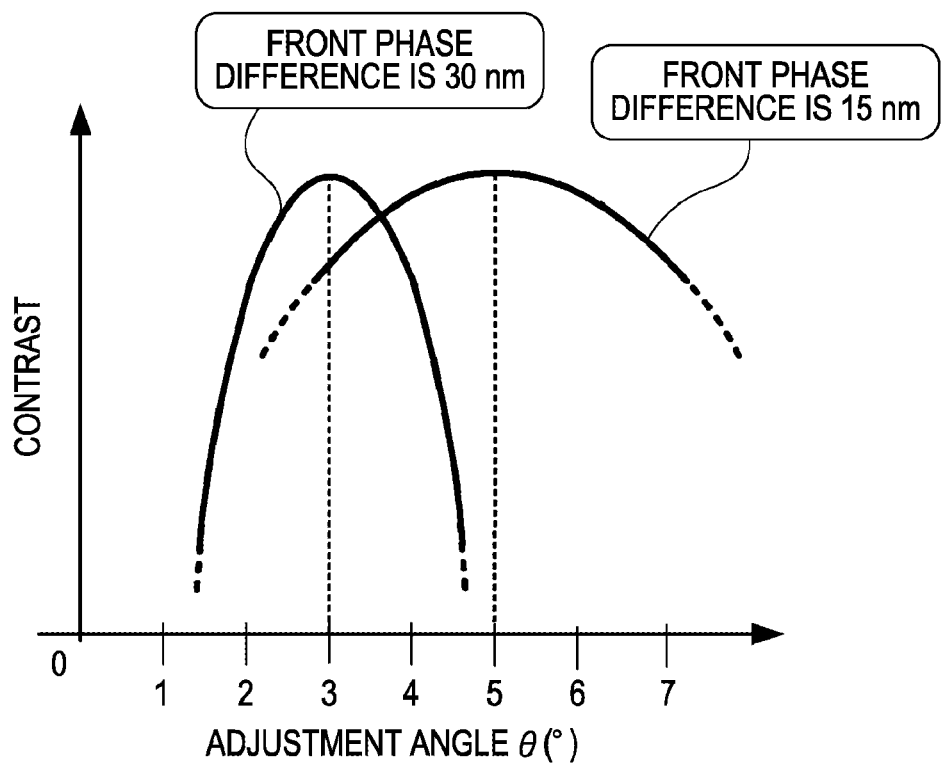
FIG. 24B is a graph illustrating a quantitative relation between the front phase difference, the adjustment angle of the retardation film, and the contrast according to the third embodiment.

As shown in FIG. 24B, the variation in contrast per unit adjustment angle of the retardation film 15a can be made to increase as the front phase difference increases. In other words, the variation in contrast per unit adjustment angle of the retardation film 15a can be made to decrease as the front phase difference decreases. Specifically, as show n in FIG. 24B, when the front phase difference Re(0) is "30 nm", the maximum contrast can be obtained by setting the adjustment angle of the retardation film 15a to 3 degrees. When the front phase difference Re(0) is "15 nm", the maximum contrast can be obtained by setting the adjustment angle of the retardation film 15a to 5 degrees. The variation in contrast per unit adjustment angle of the retardation film 15a when the front phase difference Re(0) is "30 nm" can be set to be greater than the variation in contrast per unit adjustment angle of the retardation film 15a when the front phase difference Re(0) is "15 nm." Accordingly, the abrupt curve is shown in FIG. 24B.

According to the third embodiment, by setting the front phase difference to a proper value in addition to setting the ratio of two phase differences, a desired range of adjustment angle of the retardation film 15a can be simply and properly determined in the process of assembling a projector or in a user's adjustment operation, which is very advantageous in practice.

Fourth Embodiment

A polarizing film and a retardation film according to a fourth embodiment of the disclosure will be described now with reference to FIGS. 25 and 26. FIG. 25 is a diagram illustrating a configuration of a liquid crystal light valve according to the fourth embodiment of the disclosure. In the fourth embodiment, substantially the same elements as the above-mentioned embodiments are denoted by like reference numerals and description thereof is properly omitted.

As shown in FIG. 25, sequentially from a side most apart from the liquid crystal panel 15c, a retardation film 15a (another example of the first retardation film in the claims) according to the fourth embodiment includes a vertically-deposited film 1501c formed by vertically depositing a refractive anisotropic medium 255c maintaining the refractive anisotropy, a first substrate 1501, a first deposited film 1503a formed by obliquely depositing a refractive anisotropic medium 255a maintaining the refractive anisotropy, and a second substrate 1502.

In general, in the vertically-deposited film 1501c such as a C plate, minute bubbles are generated in the manufacturing process and are included in the vertically-deposited film 1501c. On the contrary, in this embodiment, the vertically-deposited film 1501c is disposed more apart from the liquid crystal panel 15c than the first substrate 1501, the first deposited film 1503a, and the second substrate 1502. Accordingly, it is possible to markedly reduce the degrees of focusing the bubbles included in the vertically deposited film 1501c. As a result, it is possible to effectively prevent the bubbles included in the vertically-deposited film 1501c from being projected to badly affect a projection image.

Configuration of Retardation Film

Detailed description of the retardation film according to this embodiment will be described now with reference to FIG. 26. FIG. 26 is a perspective view schematically illustrating the deposition direction and the deposition angle which define a relative position relation between two kinds of refractive anisotropic mediums of the retardation film according to this embodiment and the first substrate of the retardation film.

Figure 26:
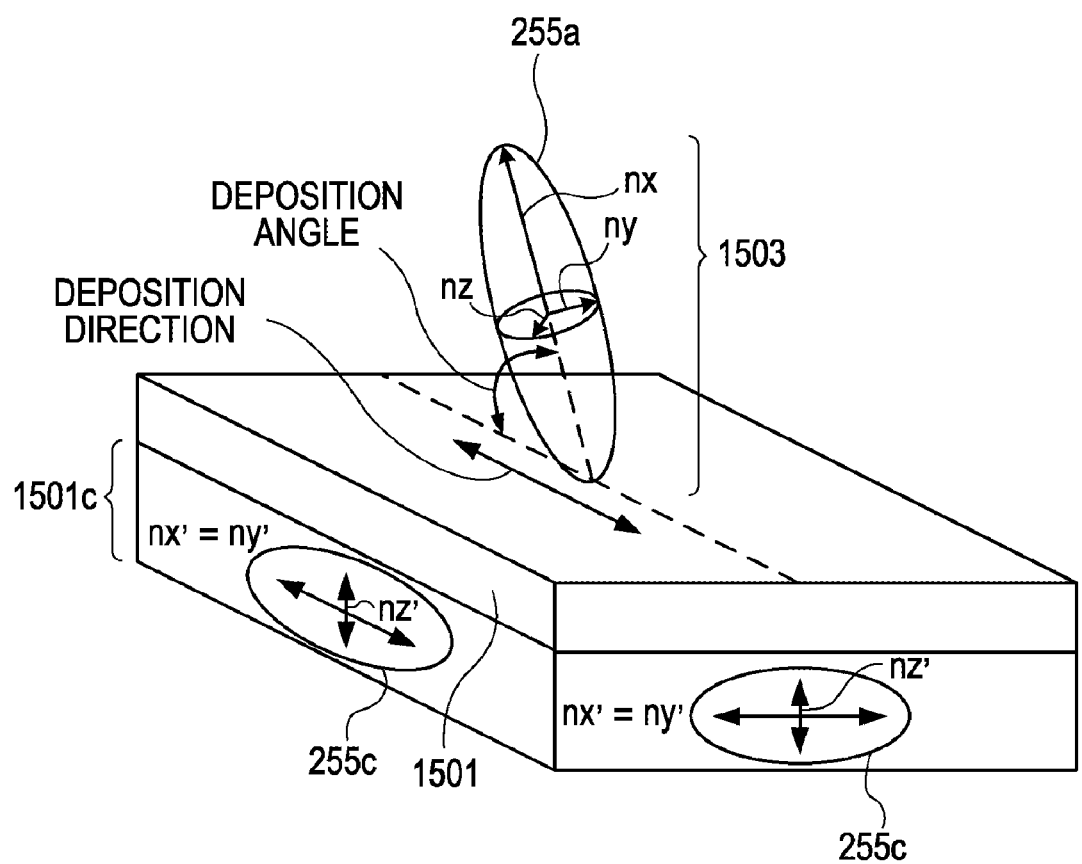
FIG. 26 is a perspective view schematically illustrating an appearance of a deposition direction and a deposition angle which define a relative position relation between two kinds of refractive anisotropic mediums of a retardation film according to the fourth embodiment and a first substrate of the retardation film.

As shown in FIG. 26, in the first deposited film 1501c of the retardation film 15a, the refractive anisotropic medium 255c is vertically deposited on the first substrate 1501 from the downside to the upside in FIG. 26. Specifically, as described above, the primary refractive indexes nx', ny', and nz' of the first deposited film 1501c satisfy the relation of nx'=ny'>nz'.

In the first deposited film 1503a of the retardation film 15a, the refractive anisotropic medium 255a is obliquely deposited on the first substrate 1501 from the upside to the downside in FIG. 26 in a predetermined direction, that is, the deposition direction. The refractive anisotropic medium 255a is obliquely deposited so that the optical axis corresponding to the primary refractive index nx of the refractive anisotropic medium 255a forms a predetermined angle, that is, the deposition angle about the plane direction of the first substrate 1501. The deposition angle can be said to be a value obtained by subtracting the angle between the normal line of the first substrate 1501 and the optical axis corresponding to the primary refractive index nx of the refractive anisotropic medium 255a from 90 degrees. Alternatively, the deposition angle can be said to be an angle formed by the optical axis corresponding to the primary refractive index nx of the refractive anisotropic medium 255a and the deposition direction.

When the vertically-deposited film 1501c such as a C plate is formed on the first deposited film 1503a obliquely deposited by a sputtering method, or when the first deposited film 1503a is formed on the vertically-deposited film 1501c such as a C plate by an oblique deposition method, moisture is mixed into the vertically-deposited film 1501c, thereby causing a technical problem that the quality of the vertically-deposited film 1501c is deteriorated.

On the contrary, according to the fourth embodiment, the vertically-deposited film 1501c such as a C plate is formed on one surface of the first substrate 1501 and the first deposited film 1503a is formed on the other surface of the first substrate 1501. Accordingly, at the time of forming the vertically-deposited film 1501c such as a C plate by the sputtering method, the degrees of mixing moisture into the vertically-deposited film 1501c can be reduced, thereby further improving the quality of the vertically-deposited film 1501c.

Fifth Embodiment

Figure 27:
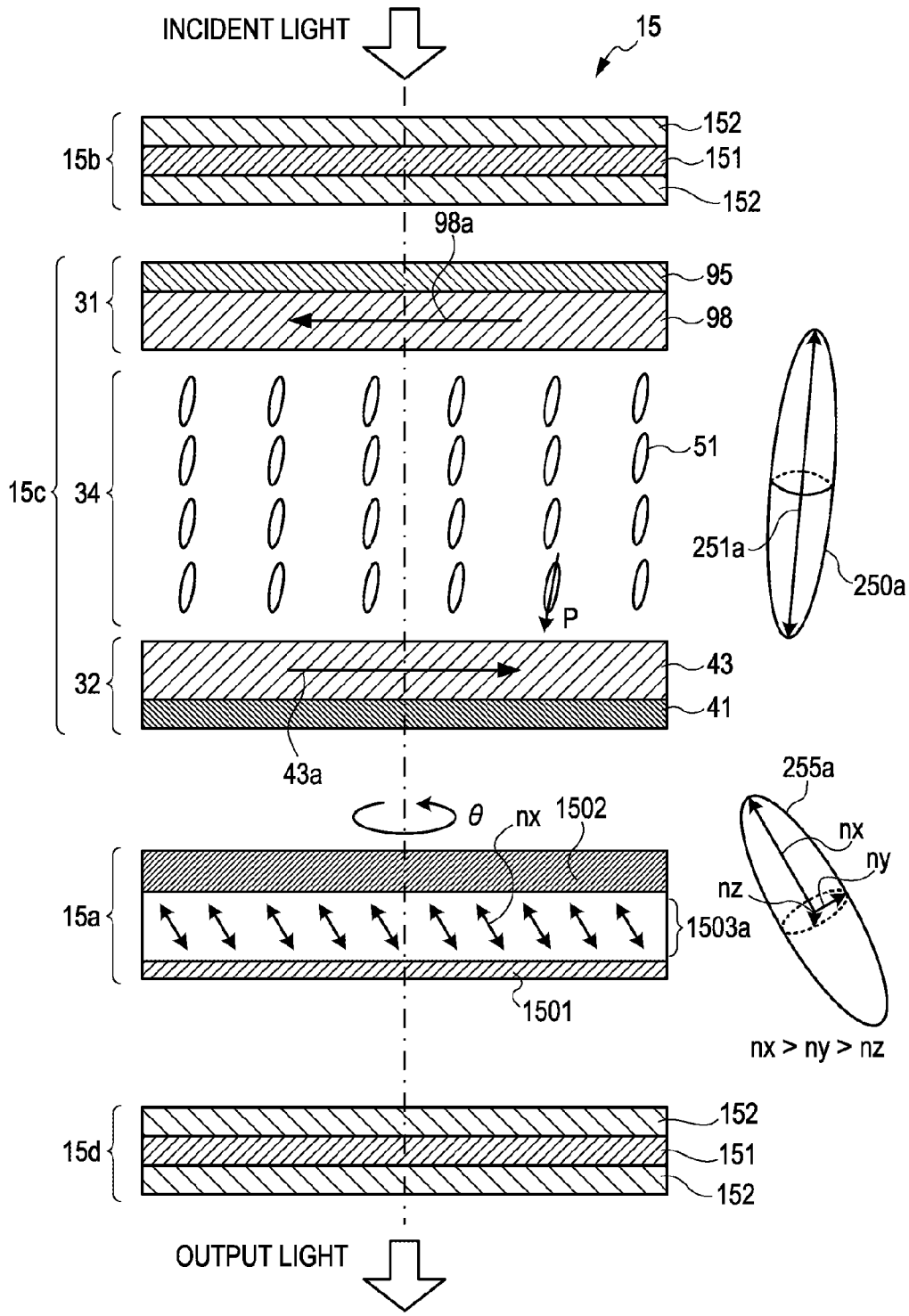
FIG. 27 is a diagram illustrating a configuration of a liquid crystal light valve according to a fifth embodiment of the disclosure.

A polarizing film and a retardation film according to a fifth embodiment of the disclosure will be described now with reference to FIG. 27. FIG. 27 is a diagram illustrating a configuration of a liquid crystal light valve according to the fifth embodiment of the disclosure.

As shown in FIG. 27, the liquid crystal light valve 15 according to the fifth embodiment includes the liquid crystal panel 15c, a first polarizing film 15b disposed outside the counter substrate 31 of the liquid crystal panel 15c, a retardation film 15a disposed outside the TFT array substrate 32, and a second polarizing film 15d disposed outside the second retardation film 15e.

In the liquid crystal light valve 15 according to this embodiment, a side (upper side in the drawing) on which the first polarizing film 15b is disposed is a light incidence side and a side on which the second polarizing film 15d is disposed is a light output side.

In the liquid crystal panel 15c, the alignment films 43 and 98 opposed to each other with the liquid crystal layer 34 interposed therebetween are formed by depositing silicon oxide in a tilt direction which is deviated by 50° from the normal direction of the substrate. The thicknesses thereof both are about 40 nm. The alignment directions 43a and 98a indicated by arrows in the alignment films 43 and 98 shown in FIG. 27 are parallel to the substrate in-plane direction of the deposition directions at the time formation. The alignment direction 43a of the alignment film 43 and the alignment direction 98a of the alignment film 98 are parallel to each other.

By the alignment control force of the alignment films 43 and 98, the liquid crystal molecules 51 are aligned in a state where the liquid crystal molecules are tilted by 2° to 8° from the normal line of the substrate and the direction of a director (pretilt direction P) of the liquid crystal molecules 51 is parallel the alignment directions 43a and 98a in the substrate in-plane direction.

The first polarizing film 15b and the second polarizing film 15d both have a three-layered structure in which a polarizing element 151 formed of dyed polyvinyl alcohol (PVA) is interposed between two protective films 152 formed of triacetyl cellulose (TAC). As shown in FIG. 4, the transmission axis 151b of the first polarizing film 15b and the transmission axis 151d of the second polarizing film 15d are disposed to perpendicular to each other. The directions of the transmission axes 151b and 151d of the polarizing films 15b and 15d are deviated from the alignment direction (deposition direction) 43a of the alignment film 43 of the liquid crystal panel 15c by about 45° in a plan view.

The retardation film 15a includes a first deposited film 1503a formed by obliquely depositing a refractive anisotropic medium maintaining the refractive anisotropy, a first substrate 1501, and a second substrate 1502. The primary refractive indexes in the optical axis direction of the index ellipsoid of the refractive anisotropic medium 255a are shown in one side in FIG. 27. In this embodiment, the primary refractive indexes nx, ny, and nz satisfy a relation of nx>ny>nz. That is, the refractive index nx in the direction tilted from the normal direction of the first substrate 1501 or the second substrate 1502 is greater than the refractive indexes ny and nz in the other directions and thus the index ellipsoid has a rice grain shape. Specifically, a representative example of the refractive anisotropic medium 255a is a biaxial plate.

According to this embodiment, by adjusting the direction in which the first optical axis of the first refractive anisotropy of the first retardation film is tilted and the angle at which the first optical axis of the first refractive anisotropy of the first retardation film intersect the first substrate by the oblique deposition of the first deposited film, it is possible to satisfactorily compensate for the phase difference generated in the liquid crystal panel by the use of the first retardation film. As a result, it is possible to obtain a display with high contrast and high quality.

Sixth Embodiment

A polarizing film and a retardation film according to a sixth embodiment of the disclosure will be described now with reference to FIG. 28. FIG. 28 is a diagram illustrating a configuration of a liquid crystal light valve according to the sixth embodiment of the disclosure.

As shown in FIG. 28, the liquid crystal light valve 15 according to the sixth embodiment includes the liquid crystal panel 15c, a first polarizing film 15b disposed outside the counter substrate 31 of the liquid crystal panel 15c, a retardation film 15a disposed outside the TFT array substrate 32, and a second polarizing film 15d disposed outside the second retardation film 15e.

In the liquid crystal light valve 15 according to this embodiment, a side (upper side in the drawing) on which the first polarizing film 15b is disposed is a light incidence side and a side on which the second polarizing film 15d is disposed is a light output side.

In the liquid crystal panel 15c, the alignment films 43 and 98 opposed to each other with the liquid crystal layer 34 interposed therebetween are formed by depositing silicon oxide in a tilt direction which is deviated by 50° from the normal direction of the substrate. The thicknesses thereof both are about 40 nm. The alignment directions 43a and 98a indicated by arrows in the alignment films 43 and 98 shown in FIG. 28 are parallel to the substrate in-plane direction of the deposition directions at the time formation. The alignment direction 43a of the alignment film 43 and the alignment direction 98a of the alignment film 98 are parallel to each other.

By the alignment control force of the alignment films 43 and 98, the liquid crystal molecules 51 are aligned in a state where the liquid crystal molecules are tilted by 2° to 8° from the normal line of the substrate and the direction of a director (pretilt direction P) of the liquid crystal molecules 51 is parallel the alignment directions 43a and 98a in the substrate in-plane direction.

The first polarizing film 15b and the second polarizing film 15d both have a three-layered structure in which a polarizing element 151 formed of dyed polyvinyl alcohol (PVA) is interposed between two protective films 152 formed of triacetyl cellulose (TAC). As shown in FIG. 4, the transmission axis 151b of the first polarizing film 15b and the transmission axis 151d of the second polarizing film 15d are disposed to perpendicular to each other. The directions of the transmission axes 151b and 151d of the polarizing films 15b and 15d are deviated from the alignment direction (deposition direction) 43a of the alignment film 43 of the liquid crystal panel 15c by about 45° in a plan view.

The retardation film 15a (an example of the first retardation film in the claims) includes a first substrate 1501, a vertically-deposited film 1501c formed by vertically depositing the refractive anisotropic medium 255c maintaining the refractive anisotropy, a first deposited film 1503a formed by obliquely depositing the refractive anisotropic medium 255a maintaining the refractive anisotropy, and a second substrate 1502.

An average index ellipsoid of the refractive anisotropic medium 255c of the vertically-deposited film 1501c is schematically shown aside the vertically-deposited film 1501c in FIG. 28. In the drawing, nx' and ny' represent the primary refractive indexes in the in-plane direction of the vertically-deposited film 1501c and nz' represents the primary refractive index in the thickness direction of the vertically-deposited film 1501c. In this embodiment, the primary refractive indexes nx', ny', and nz' satisfy a relation of nx'=ny'>nz'. That is, the refractive index nz' in the thickness direction is smaller than the refractive indexes in the other directions and thus the index ellipsoid has a disk shape. The index ellipsoid 255c is aligned to be parallel to the surface of the vertically-deposited film 1501c and the optical axis direction (short axis direction of the index ellipsoid) of the vertically-deposited film 1501c is parallel to the normal direction of the surface.

The primary refractive indexes in the optical axis direction of the index ellipsoid of the refractive anisotropic medium 255a are shown aside the first deposited film 1503a in FIG. 28. In this embodiment, the primary refractive indexes nx, ny, and nz satisfy a relation of nx>ny>nz. That is, the refractive index nx in the direction tilted from the normal direction of the first substrate 1501 or the second substrate 1502 is greater than the refractive indexes ny and nz in the other directions and thus the index ellipsoid has a rice grain shape.

According to this embodiment, by adjusting the direction in which the first optical axis of the first refractive anisotropy of the first retardation film is tilted and the angle at which the first optical axis of the first refractive anisotropy of the first retardation film intersect the first substrate by the oblique deposition of the first deposited film and in addition setting the uniaxial optical axis of the uniaxial refractive anisotropy of the uniaxial retardation film to be parallel to the thickness direction, it is possible to satisfactorily compensate for the phase difference generated in the liquid crystal panel by the use of the first retardation film. As a result, it is possible to obtain a display with high contrast and high quality.

Seventh Embodiment

A polarizing film and a retardation film according to a seventh embodiment of the disclosure will be described now with reference to FIG. 29. FIG. 29 is a diagram illustrating a configuration of a liquid crystal light valve according to the seventh embodiment of the disclosure.

As shown in FIG. 29, the liquid crystal light valve 15 according to the seventh embodiment includes the liquid crystal panel 15c, a first polarizing film 15b disposed outside the counter substrate 31 of the liquid crystal panel 15c, a retardation film 15a disposed outside the TFT array substrate 32, a second retardation film 15e disposed outside the retardation film 15a, and a second polarizing film 15d disposed outside the second retardation film 15e.

In the liquid crystal light valve 15 according to this embodiment, a side (upper side in the drawing) on which the first polarizing film 15b is disposed is a light incidence side and a side on which the second polarizing film 15d is disposed is a light output side.

In the liquid crystal panel 15c, the alignment films 43 and 98 opposed to each other with the liquid crystal layer 34 interposed therebetween are formed by depositing silicon oxide in a tilt direction which is deviated by 50° from the normal direction of the substrate. The thicknesses thereof both are about 40 nm. The alignment directions 43a and 98a indicated by arrows in the alignment films 43 and 98 shown in FIG. 29 are parallel to the substrate in-plane direction of the deposition directions at the time formation. The alignment direction 43a of the alignment film 43 and the alignment direction 98a of the alignment film 98 are parallel to each other.

By the alignment control force of the alignment films 43 and 98, the liquid crystal molecules 51 are aligned in a state where the liquid crystal molecules are tilted by 2° to 8° from the normal line of the substrate and the direction of a director (pretilt direction P) of the liquid crystal molecules 51 is parallel the alignment directions 43a and 98a in the substrate in-plane direction.

The first polarizing film 15b and the second polarizing film 15d both have a three-layered structure in which a polarizing element 151 formed of dyed polyvinyl alcohol (PVA) is interposed between two protective films 152 formed of triacetyl cellulose (TAC). As shown in FIG. 4, the transmission axis 151b of the first polarizing film 15b and the transmission axis 151d of the second polarizing film 15d are disposed to perpendicular to each other. The directions of the transmission axes 151b and 151d of the polarizing films 15b and 15d are deviated from the alignment direction (deposition direction) 43a of the alignment film 43 of the liquid crystal panel 15c by about 45° in a plan view.

The first retardation film 15a includes a first deposited film 1503a formed by obliquely depositing a refractive anisotropic medium maintaining the refractive anisotropy, a substrate 1501a, and a substrate 1502a. The primary refractive indexes in the optical axis direction of the index ellipsoid of the refractive anisotropic medium 255a are shown aside the first retardation film 15a in FIG. 29. In this embodiment, the primary refractive indexes nx', ny', and nz' satisfy a relation of nx'>ny'>nz'. That is, the refractive index nx' in the direction tilted from the normal direction of the substrate 1501a or the substrate 1502a is greater than the refractive indexes ny' and nz' in the other directions and thus the index ellipsoid has a rice grain shape.

The second retardation film 15e includes a second deposited film 1503e formed by obliquely depositing a refractive anisotropic medium maintaining the refractive anisotropy, a substrate 1501e, and a substrate 1502e. The primary refractive indexes in the optical axis direction of the index ellipsoid of the refractive anisotropic medium 255e are shown aside the second retardation film 15e in FIG. 29. In this embodiment, the primary refractive indexes nx", ny", and nz" satisfy a relation of nx">ny">nz". That is, the refractive index nx" in the direction tilted from the normal direction of the substrate 1501e or the substrate 1502e is greater than the refractive indexes ny" and nz" in the other directions and thus the index ellipsoid has a rice grain shape.

Particularly, as viewed in the normal direction of the second retardation film 15e (or the first retardation film 15a), the direction in which the optical axis of the primary refractive index nx" of the second retardation film 15e is tilted and the direction in which the optical axis of the primary refractive index nx' of the first retardation film 15a is tilted may be perpendicular to each other.

Specifically, a representative example of the refractive anisotropic medium 255a (or the refractive anisotropic medium 255e) is a biaxial plate.

According to this embodiment, by adjusting the first direction in which the first optical axis of the first refractive anisotropy of the first retardation film is tilted by the oblique deposition of the first deposited film and the second direction in which the second optical axis of the second refractive anisotropy of the second retardation film is tilted by the oblique deposition of the second deposited film, it is possible to satisfactorily compensate for the phase difference generated in the liquid crystal panel by the use of the first and second retardation films. As a result, it is possible to obtain a display with high contrast and high quality.

Another example of the first retardation film 15a (or 15a1) and the second retardation film 15e according to this embodiment of the disclosure can include films having an optical anisotropic layer formed of discotic liquid crystal aligned oblique (tilt-aligned) about the film surface of the retardation films. The retardation films can be formed by disposing an alignment film on a base substrate such as TAC and applying the discotic liquid crystal such as triphenylene derivative on the alignment film. More specifically, a pair of substrates on which an alignment film formed of polyimide or the like is formed is prepared, the discotic liquid crystal is applied to one substrate, and the discotic liquid crystal is interposed by the other substrate. Then, a discotic nematic (ND) phase is formed by heating and then is polymerized by UV to fix the alignment state. At the time of forming the ND phase, the discotic liquid crystal is pretilted by the alignment film and the optical axis is inclined obliquely. The slope angle of the optical axis can be controlled by an alignment process (such as rubbing) of the alignment film.

Alternatively, in another example of the first retardation film 15a (or 15a1) and the second retardation film 15e according to the embodiments of the disclosure, the retardation films can be formed by stretching a polycarbonate or norbornene resin with a shearing stress applied thereto. In this case, the material resin is stretched in two directions in a state where the material resin is heated to the vicinity of the glass transition temperature and then the stretched resin is interposed between a pair of heated substrates. Then, the pair of substrates is deviated in the opposite directions from each other while pressing the material resin from the outside of one substrate. Accordingly, the shearing stress is applied to the upper and lower surfaces of the material resin in the opposite directions and thus the optical direction of optical bodies constituting the material resin is inclined obliquely. The slope angle of the optical axis can be controlled depending on the magnitude of the shearing stress.

Liquid crystal devices, projectors, and optical compensation methods of the liquid crystal devices including the modifications belong to the technical scope of the disclosure. Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This disclosure is intended to cover any adaptations or variations of the embodiments discussed herein. Therefore, it is manifestly intended that embodiments in accordance with the present disclosure be limited only by the claims and the equivalents thereof.

What is claimed is:

1. A liquid crystal device comprising:
    a liquid crystal panel including:
        a pair of substrates; and
        a vertically-aligned liquid crystal interposed between the pair of substrates;
    a pair of polarizing films that interposes the liquid crystal panel therebetween;
    a first retardation film that is disposed between the pair of polarizing films, the first retardation film including:
        a first substrate;
        a vertically-deposited film maintaining a uniaxial refractive anisotropy and having a vertically deposited inorganic material on the first substrate so that a uniaxial optical axis of the uniaxial refractive anisotropy is parallel to a thickness direction; and
        a first deposited film maintaining a first refractive anisotropy and having an obliquely deposited inorganic material on the vertically-deposited film so that a first optical axis of the first refractive anisotropy is tilted in a first direction, the first refractive anisotropy being biaxial; and
    a second retardation film that is disposed between the pair of polarizing films, the second retardation film including:
        a second substrate; and
        a second deposited film maintaining a second refractive anisotropy and having an obliquely deposited inorganic material on the second substrate so that a second optical axis of the second refractive anisotropy is tilted in a second direction different from the first direction,
    wherein at least one of the pair of polarizing films is rotatable about a normal direction of the first retardation film, and
    wherein the first retardation film is rotatable about the normal direction of the first retardation film, the first retardation film being rotatable independent of the at least one of the pair of polarizing films such that the vertically-deposited film is rotatable only in conjunction with the first deposited film.

2. The liquid crystal device according to claim 1, wherein the vertically-deposited film is disposed more apart from the liquid crystal panel than the first deposited film.

3. The liquid crystal device according to claim 1, wherein a thickness of the vertically-deposited film and a refractive index in the thickness direction of the vertically-deposited film are set so that a phase difference is 20 nm or less where a polar angle indicating an angle of a sight line is 30 degrees when the sight line from a just front surface of one of the pair of polarizing films located on a light output side is 0 degrees.

4. The liquid crystal device according to claim 1, wherein the second retardation film is rotatable independent of the first retardation film and the at least one of the pair of polarizing films.

5. The liquid crystal device according to claim 1, wherein at least one of the first retardation film and the second retardation film has a thickness of from approximately 0.2 μm to approximately 0.8 μm in the thickness direction.

6. A liquid crystal device comprising:
    a liquid crystal panel including:
        a pair of substrates; and
        a vertically-aligned liquid crystal interposed between the pair of substrates;
    a pair of polarizing films that interposes the liquid crystal panel therebetween; and
    a first retardation film that is disposed between the pair of polarizing films, the first retardation film including:
        a first substrate;
        a vertically-deposited film maintaining a uniaxial refractive anisotropy and having a vertically deposited inorganic material on the first substrate so that a uniaxial optical axis of the uniaxial refractive anisotropy is parallel to a thickness direction; and
        a first deposited film maintaining a first refractive anisotropy and having an obliquely deposited inorganic material on the vertically-deposited film so that a first optical axis of the first refractive anisotropy is tilted in a first direction, the first refractive anisotropy being biaxial,
    wherein at least one of the pair of polarizing films is rotatable about a normal direction of the first retardation film, and
    wherein the first retardation film is rotatable about the normal direction of the first retardation film, the first retardation film being rotatable independent of the at least one of the pair of polarizing films such that the vertically-deposited film is rotatable only in conjunction with the first deposited film.

7. The liquid crystal device according to claim 6, wherein the vertically-deposited film is disposed more apart from the liquid crystal panel than the first deposited film.

8. The liquid crystal device according to claim 6, wherein a thickness of the vertically-deposited film and a refractive index in the thickness direction of the vertically-deposited film are set so that a phase difference is 20 nm or less where a polar angle indicating an angle of a sight line is 30 degrees when the sight line from a just front surface of one of the pair of polarizing films located on a light output side is 0 degrees.

9. A projector comprising:
   the liquid crystal device according to claim 6;
   a light source emitting light, the light being modulated by the vertically-aligned liquid crystal; and
   a projecting optical system projecting the modulated light.

10. An optical compensation method of performing an optical compensation operation on the liquid crystal device according to claim 6, the optical compensation method comprising:
    rotating at least the first retardation film using a normal direction of the first retardation film as a rotation axis; and
    rotating at least one of the pair of polarizing films about the normal direction.

11. The liquid crystal device according to claim 6, wherein the first retardation film has a thickness of from approximately 0.2 μm to approximately 0.8 μm in the thickness direction.

12. A liquid crystal device comprising:
    a liquid crystal panel including:
        a pair of substrates; and
        a vertically-aligned liquid crystal interposed between the pair of substrates;
    a pair of polarizing films that interposes the liquid crystal panel therebetween; and
    a first retardation film that is disposed between the pair of polarizing films, the first retardation film including:
        a first substrate;
        a vertically-deposited film maintaining a uniaxial refractive anisotropy and being vertically deposited on one surface of the first substrate so that a uniaxial optical axis of the uniaxial refractive anisotropy is parallel to a thickness direction; and
        a first deposited film maintaining a first refractive anisotropy and having an obliquely deposited inorganic material on the other surface of the first substrate so that a first optical axis of the first refractive anisotropy is tilted in a first direction, the first refractive anisotropy being biaxial,
    wherein at least one of the pair of polarizing films is rotatable about a normal direction of the first retardation film, and
    wherein the first retardation film is rotatable about the normal direction of the first retardation film, the first retardation film being rotatable independent of the at least one of the pair of polarizing films such that the vertically-deposited film is rotatable only in conjunction with the first deposited film.

13. The liquid crystal device according to claim 12, wherein the vertically-deposited film is disposed more apart from the liquid crystal panel than the first deposited film.

14. The liquid crystal device according to claim 12, wherein a thickness of the vertically-deposited film and a refractive index in the thickness direction of the vertically-deposited film are set so that a phase difference is 20 nm or less where a polar angle indicating an angle of a sight line is 30 degrees when the sight line from a just front surface of one of the pair of polarizing films located on a light output side is 0 degrees.

15. A projector comprising:
    the liquid crystal device according to claim 12;
    a light source emitting light, the light being modulated by the vertically-aligned liquid crystal; and
    a projecting optical system projecting the modulated light.

16. An optical compensation method of performing an optical compensation operation on the liquid crystal device according to claim 12, the optical compensation method comprising:
    rotating at least the first retardation film using a normal direction of the first retardation film as a rotation axis; and
    rotating at least one of the pair of polarizing films about the normal direction.

17. The liquid crystal device according to claim 12, wherein the first retardation film has a thickness of from approximately 0.2 μm to approximately 0.8 μm in the thickness direction.

18. A liquid crystal device comprising:
    a liquid crystal panel including:
        a pair of substrates; and
        a vertically-aligned liquid crystal interposed between the pair of substrates;
    a pair of polarizing films that interposes the liquid crystal panel therebetween;
    a first retardation film that is disposed between the pair of polarizing films, the first retardation film including:
        a first substrate;
        a vertically-deposited film maintaining a uniaxial refractive anisotropy and being vertically deposited on one surface of the first substrate so that a uniaxial optical axis of the uniaxial refractive anisotropy is parallel to a thickness direction; and
        a first deposited film maintaining a first refractive anisotropy and having an obliquely deposited inorganic material on the other surface of the first substrate so that a first optical axis of the first refractive anisotropy is tilted in a first direction, the first refractive anisotropy being biaxial; and
    a second retardation film that is disposed between the pair of polarizing films, the second retardation film including:
        a second substrate; and
        a second deposited film maintaining a second refractive anisotropy and having an obliquely deposited inorganic material on the second substrate so that a second optical axis of the second refractive anisotropy is tilted in a second direction different from the first direction,
    wherein at least one of the pair of polarizing films is rotatable about a normal direction of the first retardation film, and
    wherein the first retardation film is rotatable about the normal direction of the first retardation film, the first retardation film being rotatable independent of the at least one of the pair of polarizing films such that the vertically-deposited film is rotatable only in conjunction with the first deposited film.

19. The liquid crystal device according to claim 18, wherein the second retardation film is rotatable independent of the first retardation film and the at least one of the pair of polarizing films.

20. The liquid crystal device according to claim 18, wherein at least one of the first retardation film and the second retardation film has a thickness of from approximately 0.2 μm to approximately 0.8 μm in the thickness direction.

21. A retardation film used with a liquid crystal panel including a pair of substrates and a vertically-aligned liquid crystal interposed between the pair of substrates and a pair of polarizing films interposing the liquid crystal panel therebetween, the retardation film being disposed between the pair of polarizing films, the retardation film comprising:
a first substrate;
a vertically-deposited film maintaining a uniaxial refractive anisotropy and having a vertically deposited inorganic material on the first substrate so that a uniaxial optical axis of the uniaxial refractive anisotropy is parallel to a thickness direction; and
a first deposited film maintaining a first refractive anisotropy and having an obliquely deposited inorganic material on the vertically-deposited film so that a first optical axis of the first refractive anisotropy is tilted in a first direction, the first refractive anisotropy being biaxial,
wherein at least one of the pair of polarizing films is rotatable about a normal direction of the retardation film, and
wherein the retardation film is rotatable about the normal direction of the retardation film, the retardation film being rotatable independent of the at least one of the pair of polarizing films such that the vertically-deposited film is rotatable only in conjunction with the first deposited film.

22. The retardation film according to claim 21, wherein the retardation film has a thickness of from approximately 0.2 µm to approximately 0.8 µm in the thickness direction.

23. A retardation film used with a liquid crystal panel including a pair of substrates and a vertically-aligned liquid crystal interposed between the pair of substrates and a pair of polarizing films interposing the liquid crystal panel therebetween, the retardation film being disposed between the pair of polarizing films, the retardation film comprising:
a first substrate;
a vertically-deposited film maintaining a uniaxial refractive anisotropy and being vertically deposited on one surface of the first substrate so that a uniaxial optical axis of the uniaxial refractive anisotropy is parallel to a thickness direction; and
a first deposited film maintaining a first refractive anisotropy and having an obliquely deposited inorganic material on the other surface of the first substrate so that a first optical axis of the first refractive anisotropy is tilted in a first direction, the first refractive anisotropy being biaxial,
wherein at least one of the pair of polarizing films is rotatable about a normal direction of the retardation film, and
wherein the retardation film is rotatable about the normal direction of the retardation film, the retardation film being rotatable independent of the at least one of the pair of polarizing films such that the vertically-deposited film is rotatable only in conjunction with the first deposited film.

* * * * *